US010165395B2

(12) United States Patent
Edge et al.

(10) Patent No.: US 10,165,395 B2
(45) Date of Patent: *Dec. 25, 2018

(54) METHODS OF SUPPORTING LOCATION AND EMERGENCY CALLS FOR AN OVER-THE-TOP SERVICE PROVIDER

(71) Applicant: QUALCOMM Incorporated, San Diego, CA (US)

(72) Inventors: Stephen William Edge, Escondido, CA (US); Randall Coleman Gellens, San Diego, CA (US); Farrokh Khatibi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/694,965

(22) Filed: Sep. 4, 2017

(65) Prior Publication Data

US 2018/0014338 A1 Jan. 11, 2018

Related U.S. Application Data

(63) Continuation of application No. 14/863,751, filed on Sep. 24, 2015, now Pat. No. 9,756,664.
(Continued)

(51) Int. Cl.
*H04W 76/00* (2018.01)
*H04W 4/02* (2018.01)
(Continued)

(52) U.S. Cl.
CPC ........... *H04W 4/02* (2013.01); *H04L 61/2564* (2013.01); *H04L 65/105* (2013.01);
(Continued)

(58) Field of Classification Search
CPC ............. H04L 61/2564; H04L 65/1016; H04L 65/105; H04L 65/1069; H04W 12/08;
(Continued)

(56) References Cited

U.S. PATENT DOCUMENTS 7,991,382 B1 * 8/2011 Gunasekara ........ H04L 12/6418
455/404.1
8,254,877 B2 8/2012 Edge et al.
(Continued)

FOREIGN PATENT DOCUMENTS

JP 2008536455 A 9/2008
WO 2013135316 A1 9/2013
(Continued)

OTHER PUBLICATIONS

"3rd Generation Partnership Project; Technical Specification Group Services and System Aspects; IP Multimedia Subsystem (IMS) emergency sessions (Release 12)," 3GPP Standard; 3GPP TS 23.167, 3rd Generation Partnership Project (3GPP), Mobile Competence Centre ; 650, Route Des Lucioles ; F-86921.
(Continued)

*Primary Examiner* — Babar Sarwar
(74) *Attorney, Agent, or Firm* — MG-IP Law, P.C.

(57) ABSTRACT

Methods and apparatuses for supporting location and emergency calls for an over-the-top (OTT) service provider are disclosed. A UE may send a request for an emergency call to an OTT service provider and may include in the request mobile network operator (MNO) data for a serving MNO for the UE. The OTT service provider may forward the emergency call request to an Internet Protocol (IP) Multimedia Subsystem (IMS). The IMS may determine routing information for the emergency call and either return the routing information to the OTT service provider to enable the OTT service provider to route the emergency call to a public
(Continued)

safety answering point (PSAP) or may route the emergency call itself to the PSAP. The call request routed by the IMS or by the OTT service provider may include a reference identifier that may enable the PSAP to obtain a location for the UE from the IMS.

30 Claims, 29 Drawing Sheets

Related U.S. Application Data

(60) Provisional application No. 62/083,768, filed on Nov. 24, 2014, provisional application No. 62/101,974, filed on Jan. 9, 2015.

(51) Int. Cl.
   H04L 29/12       (2006.01)
   H04L 29/06       (2006.01)
   H04W 48/18       (2009.01)
   H04W 12/08       (2009.01)
   H04W 76/50       (2018.01)
   H04W 4/90        (2018.01)

(52) U.S. Cl.
   CPC ...... *H04L 65/1016* (2013.01); *H04L 65/1069* (2013.01); *H04W 4/90* (2018.02); *H04W 12/08* (2013.01); *H04W 48/18* (2013.01); *H04W 76/50* (2018.02)

(58) Field of Classification Search
   CPC ......... H04W 48/18; H04W 4/02; H04W 4/22; H04W 76/007; H04W 4/90; H04W 76/50
   USPC ............... 455/404.2, 455, 421, 445–449, 455/456.1–456.3, 457; 379/45, 221.11
   See application file for complete search history.

(56) References Cited

U.S. PATENT DOCUMENTS

| | | | |
|---|---|---|---|
| 9,065,908 B2 | 6/2015 | Buer et al. | |
| 9,161,196 B2 | 10/2015 | Ballantyne et al. | |
| 9,185,216 B2* | 11/2015 | Purnadi | H04M 3/5116 |
| 9,208,293 B1 | 12/2015 | Zhu | |
| 9,693,185 B2 | 6/2017 | Thyni et al. | |
| 2007/0086382 A1 | 4/2007 | Narayanan et al. | |
| 2007/0153986 A1* | 7/2007 | Bloebaum | H04W 4/22 |
| | | | 379/45 |
| 2007/0167146 A1* | 7/2007 | Bandaru | H04Q 3/0016 |
| | | | 455/404.2 |
| 2009/0154397 A1* | 6/2009 | Akhtar | H04W 28/24 |
| | | | 370/328 |
| 2010/0304705 A1* | 12/2010 | Hursey | H04M 11/04 |
| | | | 455/404.1 |
| 2011/0026440 A1* | 2/2011 | Dunn | H04M 3/5116 |
| | | | 370/259 |
| 2011/0026687 A1 | 2/2011 | Smelyansky | |
| 2011/0058658 A1* | 3/2011 | Li | H04W 4/22 |
| | | | 379/45 |
| 2011/0076982 A1* | 3/2011 | Li | H04W 48/18 |
| | | | 455/404.1 |
| 2011/0222471 A1 | 9/2011 | Abraham et al. | |
| 2012/0178411 A1 | 7/2012 | Li et al. | |
| 2012/0184238 A1* | 7/2012 | Patel | H04M 3/42195 |
| | | | 455/404.1 |
| 2013/0143516 A1 | 6/2013 | Winterbottom et al. | |
| 2013/0195076 A1* | 8/2013 | Keller | H04W 36/0022 |
| | | | 370/331 |
| 2014/0031003 A1 | 1/2014 | Shugart et al. | |
| 2014/0086177 A1 | 3/2014 | Adjakple et al. | |
| 2014/0140268 A1* | 5/2014 | Li | H04W 4/22 |
| | | | 370/328 |
| 2014/0248848 A1* | 9/2014 | Mufti | H04W 76/007 |
| | | | 455/404.1 |
| 2015/0245256 A1 | 8/2015 | Kiss | |
| 2015/0319156 A1 | 11/2015 | Guccione et al. | |
| 2016/0025862 A1 | 1/2016 | Wengler et al. | |
| 2016/0150574 A1 | 5/2016 | Edge et al. | |
| 2016/0249193 A1 | 8/2016 | Edge et al. | |
| 2017/0339543 A1 | 11/2017 | Edge et al. | |

FOREIGN PATENT DOCUMENTS

| | | |
|---|---|---|
| WO | 2016043728 A1 | 3/2016 |
| WO | 2016080880 A1 | 5/2016 |

OTHER PUBLICATIONS

"Functional Architecture to Support European Requirements on Emergency Caller Location Determination and Transport; Draft ETSI ES 203 178", ETSI Draft; Draft ETSI ES 203 178, European Telecommunications Standards Institute (ETSI), 650, Route Des Lucioles; F-06921 Sophia-Antipolis; France, vol. NTECH, No. V1.0.2, Oct. 22, 2014 (Oct. 22, 2014), pp. 1-46, XP014223019, [retrieved on Oct. 22, 2014].

International Search Report and Written Opinion—PCT/US2015/059998—ISA/EPO—dated Feb. 29, 2016.

"Migration of eCall Transport", 3GPP TSG-SA WG2#102 S2-140864, Mar. 2014, 59 Pages, URL:http://www.3gpp.org/ftp/tsg_sa/WG2_Arch/TSGS2_102_Malta/Docs/S2-140864.zip.

* cited by examiner

METHODS OF SUPPORTING LOCATION AND EMERGENCY CALLS FOR AN OVER-THE-TOP SERVICE PROVIDER

CROSS-REFERENCE TO RELATED APPLICATIONS

The present Application for Patent is a continuation of U.S. application Ser. No. 14/863,751, entitled "METHODS OF SUPPORTING LOCATION AND EMERGENCY CALLS FOR AN OVER-THE-TOP SERVICE PROVIDER," filed Sep. 24, 2015, which claims the benefit of U.S. Provisional Application No. 62/083,768, entitled "LOCATION BY REFERENCE FOR AN OVER-THE-TOP EMERGENCY CALL," filed Nov. 24, 2014, and U.S. Provisional Application No. 62/101,974, entitled "LOCATION TRANSFER ALTERNATIVES TO AN OVER-THE-TOP SERVICE PROVIDER," filed Jan. 9, 2015, each of which are assigned to the assignee hereof, and expressly incorporated herein by reference in their entirety.

INTRODUCTION

Embodiments of the disclosure relate to providing support for location and emergency calls for an over-the-top (OTT) service provider (SP).

Wireless communication systems have developed through various generations, including a first-generation analog wireless phone service (1G), a second-generation (2G) digital wireless phone service (including interim 2.5G networks) and third-generation (3G) and fourth-generation (4G) high speed data/Internet-capable wireless services.

As part of 4G evolution, Long Term Evolution (LTE) has been developed by the $3^{rd}$ Generation Partnership Project (3GPP) as a radio access network technology for wireless communication of high-speed data for mobile phones and other data terminals. LTE has evolved from the Global System for Mobile Communications (GSM) and from derivatives of GSM, such as Enhanced Data rates for GSM Evolution (EDGE), Universal Mobile Telecommunications System (UMTS), and High-Speed Packet Access (HSPA).

In North America, wireless communications systems, such as those supporting GSM, UMTS and LTE, that are employed by public network operators use a solution for Enhanced 911, or E911, that links emergency callers with the appropriate public resources. The solution attempts to automatically associate the caller, i.e., the caller's user equipment (UE), with a specific location, such as a physical address or geographic coordinates. Automatically locating the caller with high accuracy (e.g., with a distance error of 50 meters or less) and providing the location to a Public Safety Answering Point (PSAP) can increase the speed with which the public safety side can respond during emergencies, especially where the caller may be unable to communicate his/her location or does not know this location. In addition, knowing the approximate location of an emergency caller (e.g., the particular network cell the caller's device is accessing) may be essential to routing an emergency call to the correct PSAP for the caller's location.

Certain other providers, known as Over The Top (OTT) service providers (SPs), may also provide voice and data related services to users of wireless devices but without necessarily owning or operating a public wireless network or acting as a Mobile Virtual Network Operator (MVNO). A user with a wireless device may then access OTT SP resources (e.g., one or more servers) via some other wireless network SP—e.g., an SP with a UMTS or LTE network—and possibly also via the Internet. The access is typically transparent to the serving wireless network SP (unlike access to a home wireless network or MVNO) and may typically occur above the network and IP protocol levels—leading to the name "Over the Top". In this case, the OTT SP may provide a user with the ability to make voice and data calls (or sessions) and, in some cases, with the ability to make an emergency call.

However, an OTT SP may have more difficulty than a public wireless network operator in obtaining an accurate and reliable location for an emergency caller due to restricted access to location related information and lack of location capable resources. For example, while a serving wireless network may have access to cell related information for a wireless caller (e.g., a serving cell ID for the wireless caller) and may have network infrastructure that can be used to obtain an accurate location for a wireless caller (e.g., base stations that can measure signals from a wireless caller's device or whose signals can be measured by the wireless caller's device and a location server to transform such measurements into a location estimate), an OTT SP may have little or none of this infrastructure or information. This may prevent an OTT SP from routing an emergency call from a wireless caller to the correct PSAP and/or providing an accurate location of the wireless caller to a PSAP, which may prevent an OTT SP from providing reliable emergency services. In addition, an OTT SP may not always have the communication means to forward an emergency call to a destination PSAP, even when the PSAP can be known, or respond to a query from a PSAP for a caller's location—e.g., in the case that an OTT SP lacks the necessary connectivity to the PSAP or lacks authorization to forward emergency calls or provide caller location. There may thus be benefits in improving support of location and emergency service calls for an OTT SP.

SUMMARY

The following presents a simplified summary relating to one or more aspects and/or embodiments associated with the mechanisms disclosed herein for providing location transfer alternatives to an over-the-top (OTT) service provider. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Methods and apparatuses for supporting location and emergency calls for an OTT service provider are disclosed. A method of supporting emergency calls at an OTT service provider includes receiving a first message comprising an emergency call request from a user equipment (UE), wherein the first message is transferred to the OTT service provider via a serving mobile network operator (MNO) for the UE, and wherein the first message includes an address for an Internet Protocol (IP) Multimedia Subsystem (IMS) for the serving MNO, and sending a second message to the IMS based on the address, wherein the second message comprises a request for the emergency call.

A method of supporting emergency calls at an IMS entity for a serving MNO includes receiving a first message sent by an OTT service provider comprising an emergency call request for a UE, wherein the emergency call request includes MNO data for the UE, and determining routing information for a destination Public Safety Answering Point (PSAP) based on the MNO data.

A method of supporting emergency calls at a UE includes receiving a request for an emergency call from a user of the UE, obtaining MNO data for a serving MNO for the UE, and sending a first message comprising a request for the emergency call to an OTT service provider, wherein the request for the emergency call includes the MNO data.

An apparatus for supporting emergency calls at an OTT service provider includes at least one processor and a transceiver, the transceiver configured to receive a first message comprising an emergency call request from a UE, wherein the first message is transferred to the OTT service provider via a serving MNO for the UE, and wherein the first message includes an address for an IMS for the serving MNO, and to send a second message to the IMS based on the address, wherein the second message comprises a request for the emergency call.

An apparatus for supporting emergency calls at an IMS entity for a serving MNO includes at least one processor and a transceiver, the transceiver configured to receive a first message sent by an OTT service provider comprising an emergency call request for a UE, wherein the emergency call request includes MNO data for the UE, and wherein the at least one processor is configured to determine routing information for a destination PSAP based on the MNO data.

An apparatus for supporting emergency calls at a UE includes at least one processor and a transceiver, the transceiver configured to receive a request for an emergency call from a user of the UE, to obtain MNO data for a serving MNO for the UE, and to send a first message comprising a request for the emergency call to an OTT service provider, wherein the request for the emergency call includes the MNO data.

An apparatus for supporting emergency calls at an OTT service provider includes means for receiving a first message comprising an emergency call request from a UE, wherein the first message is transferred to the OTT service provider via a serving MNO for the UE, and wherein the first message includes an address for an IMS for the serving MNO, and means for sending a second message to the IMS based on the address, wherein the second message comprises a request for the emergency call.

An apparatus for supporting emergency calls at an IMS entity for a serving MNO includes means for receiving a first message sent by an OTT service provider comprising an emergency call request for a UE, wherein the emergency call request includes MNO data for the UE, and means for determining routing information for a destination PSAP based on the MNO data.

An apparatus for supporting emergency calls at a UE includes means for receiving a request for an emergency call from a user of the UE, means for obtaining MNO data for a serving MNO for the UE, and means for sending a first message comprising a request for the emergency call to an OTT service provider, wherein the request for the emergency call includes the MNO data.

A non-transitory computer-readable medium for supporting emergency calls at an OTT service provider includes at least one instruction to receive a first message comprising an emergency call request from a UE, wherein the first message is transferred to the OTT service provider via a serving MNO for the UE, and wherein the first message includes an address for an IMS for the serving MNO, and at least one instruction to send a second message to the IMS based on the address, wherein the second message comprises a request for the emergency call.

A non-transitory computer-readable medium for supporting emergency calls at an IMS entity for a serving MNO includes at least one instruction to receive a first message sent by an OTT service provider comprising an emergency call request for a UE, wherein the emergency call request includes MNO data for the UE, and at least one instruction to determine routing information for a destination PSAP based on the MNO data.

A non-transitory computer-readable medium for supporting emergency calls at a UE includes at least one instruction to receive a request for an emergency call from a user of the UE, at least one instruction to obtain MNO data for a serving MNO for the UE, and at least one instruction to send a first message comprising a request for the emergency call to an OTT service provider, wherein the request for the emergency call includes the MNO data.

Other objects and advantages associated with the mechanisms disclosed herein will be apparent to those skilled in the art based on the accompanying drawings and detailed description.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1A:
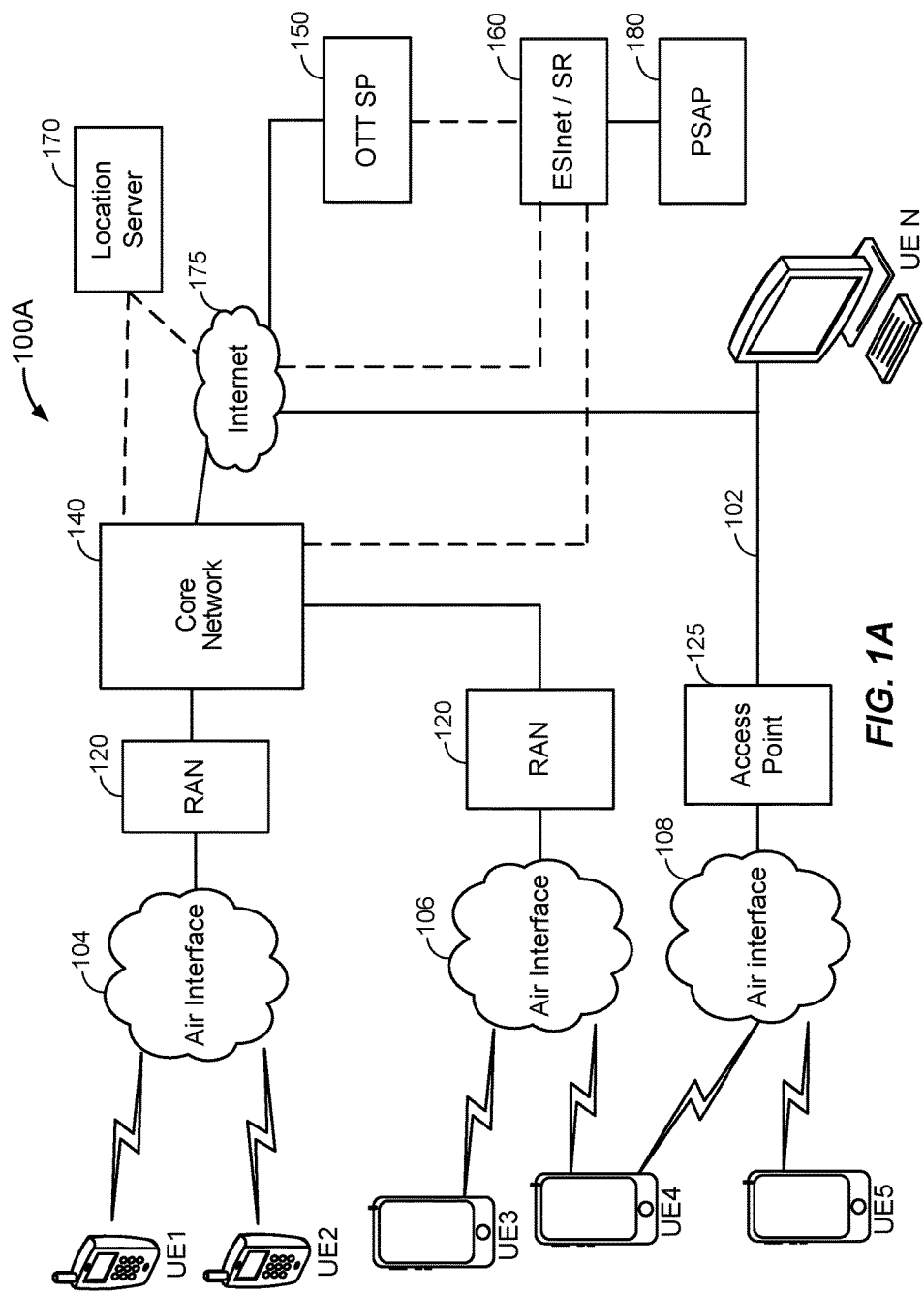
FIG. 1A illustrates a high-level system architecture of a wireless communications system in accordance with at least one aspect of the disclosure.

It is noted that in the message and call flows shown in FIGS. 2A, 2B, 7, 8 and 9, individual messages and actions are indicated by numeric labels that are sometimes referred to in the description as operations or steps.

DETAILED DESCRIPTION

Methods and apparatuses for supporting location and emergency calls for an over-the-top (OTT) service provider are disclosed. A user equipment (UE) may send a request for an emergency call to an OTT service provider and may include in the request mobile network operator (MNO) data for a serving MNO for the UE. The MNO data may include the address for an IP Multimedia Subsystem (IMS) for the serving MNO. The OTT service provider may forward the emergency call request to the IMS. The IMS may determine routing information for the emergency call and either return the routing information to the OTT service provider to enable the OTT service provider to route the emergency call to a public safety answering point (PSAP) or may route the emergency call itself to the PSAP. The call request routed by the IMS or by the OTT service provider may include a reference identifier that may enable the PSAP to obtain a location for the UE from the IMS.

These and other aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Table 1 provides a glossary of terms and abbreviations used in this disclosure:

TABLE 1

| | |
|---|---|
| \multicolumn{2}{c}{Glossary of Terms and Abbreviations} | |
| 3GPP | $3^{rd}$ Generation Partnership Project |
| ALI | Automatic Location Identification |
| AN | Access Network |
| ANSI | American National Standards Institute |
| ATIS | Alliance for Telecommunications Industry Solutions |
| BCF | Border Control Function |
| CS | Circuit Switched |
| DN | Directory Number |
| ECRF | Emergency Call Routing Function |
| E-CSCF | Emergency Call Session Control Function |
| ELS | Emergency Location Server |
| ESInet | Emergency Services IP network |
| E-SLP | Emergency SLP |
| E-SMLC | Enhanced Serving Mobile Location Center |
| ESRD | Emergency Services Routing Digits |
| ESRK | Emergency Services Routing Key |
| ESRP | Emergency Services Routing Proxy |
| FQDN | Fully Qualified Domain Name |
| GMLC | Gateway Mobile Location Center |
| GPRS | General Packet Radio Service |
| HELD | HTTP-Enabled Location Delivery |
| HSPA | High Speed Packet Access |
| HSS | Home Subscriber Server |
| IAM | Initial Address Message |
| IBCF | Interconnection Border Control Function |
| IMEI | International Mobile Equipment Identity |
| IMS | IP Multimedia Subsystem |
| IMSI | International Mobile Subscriber Identity |
| IP | Internet Protocol |
| ISDN | Integrated Services Digital Network |
| ISUP | ISDN User Part |
| LByR | Location By Reference |
| LByV | Location By Value |
| LoST | Location-to-Service Translation |
| LPP | LTE Positioning Protocol |
| LRF | Location Retrieval Function |
| LS | Location Server |
| LTE | Long Term Evolution |
| MGCF | Media Gateway Control Function |
| MLP | Mobile Location Protocol |
| MME | Mobility Management Entity |
| MNO | Mobile Network Operator |
| MSISDN | Mobile Station International Subscriber Directory Number |
| NENA | National Emergency Number Association |
| OTT | Over The Top |
| PCN | Packet Core Network |
| P-CSCF | Proxy Call Session Control Function |
| PDN | Packet Data Network |
| PDP | Packet Data Protocol |
| PSAP | Public Safety Answering Point |
| PSTN | Public Switched Telephone Network |
| RDF | Routing Determination Function |
| S-CSCF | Serving Call Session Control Function |
| SGSN | Serving GPRS Support Node |
| SIP | Session Initiation Protocol |
| SLP | SUPL Location Platform |
| SP | Service Provider |
| SR | Selective Router |
| SUPL | Secure User Plane Location |
| TCP | Transmission Control Protocol |
| TIA | Telecommunications Industry Association |
| UE | User Equipment |
| URI | Uniform Resource Identifier |

TABLE 1-continued

Glossary of Terms and Abbreviations

| | |
|---|---|
| URL | Uniform Resource Locator |
| VPN | Virtual Private Network |
| WAN | Wide Area Network |
| WLAN | Wireless Local Area Network |

A client device, referred to herein as a user equipment (UE), may be mobile or stationary, and may communicate with a radio access network (RAN). As used herein, the term "UE" may be referred to interchangeably as an "access terminal" or "AT," a "wireless device," a "wireless terminal," a "subscriber device," a "subscriber terminal," a "subscriber station," a "user terminal" or "UT," a "mobile terminal," a "mobile station," a "terminal," a "device," a "user device," and variations thereof. Generally, UEs can communicate with a core network via a RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, smartphones, tablet computers, laptop computers, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1A illustrates a high-level system architecture of a wireless communications system 100A in accordance with an embodiment of the disclosure. The wireless communications system 100A contains a number N of UEs labelled 1 . . . N. The UEs 1 . . . N can include cellular telephones, personal digital assistant (PDAs), pagers, a laptop computer, a desktop computer, and so on. For example, in FIG. 1A, UEs 1 . . . 2 are illustrated as cellular calling phones, UEs 3 . . . 5 are illustrated as cellular touchscreen phones or smartphones, and UE N is illustrated as a desktop computer or PC.

Referring to FIG. 1A, UEs 1 . . . N are configured to communicate with an access network (e.g., the RAN 120, an access point 125, etc.) over a physical communications interface or layer, shown in FIG. 1A as air interfaces 104, 106, 108 and/or a direct wired connection 102. The air interfaces 104 and 106 can comply with a given cellular communications protocol (e.g., Code Division Multiple Access (CDMA), Evolution-Data Optimized (EVDO), Enhanced High Rate Packet Data (eHRPD), Global System for Mobile Communications (GSM), Enhanced Data Rates for GSM Evolution (EDGE), Wideband CDMA (WCDMA), Long-Term Evolution (LTE), etc.), while the air interface 108 can comply with a wireless local area network (WLAN) protocol (e.g., IEEE 802.11, Bluetooth®, etc.). As will be described further below, the RAN 120 includes a plurality of access points that serve UEs over air interfaces, such as the air interfaces 104 and 106. The access points in the RAN 120 can be referred to as access nodes (ANs), access points (APs), base stations (BSs), Node Bs, evolved Node Bs (eNodeBs), and so on. These access points can be terrestrial access points (or ground stations), or satellite access points. The RAN 120 is configured to connect to a core network (CN) 140, which may also be referred to as a Packet Core Network (PCN) or Evolved Packet Core (EPC), that can perform a variety of functions, including routing and connecting circuit switched (CS) calls between UEs served by the RAN 120 and other UEs or other non-UE entities served by the RAN 120 or a different RAN or different (non-RAN) network altogether, and can also mediate an exchange of packet-switched (PS) data with other entities via external networks such as Internet 175. The RAN 120 plus CN 140 may act as a serving wireless network for one or more of the UEs 1 to N. The term wireless network herein is used interchangeably with the term mobile network operator (MNO) to refer to a wireless network and the infrastructure within the wireless network (e.g., the RAN 120 and CN 140).

The Internet 175 includes a number of routing agents and processing agents (not shown in FIG. 1A for the sake of convenience). In FIG. 1A, UE N is shown as connecting to the Internet 175 directly (i.e., separately from the core network 140, such as via a DSL or packet cable SP and which may be via access point 125 itself in an example (e.g., for a WiFi router)). The Internet 175 can thereby function to route packet-switched data communications between UE N and other UEs that access the Internet 175 (e.g., via the core network 140).

Also shown in FIG. 1A is the access point 125 that is separate from the RAN 120. The access point 125 may be connected to the Internet 175 independently of the Core Network (CN) 140 (e.g., via an optical communication system such as FiOS, a cable modem, etc.). The air interface 108 may serve UE 4 or UE 5 over a local wireless connection, such as IEEE 802.11 or Bluetooth in an example.

Referring to FIG. 1A, a location server 170 is shown as connected to the Internet 175, the CN 140, or both. The location server 170 can be implemented as a plurality of structurally separate servers, or alternately may correspond to a single server. As will be described below in more detail, the location server 170 is configured to support one or more location services (e.g., positioning services, position by reference services, etc.) for UEs that can connect to the location server 170 via the CN 140 and/or via the Internet 175.

FIG. 1A further illustrates an Over-the-Top (OTT) Service Provider (SP) 150. An OTT SP may transfer audio, video, and/or other media content to and/or from one or more of UEs 1 to N over the Internet 175 and possibly over RAN 120 and CN 140 in a manner that is partially or completely transparent to the Internet 175, RAN 120 and CN 140. An OTT SP typically refers to a third-party provider, such as Skype™, Hulu, Netflix, Google etc. The OTT SP 150 may communicate with UEs 1 . . . N over the Internet 175, CN 140, RAN 120, and/or access point 125. Although only a single OTT SP 150 is illustrated in FIG. 1A, as is apparent, there may be any number of OTT SPs 150 connected to the Internet 175, each corresponding to a different OTT SP. The OTT SP 150 may have one or more servers, routing proxies and/or other entities (not shown in FIG. 1A) that may perform the various functions described herein for OTT SP 150. The same may apply for other OTT SPs referred to later herein such as OTT SP 350, 450, 550, 650, 750, 850 and 950.

Also illustrated in FIG. 1A is an Emergency Services IP Network (ESInet) and/or Selective Router (SR) 160. The ESInet 160 may be able to route IP based emergency calls made by any of UEs 1 to N and received via the Internet 175, the CN 140 or the OTT SP 150 to a suitable Public Safety Answering Point (PSAP), such as PSAP 180. Similarly, the SR 160 may be able to route a Circuit Switched (CS) emergency call made by any of UEs 1 to N and received via CN 140 to a PSAP, such as PSAP 180. In some embodiments, any of UEs 1 to N may originate an IP based emergency call, which may be transformed by CN 140 or by OTT SP 150 into a CS emergency call and sent to SR 160 (e.g., via the Public Switched Telephone Network, not shown in FIG. 1A) for routing to a CS capable PSAP 180. This may occur when there is an SR 160 but no ESInet 160 and/or when the PSAP 180 supports CS emergency calls but not IP based emergency calls. It should be understood that in the descriptions of emergency call establishment via an OTT SP 150 later herein, the emergency call may start out as an IP based emergency call from a UE (e.g., any of UEs 1 to N) but may be converted to a CS emergency call by OTT SP 150 and routed to PSAP 180 via an SR 160 and not via an ESInet 160.

UEs 1 . . . N in FIG. 1A may be able to make voice, text, video, or other data emergency calls via the Internet 175. For example, UEs 1 . . . N may be able to make such an emergency call via the OTT SP 150, as described further below. The ESInet/SR 160 can deliver these voice, text, video, and data emergency calls to the PSAP 180, which may be, for example, an emergency call center. The protocol used for delivering these emergency calls may be the Session Initiation Protocol (SIP) defined by the Internet Engineering Task Force (IETF). In addition, SIP based emergency calls may be delivered using the IP Multimedia Subsystem (IMS) defined by 3GPP, which supports use of SIP and may be supported by CN 140.

An example of a protocol-specific implementation for the RAN 120 and the CN 140 is provided below with respect to FIG. 1B to help explain the wireless communications system 100A in more detail in the case of support of LTE access by the RAN 120. In particular, the components of the RAN 120 and the CN 140 correspond to components associated with supporting packet-switched (PS) communications, whereby legacy circuit-switched (CS) components may also be present in these networks but are not shown explicitly in FIG. 1B.

Figure 1B:
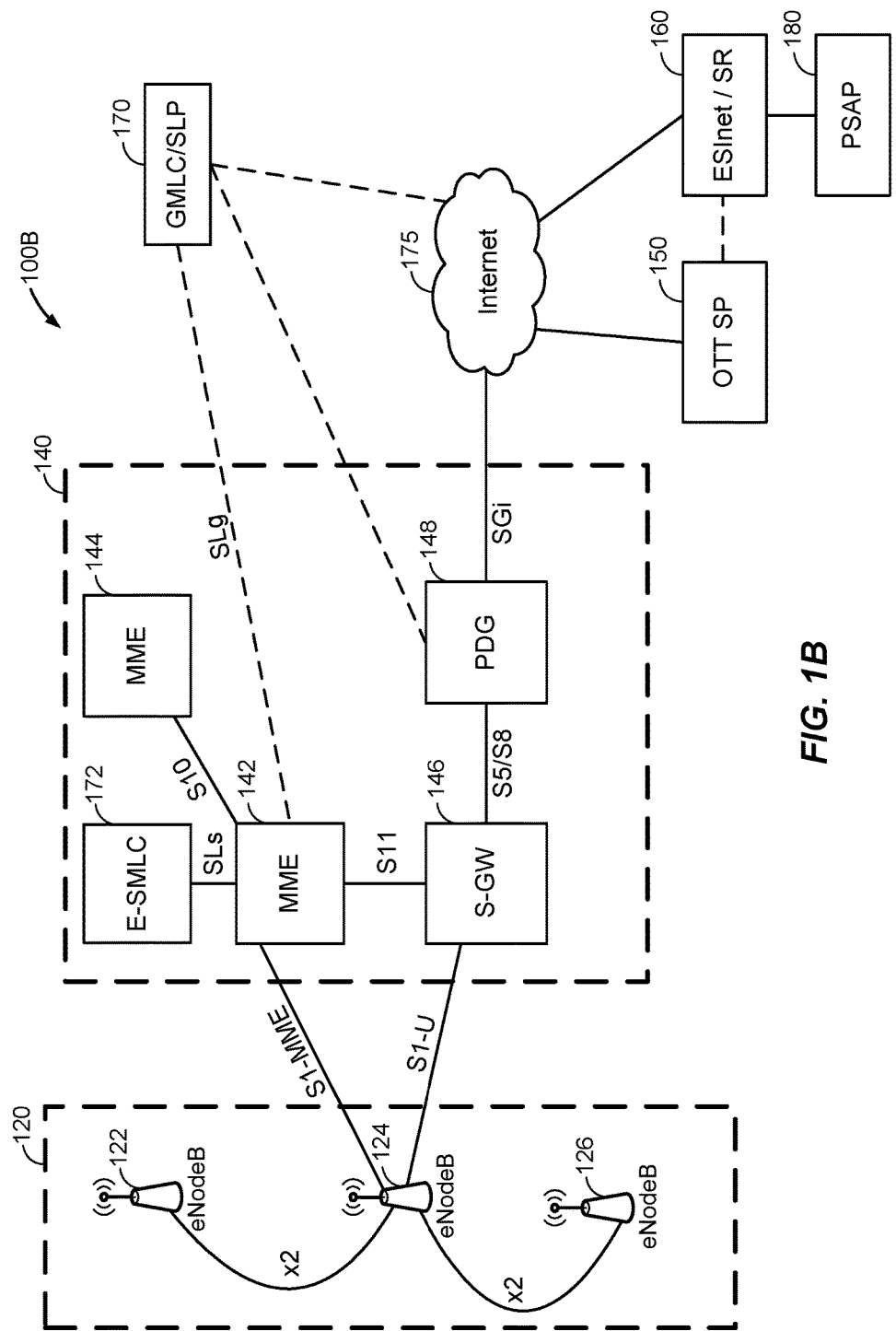
FIG. 1B illustrates an example configuration of the system architecture in FIG. 1A for Long-Term Evolution (LTE) wireless access in accordance with at least one aspect of the disclosure.

Specifically, FIG. 1B illustrates an example configuration 100B of the RAN 120 and CN 140 based on an Evolved Packet System (EPS) supporting LTE wireless access, in accordance with an embodiment of the disclosure. In the example of FIG. 1B, the RAN 120 in the EPS/LTE network is configured with a plurality of Evolved Node Bs (eNodeBs or eNBs) 122, 124, and 126. The CN 140 includes a plurality of Mobility Management Entities (MMEs) 142 and 144, an Enhanced Serving Mobile Location Center (E-SMLC) 172, a Serving Gateway (S-GW) 146, and a Packet Data Network Gateway (PDG) 148. In the example of FIG. 1B, the location server 170 is either a Gateway Mobile Location Center (GMLC) supporting the LTE control plane location solution or a Secure User Plane Location (SUPL) Location Platform (SLP) 170 supporting the SUPL location solution defined by the Open Mobile Alliance (OMA). In some embodiments, location server 170 may be a Location Retrieval Function (LRF) with a connection to or association with a GMLC and/or an SLP. Network interfaces between these components, the RAN 120 and the Internet 175 are illustrated in FIG. 1B and are defined in Table 2.

TABLE 2

| Network Interface | Description |
|---|---|
| S1-MME | Reference point for the control plane protocol between RAN 120 and MME 142. |
| S1-U | Reference point between RAN 120 and S-GW 146 for per bearer user plane tunneling and inter-eNodeB path switching during handover. |
| S5 | Provides user plane tunneling and tunnel management between S-GW 146 and PDG 148. It is used for S-GW relocation due to UE mobility and if the S-GW 146 needs to connect to a non-collocated PDG for the required PDG 148 connectivity. |
| S8 | Inter-PLMN reference point providing user and control plane between the S-GW 146 in a Visited Public Land Mobile Network (VPLMN) and the PDG 148 in a Home Public Land Mobile Network (HPLMN). S8 is the inter-PLMN variant of S5. |
| S10 | Reference point between MMEs 142 and 144 for MME relocation and MME to MME information transfer. |
| S11 | Reference point between MME 142 and S-GW 146. |
| SGi | Reference point between the PDG 148 and a packet data network, shown in FIG. 1B as the Internet 175. The Packet data network may be an operator external public or private packet data network or an intra-operator packet data network (e.g., for provision of IMS services). |
| SLg | Reference point between the MME 142 and the location server 170 in the case that location server 170 is a GMLC. This reference point enables a GMLC to request the location of a UE from the MME serving the UE. |
| SLs | Reference point between the E-SMLC 172 and the MME 142. This reference point enables an MME to forward a location request received from a GMLC to an E-SMLC and the E-SMLC to return a location estimate back to the MME. |
| X2 | Reference point between two different eNodeBs used for UE handoffs. |

A high-level description of the components shown in the RAN 120 and CN 140 of FIG. 1B will now be described. However, some of these components are well-known in the art from various 3GPP Technical Specifications (TSs), and the description contained herein is not intended to be an exhaustive description of all functionality performed by these components.

Referring to FIG. 1B, the MMEs 142 and 144 are configured to manage the control plane signaling for the EPS bearers and to support mobility for UEs accessing CN 140. MME functions include: Non-Access Stratum (NAS) signaling, NAS signaling security, Mobility management for inter- and intra-technology handovers, PDG and S-GW selection, and MME selection for handovers with MME change.

The S-GW 146 is the gateway that terminates the interface toward the RAN 120 for user plane signaling. For each UE attached to the CN 140 for an EPS-based system, at a given point of time, there is a single S-GW. The functions of the S-GW 146, for the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 1B, the PDG 148 is the gateway that terminates the SGi interface toward the Packet Data Network (PDN), e.g., the Internet 175. If a UE is accessing multiple PDNs, there may be more than one PDG for that UE. The PDG 148 functions include: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, and UL bearer binding verification as defined in 3GPP TS 23.203. The PDG 148 provides PDN connectivity to both GSM/EDGE Radio Access Network (GERAN)/ UTRAN only UEs and LTE capable UEs using a RAN 120 that may be any of E-UTRAN, GERAN, or UTRAN. The PDG 148 provides PDN connectivity to LTE capable UEs using a RAN 120 comprising eNBs such as shown in FIG. 1B (which is referred to as an E-UTRAN) over the S5/S8 interface.

Referring to FIG. 1B, the GMLC/SLP 170 is shown as connected to MME 142, to PDG 148 in the CN 140 and/or to the Internet 175. The GMLC/SLP 170 may be either a GMLC or an SLP or may be an LRF with a connection to or association with a GMLC or SLP. A GMLC 170 (or an LRF 170 with an associated or connected GMLC) supports the LTE control plane location solution while an SLP 170 (or an LRF 170 with an associated or connected SLP) supports the SUPL location solution. In the case that GMLC/SLP 170 is a GMLC but not an SLP, GMLC/SLP 170 may connect to MME 142 and to one or both of PDG 148 and Internet 175. In the case that GMLC/SLP 170 is an SLP but not a GMLC, GMLC/SLP 170 may or may not connect to MME 142 and may connect to one or both of PDG 148 and Internet 175. GMLC/SLP 170 may enable an external entity, such as OTT SP 150, ESInet 160, or PSAP 180, to send a location request to GMLC/SLP 170 for any of UEs 1 to N in FIG. 1A, may coordinate location determination for this UE using the 3GPP control plane location solution in the case of a GMLC, or SUPL in the case of an SLP, and may return the determined location to the requesting external entity. The E-SMLC 172 illustrated in FIG. 1B is connected to the MME 142 and is another location server used for obtaining a UE location estimate using the LTE control plane location solution.

In a control plane location solution, a location server (e.g., location server 170 in FIG. 1A or the GMLC/SLP 170 in FIG. 1B) is accessed by other elements, including UEs, via existing signaling interfaces in a network. All signaling related to the location of a UE is explicitly transported as signaling on all interfaces. In the case of LTE access, the control plane location solution is defined in 3GPP TSs 23.271 and 36.305.

In a user plane location solution, such as the SUPL solution, a UE and location server such as GMLC/SLP 170 in FIG. 1B communicate by exchanging data from the perspective of the network, such as via IP or TCP/IP. In the case of the SUPL solution, the GMLC/SLP 170 would be an SLP and would be used to obtain a location rather than using the E-SMLC 172. In some cases, a network may employ both a control plane location solution and a user plane location solution, such as SUPL. In that case, the E-SMLC 172 may be present and the GMLC/SLP 170 may comprise both a GMLC and an SLP. The GMLC and SLP for GMLC/SLP 170 may also be combined (e.g., in the same physical entity) or may be connected to one another in order to allow both solutions to be used to locate a UE. As already mentioned, GMLC/SLP 170 may also comprise an LRF with an association with or connection to a GMLC and/or an SLP. An LRF 170 connected to or associated with a GMLC may support control plane location similarly to a GMLC whereas an LRF 170 connected to or associated with an SLP may support SUPL user plane location similarly to an SLP.

The Alliance for Telecommunications Industry Solutions (ATIS) is investigating ways to support next generation 9-1-1 (NG911) calls that are established by a UE via an OTT service provider, e.g., Skype™. One principal issue is obtaining and providing an accurate and reliable location of a 911 caller to enable routing of an NG911 call by the OTT SP to or towards the correct PSAP and to enable dispatch by the PSAP of public safety support to the location of the calling user. Because an OTT SP, such as OTT SP 150, will often have little or no information regarding the access network used by the calling UE, it may be difficult for the OTT SP to make use of terrestrial based positioning methods (such as WiFi, Enhanced Cell ID (E-CID), and observed time difference of arrival (OTDOA)) to directly locate the calling UE. Moreover, when a calling UE is indoors, location of the UE using a Satellite Positioning System (SPS) such as the Global Positioning System (GPS), some other Global Navigation Satellite System (GNSS) or via Assisted GPS (A-GPS) or assisted GNSS (A-GNSS) by the OTT SP may also be unreliable due to an inherent difficulty in using SPS location indoors and/or due to lack of an ability by an OTT SP to control and/or assist the use of SPS location.

One solution that may be used by an OTT SP 150 to obtain the location of a UE that has instigated an emergency call via the OTT SP 150 involves the OTT SP 150 querying a location server in the access network (such as location server 170 in FIG. 1A or GMLC/SLP 170 in FIG. 1B) to obtain the calling UE's location, if the OTT SP 150 can be provided with or can infer the address of this location server. In another solution, the UE instigating the emergency call may provide its location directly to the OTT SP 150 (e.g., in an SIP INVITE used to establish the NG911 call). The UE providing its location directly to an OTT SP 150 can be an attractive solution because (a) the new impacts to standards (e.g., 3GPP standards) could be restricted, (b) the implementation impacts to mobile network operator (MNO) RAN and CN networks could be low or zero, (c) UEs typically support a standalone location capability anyway (e.g., a solution assisted by an UE operating system vendor or UE chip vendor), and (d) the solution could be a good fit with existing NG911 standards that allow UE provision of the UE location in a SIP INVITE sent to instigate an emergency call.

A UE-provided location (e.g., included in a SIP INVITE) can be by-value (e.g., the UE provides its latitude/longitude coordinates directly) or by-reference. For location by reference, the UE provides a Uniform Resource Identifier (URI) (originally obtained by the UE from a location server and referred to herein as a "location URI") that contains the name or address of a location server, a unique reference to the UE that may be assigned by the location server, and an indication of a protocol to use to obtain the UE location from the location server. A "location URI" is referred to interchangeably herein as a "location reference" and as a "location by reference." A location URI may be as defined by the IETF in Request For Comments (RFCs) 3986 and 5808 and may comprise a character string conforming to rules in RFC 3986 that encode the identification of a scheme name or protocol name such as SIP or HTTP and an identification of a resource that may comprise the identification (e.g., Internet path name or address) of a location server plus the identification of a UE.

The identification of the UE, also referred to herein as a "UE reference," "local UE reference," or "local reference," may comprise characters that identify the UE to the location server but hide the true identity of the UE from other entities and may be assigned locally by the location server. A UE may request and obtain a location URI from a location server using a location configuration protocol such as the HTTP-Enabled Location Delivery (HELD) protocol defined in IETF RFC 5985. A UE may convey a location URI to another entity, such as OTT SP 150, ESInet 160 or PSAP 180 in FIG. 1A and FIG. 1B using a location conveyance protocol, such as SIP as defined in IETF RFC 6442. The entity that receives a location URI for a UE (e.g., OTT SP

150, ESInet 160, or PSAP 180 in FIG. 1A and FIG. 1B) may use a location dereference protocol, such as SIP, HTTP or HELD, to request and receive the location of the UE (e.g., geographic coordinates that may comprise a latitude and longitude (and possibly altitude) or a civic location that may comprise a postal address or street address (and possibly a floor number, room number, suite number etc.)) from the location server. With location dereferencing, the entity requesting the location provides the location URI to the location server, which identifies the UE from the location URI, obtains a location for the UE, and returns the location to the requesting entity.

The location by reference solution may be more attractive than the location by value solution because it allows more time for a UE or a location server to obtain a location for the UE and can be used to obtain more than one location for the UE at different times. For example, the location by reference solution may be used by an OTT SP 150 to initially obtain an approximate UE location to assist routing and at a later time to obtain a more accurate UE location for the PSAP dispatch.

A location by reference solution may have significant impacts to a UE and to a location server, which may both need to support (a) a location configuration protocol, such as HELD, whereby a UE can request and a location server can provide a location URI, and (b) a means for the location server to authenticate the identity of the UE when the query/response in (a) occurs. The impact in (b) may be needed because the location server may need to reliably identify the UE at the time a location URI is assigned in order to locate the correct UE (e.g., and not some other UE) at some later time when a client (e.g., an OTT SP 150 or PSAP 180) requests the location of the UE by querying the location server with the location URI. Some location configuration protocols like HELD may not normally require or support the authentication in (b) because an IP address of the UE for which a location URI is provided may be available to a location server from the UE when (a) occurs and may be considered reliable enough to identify and locate the UE at a later time when the location URI is later dereferenced by an OTT SP 150, ESInet 160 or PSAP 180 (e.g., using HELD).

However, an IP address could be falsified. For example, an entity that is not a UE but is able to intercept IP communication to and from a UE may use a location configuration protocol to obtain a location URI for a UE by sending a location request to a location server containing the IP address for the UE. The entity may then either (i) masquerade as an OTT SP to obtain the location for the UE by sending a dereferencing request to the location server containing the obtained location URI or (ii) instigate an emergency call and provide the location URI to an OTT SP 150 to cause public safety dispatch to the location of the UE even though the UE did not make the emergency call.

In addition, even when an IP address for a UE is correct and when an entity requesting the UE location is legitimate, a location server may require a different identity for the UE in order to obtain the location of the UE and/or to correctly identify the UE at a later time. For example, if the location server employs a control plane location solution to obtain the location of a UE (e.g., the 3GPP control plane location solution for LTE), the location server may need a wireless associated identity for the UE, such as an International Mobile Subscriber Number (IMSI) or a Temporary Mobile Subscriber Number (TMSI), rather than the UE's IP address. In addition, if a UE that is located needs to be identified later for charging or billing purposes (e.g., to allow the SP for the location server to bill the OTT SP 150) or to follow up later if an obtained location was in error or for statistical and accounting purposes, then some permanent global identity for the UE may be needed that is not an IP address. In order to ensure that the location server has a correct identity for the UE and that a location URI is being provided to the correct UE rather than to an entity masquerading as the UE, the authentication impact in (b) above may be needed. The dual impacts of (a) and (b) may make a location by reference solution (e.g., as defined by the IETF RFCs mentioned above herein) complex for both UE vendors and MNOs or their location server vendors.

A solution to the problem described above for making use of a location by reference would be for a serving access network, rather than a location server, to provide a UE with a location by reference after the UE (and its identity) has been authenticated by the access network. Authentication of a UE by an access network is a typical part of wireless network operation that is or can be supported for many types of wireless networks (e.g., GSM, UMTS, LTE, IEEE 802.11), and hence may add no new impacts to a UE or to an access network. The provision of a location by reference by an access network to a UE could occur (i) immediately after a UE has successfully attached to the access network and been authenticated, (ii) periodically, while the UE is attached to the access network (e.g., to enable a previous location by reference to be replaced based on a different location server and/or a different local UE reference), and/or (iii) on request by the UE while the UE is attached to the access network.

In one embodiment, an access network could communicate with a location server to obtain a location by reference for a UE. In this embodiment, the access network could act as a proxy and obtain a location by reference from the location server on behalf of the UE. The UE and location server would not then need to support a location configuration protocol to enable the UE to obtain a location URI from the location server. Instead, the UE would obtain the location URI from the access network and the access network would obtain the location URI from the location server. While this embodiment could add a new access network-location server interface, it may avoid the need to support a location configuration protocol and authentication of the UE by both the UE and the location server and may thus be a simpler solution than having the UE directly query the location server using a traditional location configuration protocol.

In another embodiment, an access network could assign a location by reference to a UE itself without involvement of a location server. For example, the access network (e.g., MME 142) may create a location URI that includes the known address or known identity (e.g., a known Internet path name) of a target location server (e.g., location server 170 in FIG. 1A or GMLC/SLP 170 in FIG. 1B), the scheme or protocol to be used to query the location server from a client, and (as an extension to the address or identity of the location server) a UE reference identifying the UE. In a normal location URI, the UE reference may be assigned locally by the location server that creates a location URI. With the embodiment described here, a UE reference may be assigned by the access network and may comprise a global UE identification, such as the IP address of the UE, the IMSI for the UE, and/or an identity for the UE known to the access network, such as a TMSI, a local address for the UE assigned by an access network node (e.g., an MME or SGSN) and/or an address of an access network node, or any combination thereof. The UE reference may further include a date and/or time of assignment and/or may be ciphered to protect user privacy (e.g., where the cipher keys are known to the access network and the location server but not to other parties). In the case that the UE reference comprises a TMSI or IP address, ciphering may not be needed because the true identity of the UE (e.g., the IMSI of the UE) is not included in the UE reference and thus may not be available to other parties. The location URI may also be digitally signed by the access network (e.g., may include a digital signature) so that a location server being queried with the location URI can know that the location URI was assigned by the access network. In some cases, the location URI may be both ciphered and digitally signed, for example, using the United States National Institute of Standards and Technology (NIST) Counter with Cipher Block Chaining-Message Authentication Code (CCM) method.

The use of the above embodiments may only affect the access network and the location server. Hence, an MNO could migrate from the second embodiment, in which an access network assigns a location URI without involvement of a location server, to the first embodiment, in which an access network acts as a proxy for a location server without affecting other entities (e.g., including UEs). In some cases, MNO migration could be from the first embodiment to the second embodiment. In the case that the access network supports LTE and belongs to a cellular MNO, the location by reference for a UE may be assigned by the serving MME for the UE, such as MME 142 in FIG. 1B. The assignment may occur as part of LTE network attachment by the UE and/or as part of a tracking area update by the UE. Such an assignment could add one new parameter containing an assigned location URI to a few Non-Access Stratum (NAS) messages used for LTE support and may have a small impact for both the UE and the access network (e.g., MME). The benefit of this solution to MNOs and UE vendors may be that impacts to support the solution can be limited and a flexible location solution can be offered to OTT SPs that fits in with existing standards.

Figure 2A:
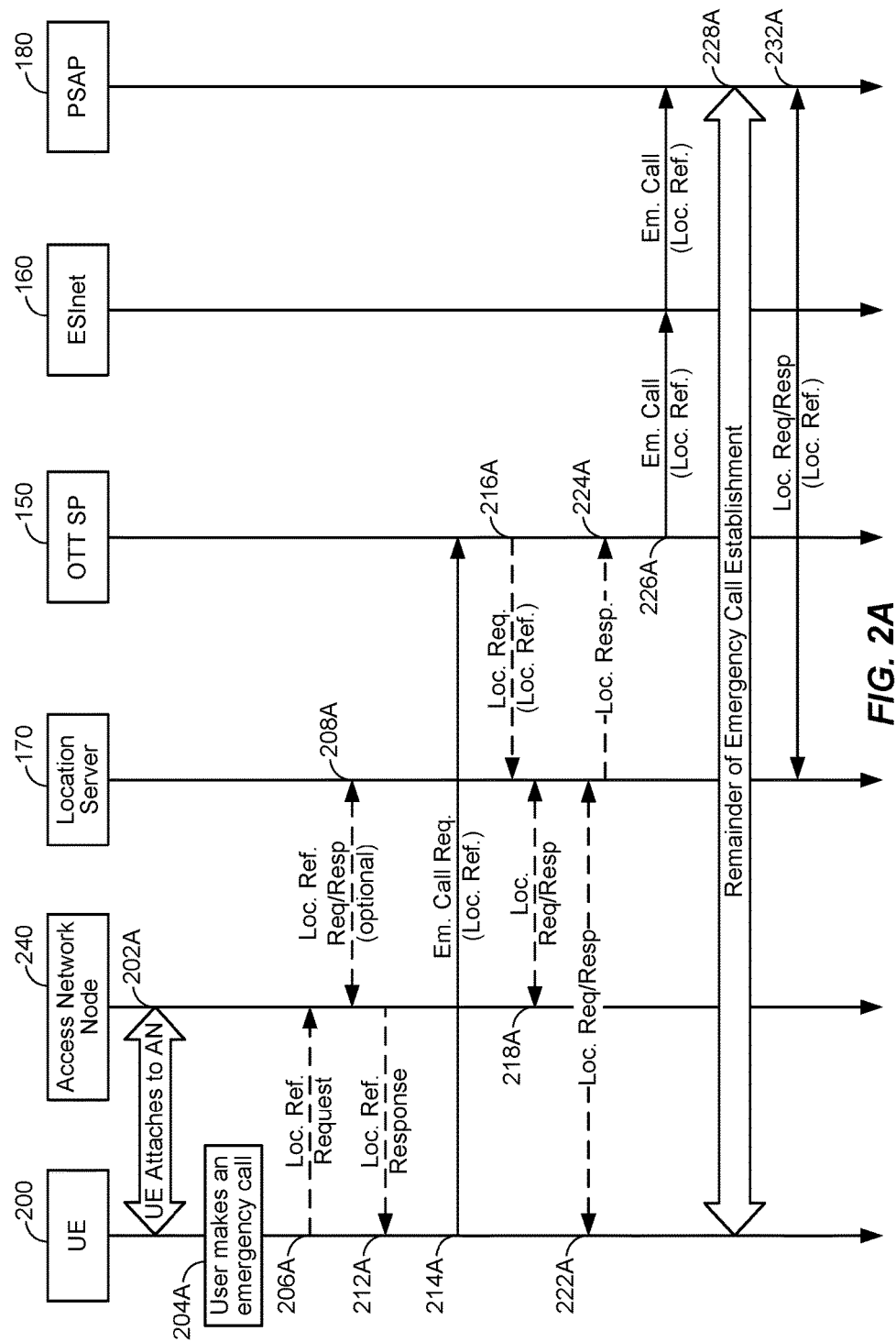
FIG. 2A illustrates specific interactions of the network entities illustrated in FIG. 1A to provide a location by reference according to at least one aspect of the disclosure.

Referring back to FIG. 1A and FIG. 1B, FIG. 2A illustrates specific interactions of the network entities illustrated in FIG. 1A, and FIG. 1B in the case of LTE access, to provide a location by reference for an OTT emergency call according to the embodiments described herein. Referring to FIG. 2A, the term "access network" refers to the RAN 120 and the CN 140. The access network node 240 may be some entity in the access network, such as an access node, an access point, a base station, an eNodeB (e.g., eNB 122, 124 or 126), a Femtocell, an MME (e.g., MME 142), etc. The access network node may be within the RAN 120 or within the CN 140.

At 202A, a UE 200 (e.g., which may correspond to any of UEs 1 to N in FIG. 1A) attaches to the access network via access network node 240. At 204A, the user of UE 200 makes an emergency call via an OTT application, e.g., Skype, installed on the UE 200. At 206A, the UE 200 sends a request for a location reference to the access network node 240. In some embodiments, block 206A may be instigated by the OTT application, which may recognize the emergency call request at block 204A and may request the UE 200 (e.g., using an Application Programming Interface (API) to a modem on the UE 200) to obtain a location reference.

At 208A, the access network node 240 may optionally send a location reference request to the location server 170 (e.g., the GMLC/SLP 170 or E-SMLC 172) for a location reference for the UE 200 and receive back a response from the location server 170 at 212A containing a location reference. In this case, the access network node 240 acts as a proxy to obtain the location reference from the location server 170 on behalf of the UE 200 at block 208A. The request/response in block 208A may use a secure connection between the location server 170 and access network node 240 that enables the location server 170 to be aware that an access network node, whose operator may be the same as for the location server 170, is requesting the location reference. The secure connection between location server 170 and access network node 240 may make use of a trusted relationship between location server 170 and access network node 240, for example, a relationship based on access network node 240 and location server 170 belonging to the same SP or same network operator—and may employ preconfigured security credentials in each entity to enable the establishment of the secure connection. The location server 170 may then assign and return a location reference at block 208A (e.g., that may include a UE reference that is local to the location server 170) that may later be used (e.g., by OTT SP 150) to obtain a location for UE 200 from location server 170 as described later.

While block 208A adds a new interface between the access network node 240 and the location server 170, it avoids the need for the location server 170 to interact with and authenticate the UE 200. In some embodiments, access network node 240 and location server 170 may use one of SIP, HELD, or the Mobile Location Protocol (MLP) defined by the Open Mobile Alliance (OMA) to request and return the location reference at 208A. At 212A, the access network node 240 sends the location reference obtained from the location server 170 to the UE 200. In some embodiments, the UE 200 (e.g., a modem on the UE 200) may provide the location reference to the OTT application.

In some embodiments, rather than query the location server 170 for the location reference of the UE 200, the access network node 240 may assign the location reference itself without involvement of the location server 170 as previously described herein. The access network node 240 may cipher the UE reference portion of the location reference and/or digitally sign the location reference as also described herein. In this case, any cipher/decipher keys and/or keys for a digital signature may be known to both the access network node 240 and the location server 170, but not to other parties.

The messages at 206A, 208A and 212A are illustrated as optional (indicated by the dashed lines) in FIG. 2A because they need not occur at the specific times illustrated in FIG. 2A. Rather, as one example, 206A and 212A (and optionally 208A) may be performed during the attachment at 202A and possibly prior to the user making an emergency call at 204A, such as immediately after the UE 200 has successfully attached to the access network node 240 and been authenticated, or as part of an attachment and/or authentication message exchange between UE 200 and access network node 240. For example, UE 200 may include a request for a location reference in a message sent to access network node 240 to request, respond to, or confirm attachment of UE 200 or authentication of UE 200. Similarly, access network node 240 may include an assigned location reference in a message sent to UE 200 to request, respond to, or confirm attachment of UE 200 or authentication of UE 200.

As another example, 206A and 212A (and optionally 208A) may be performed periodically while the UE 200 is attached to the access network node 240, and not in response to the user making an emergency call. For example, 206A, 212A, and possibly 208A may be performed whenever UE 200 and access network node 240 need to interact to support mobility for UE 200. In another example, 206A, 212A, and possibly 208A, may be performed whenever UE 200 changes to a new access network node (e.g., changes from a previous access network node to access network node 240 or from access network node 240 to a new access network node). As yet another example, 206A and 212A may correspond to some other existing interaction between the UE 200 and the access network node 240, such as a tracking area update for LTE or a routing area update for GPRS and/or UMTS. Alternatively, as illustrated in FIG. 2A, 206A and 212A may comprise new messages used only to obtain the location reference.

In some embodiments, prior to sending the location reference to the UE 200 at 212A, the access network node 240 may authenticate the identity of the UE 200 (not shown in FIG. 2A). Such authentication may ensure that the location reference is returned at 212A to the correct UE 200. Further, such authentication of UE 200 may form a normal part of supporting access by UE 200 to services provided by access network node 240 (e.g., such as support of network attachment and mobility for UE 200) any may not add additional impacts to UE 200 or to access network node 240 solely for the purpose of returning a location reference at 212A.

At 214A, the UE 200 sends an emergency call request, including the location reference of the UE 200, to the OTT SP 150. In some embodiments, the emergency call request may be transferred by UE 200 to the OTT SP 150 via the access network node 240 and/or via the access network for the access network node 240. Although not illustrated in FIG. 2A, the UE 200 could obtain the location reference from an access network node 240 for a first access network belonging to a first network operator (who may also own location server 170) and/or conforming to a first radio access technology (RAT), and send the emergency call request containing the location reference to the OTT SP 150 via a second access network belonging to a second network operator and/or conforming to a second RAT. In that way, the location reference may be shared between and/or may be valid for multiple access networks, multiple RATs, and/or multiple network operators and may enable the UE 200 to use the same location reference after handoff to a new RAT or to a new network and/or when accessing several networks or several RATs at the same time. For example, the UE 200 could obtain the location reference from a base station or other serving node (e.g., an MME) belonging to a cellular access network belonging to a network operator A, and send the emergency call request, including the location reference, to a WiFi access point in a WLAN access network belonging to a network operator B (where operator A may or may not be the same as operator B), which would forward the emergency call request to the OTT SP 150.

At 216A, the OTT SP 150 sends a location request (or a location dereferencing request), including the location reference received from the access network node 240 in 214A, to the location server 170. The OTT SP 150 may identify the location server 170 (e.g., identify an address or a path name for the location server 170) from the content of the location reference received at 214A. The location server 170 may verify that the location reference received at 216A is valid by verifying that the location reference corresponds to a location reference previously assigned by location server 170 (e.g., assigned as part of block 208A if block 208A occurs). For example, the location server 170 may verify that the UE reference in the location reference was previously assigned by location server 170 to identify UE 200. Alternatively, if the location reference received at 216A was assigned by access network node 240 and not by location server 170 (e.g., such as occurs if block 208A is not present), location server 170 may verify that access network node 240 assigned the location reference by verifying any digital signature, if present in the location reference, and/or by deciphering the UE reference portion of the location reference and verifying that the deciphered UE reference portion correctly conforms to any formatting or encoding rules for a valid UE reference.

At 218A, the location server 170 (or a GMLC associated with or connected to the location server 170 in the case that the location server 170 is an LRF) may send a location request to the access network node 240 for the location of the UE 200 and may include an identification for UE 200 in the location request which may be (i) an identification for UE 200 received earlier at 208A if 208A occurs and location server 170 had assigned the location reference received at 216A or (ii) part or all of a UE reference or deciphered UE referenced received as part of a location reference at 216A if access network node 240 rather than location server 170 had assigned the location reference. The access network node 240 may then obtain a location estimate for UE 200 (as identified by location server 170 at 218A) from another entity (not shown in FIG. 2A). For example, access network node 240 may request a location estimate from another location server (e.g., E-SMLC 172) or another location capable entity (e.g., RAN 120) or from a base station or AP serving UE 200, Alternatively, access network node 240 may already have location information for UE 200 itself (e.g., if access network node 240 is a base station or WiFi AP serving UE 200). The access network node 240 may then return the location estimate for UE 200 to location server 170 (or to a GMLC associated with or connected to the location server 170 in the case that the location server 170 is an LRF) as part of 218A. In some embodiments, block 218A may occur when location server 170 employs a control plane location solution to obtain the location of UE 200.

Instead of, or in addition to, querying the access network node 240 for the location of the UE 200 at 218A, the location server 170 may query the UE 200 directly at 222A. For example, 222A may occur if location server 170 is a SUPL SLP, or an LRF connected to or associated with an SLP, where the SLP instigates a SUPL user plane location session at 222A with UE 200 in order to obtain location related measurements from UE 200 (e.g., measurements of GPS or GNSS satellites and/or measurements of base stations and/or APs in the access network for UE 200) that location server 170 can use to determine a location for UE 200. For example, UE 200 may provide GPS and Observed Time Difference Of Arrival (OTDOA) measurements to location server 170. OTDOA is a multilateration method in which the UE 200 measures the time difference between specific signals from pairs of base stations and reports the measured time differences to the location server 170, which then computes the UE 200's location. Alternatively, location server 170 (or an SLP associated with or connected to the location server 170 in the case that the location server 170 is an LRF) may instigate a SUPL session with UE 200 at 222A to obtain a location of UE 200 from UE 200 wherein UE 200 obtains the location from location related measurements such as GPS, GNSS and/or OTDOA measurements. At 224A, the location server 170 sends the location of the UE 200, as obtained at 218A and/or at 222A, to the OTT SP 150. In some embodiments, the OTT SP 150 and location server 170 may employ one of SIP, HELD, or MLP at 216A and 224A to request and return the location of UE 200. In some of these embodiments where SIP or HELD is used, the use of SIP or HELD may be defined as part of the location reference.

The message flows at 216A to 224A may occur at the times illustrated in FIG. 2A to enable the OTT SP 150 to obtain the location of UE 200 to assist routing of the emergency call (e.g., by determining a PSAP 180 with an emergency services coverage that includes the location of UE 200) and/or to provide the location of UE 200 to the ESInet 160 or the PSAP 180. The message flows at 216A to 224A are optional because they may alternatively, or additionally, occur after the emergency call initiated at 204A is setup (i.e., after 228A) if the OTT SP 150 receives a location request for UE 200 from the PSAP 180 and needs to query the location server 170 to obtain and return the current location of UE 200 (not shown in FIG. 2A). In addition, message flows analogous to 216A to 224A may occur (instead of or in addition to the message flows at 216A to 224A) to enable the ESInet 160 or the PSAP 180 to directly request the location of the UE 200 from the location server 170. These analogous message flows may be identical or nearly identical to 216A to 224A except that ESInet 160 or PSAP 180 may replace OTT SP 150 in the message flows in terms of sending the location request at 216A and receiving the location response at 224A.

Returning to the emergency service call shown in FIG. 2A, at 226A, the OTT SP 150 routes the emergency call to the appropriate ESInet 160, or possibly to an SR 160 if the OTT SP converts the call into a CS emergency call. The ESInet 160 (or an SR 160) routes the emergency call to the appropriate PSAP 180. The emergency call requests sent at 226A may include the location reference of the UE 200 obtained at 214A. The OTT SP 150 may use the location of the UE 200 obtained at 224A, if performed, to route the emergency call initiated at 204A to the appropriate ESInet 160 (or to SR 160). The ESInet 160 may use the location reference of the UE 200 received in the emergency call request to obtain a location for the UE 200 from location server 170 by performing steps analogous to 216A to 224A as already described. The ESInet 160 may then use this obtained location to route the emergency call to the appropriate PSAP 180.

At 228A, the various network entities (e.g., UE 200, OTT SP 150, ESInet 160, and PSAP 180) perform the remainder of the emergency call establishment. At 232A, the PSAP 180 sends a location request, including the location reference received at 226A, to the location server 170. The location server 170 uses the location reference to lookup the location of the UE 200 (e.g., lookup the location obtained previously at 218A and/or 222A) and responds with the location of the UE 200. Alternatively, the location server 170 may obtain the location of the UE 200 by performing steps (not shown in FIG. 2A) that are the same as those illustrated at 218A and/or 222A.

Figure 2B:
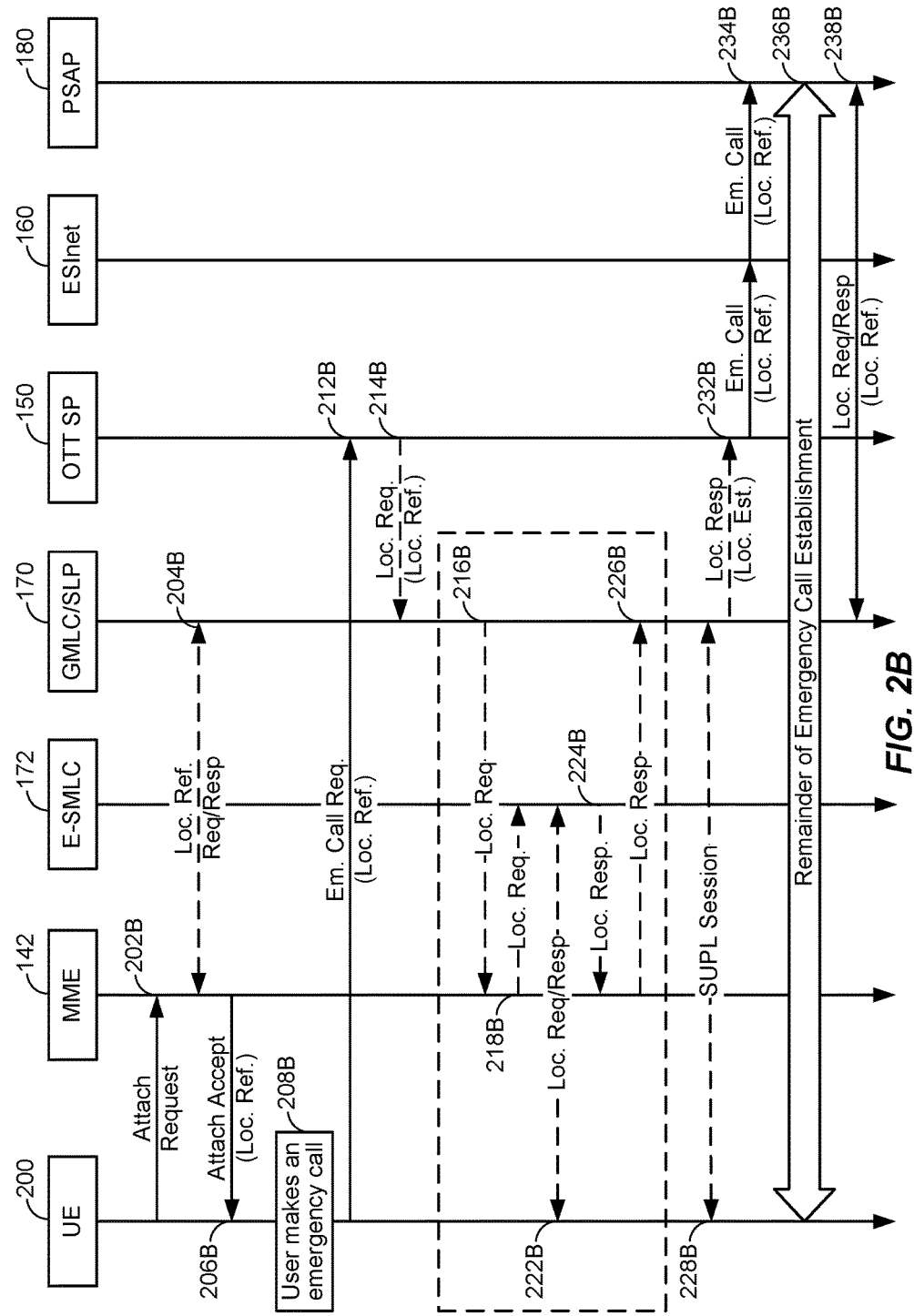
FIG. 2B illustrates specific interactions of the network entities illustrated in FIG. 1B to provide a location by reference according to at least one aspect of the disclosure.

Referring back to FIG. 1B, FIG. 2B illustrates specific interactions of the entities illustrated in FIG. 1B to provide a location by reference for an OTT emergency call according to the embodiments described herein. The interactions in FIG. 2B are similar to those described for FIG. 2A but refer specifically to a UE 200 with LTE access. In contrast, the interactions described in association with FIG. 2A may apply to a UE 200 with any type of wireless or wireline access including, but not limited to, LTE access.

At 202B, the UE 200 attaches to an LTE capable serving network and as part of the attachment procedure sends a NAS Attach Request to the serving MME 142. The NAS Attach Request includes a request for a location reference in some embodiments. At 204B, the MME 142 may optionally send a location reference request to the GMLC/SLP 170. GMLC/SLP 170 may be a GMLC if the location of UE 200 will be obtained using a control plane location solution, may be an SLP if the location of UE 200 will be obtained using SUPL, may be a combined GMLC and SLP if either or both of control plane location and SUPL will be used to obtain a location for UE 200, or may be an LRF with a connection to or association with a GMLC and/or SLP. When 204B is performed, the MME 142 acts as a proxy to obtain the location reference from the GMLC/SLP 170 on behalf of the UE 200. While this adds a new interface between the MME 142 and the GMLC/SLP 170, it avoids the need for the UE 200 to obtain the location reference from GMLC/SLP 170 and avoids the need for GMLC/SLP 170 to authenticate UE 200 as part of a request from UE 200 to obtain a location reference.

The request/response in block 204B may use a secure connection between the GMLC/SLP 170 and MME 142 that enables GMLC/SLP 170 to be aware that an MME (e.g., belonging to the same operator or SP as for GMLC/SLP 170) is requesting the location reference. The secure connection between GMLC/SLP 170 and MME 142 may make use of a trusted relationship between GMLC/SLP 170 and MME 142, for example, a relationship based on MME 142 and GMLC/SLP 170 belonging to the same SP or same network operator, and may employ preconfigured security credentials in each entity to enable the establishment of the secure connection. The GMLC/SLP 170 may then assign and return a location reference (e.g., that may include a UE reference that is local to the GMLC/SLP 170) that will later allow the GMLC/SLP 170 to provide a location for the UE 200 to another entity, for example, at blocks 214B and 232B described below. In some embodiments, MME 142 and GMLC/SLP 170 may use one of SIP, HELD, or the Mobile Location Protocol (MLP) defined by OMA to request and return the location reference at 204B.

At 206B, the MME 142 sends the location reference obtained from the GMLC/SLP 170 to the UE 200 in a NAS Attach Accept message. The NAS Attach Request at 202B and the NAS Attach Accept at 206B may be as defined in 3GPP TS 23.401 and TS 24.301, with the addition of a location reference request parameter in a NAS Attach Request and/or a location reference parameter in a NAS Attach Accept. In some embodiments, blocks 204B and 206B may only be performed when the NAS Attach Request at 202B contains a request for a location reference. In other embodiments, blocks 204B and 206B may be performed when the NAS Attach Request at 202B does not contain a request for a location reference.

Alternatively, rather than query the GMLC/SLP 170 for the location reference of the UE 200 at 204B, the MME 142 may assign the location reference itself without involvement of the GMLC/SLP 170 as described above. The MME 142 can include the known address of the GMLC/SLP 170 in the location reference, an identification for the protocol to be used to query the GMLC/SLP 170 from a client, and a UE reference to identity the UE 200 (e.g., the IP address of the UE 200, IMSI of the UE 200, TMSI of the UE 200, a local address for the UE 200 assigned by the MME 142, an address of the MME 142, or any combination thereof). The MME 142 can cipher the UE reference to protect user privacy. In this case, the cipher keys will be known to the MME 142 and the GMLC/SLP 170, but not to other parties. The MME 142 can also digitally sign the location reference so that the GMLC/SLP 170 will know that the location reference was assigned by the MME 142, or at least was assigned by some entity managed by the operator or SP for the GMLC/SLP 170.

In addition to or instead of obtaining the location reference at 206B, the UE 200 may obtain the location reference after the user of UE 200 initiates an emergency call (208B), periodically while the UE 200 is attached to the MME 142, and/or during some other interaction between the UE 200 and the MME 142, as discussed above with reference to FIG. 2A.

Instead of sending the NAS Attach Request at 202B and the NAS Attach Accept at 206B to obtain a location reference, the UE 200 may send a NAS Tracking Area Update Request at 202B and, after obtaining or assigning a location reference (e.g., at 204B), the MME 142 may send a NAS Tracking Area Update Accept at 206B containing the location reference. The NAS Tracking Area Update Request at 202B and the NAS Tracking Area Update Accept at 206B may be as defined in 3GPP TS 23.401 and TS 24.301 with the addition of a location reference request in a NAS Tracking Area Update Request and/or a location reference in a NAS Tracking Area Update Accept.

In some embodiments, prior to sending the location reference to the UE 200 in a NAS Attach Accept or NAS Tracking Area Update Accept at 206B, the MME 142 may authenticate the identity of the UE 200 (not shown in FIG. 2B). Such authentication may ensure that the location reference is returned at 206B to the correct UE 200. Further, such authentication of UE 200 may form a normal part of supporting a UE 200 attachment or UE 200 tracking area update by UE 200 and MME 142, any may not add additional impacts to UE 200 or MME 142 solely for the purpose of returning a location reference at 206B.

For access networks that support GSM or UMTS instead of LTE, the procedure in FIG. 2B may be used to support an OTT emergency call as described herein for an LTE network but with E-SMLC 172 replaced by a GSM or UMTS RAN and MME 142 replaced by a Serving GPRS Support Node (SGSN). In that case, the UE 200 would send either a GPRS Attach Request or a GPRS Routing Area Update Request to the SGSN at 202B that may contain a request for a location reference, and the SGSN would respond with either a GPRS Attach Accept or a GPRS Routing Area Update Accept, respectively, at 206B. In this case, the GPRS Attach Request or GPRS Routing Area Update Request at 202B and the GPRS Attach Accept or GPRS Routing Area Update Accept at 206B may be as defined in 3GPP TS 24.008, with the addition of a location reference request in a GPRS Attach Request or GPRS Routing Area Update Request and/or a location reference in a GPRS Attach Accept or GPRS Routing Area Update Request.

At 208B, the user of UE 200 makes an emergency call via an OTT application, such as Skype™, installed on the UE 200. At 212B, the UE 200 sends an emergency call request, including the location reference obtained at 206B, to the OTT SP 150. For example, the UE 200 may send the emergency call request to the OTT SP 150 via eNB 124, S-GW 146, PDG 148 and Internet 175. In an embodiment, the UE 200 could obtain the location reference from the MME 142 as described above and send the emergency call request containing the location reference to the OTT SP 150 at 212B via a different access network than the access network that contains MME 142 and that is associated with GMLC/SLP 170. For example, the different access network may support a RAT different to LTE (e.g., WiFi). In that way, the location reference may be shared between different access networks and possibly between different RATs at the UE 200. For example, the UE 200 could send the emergency call request, including the location reference, to the OTT SP 150 via a WLAN access point.

At 214B, the OTT SP 150 sends a location request, including the location reference obtained at 212B, to the GMLC/SLP 170. The OTT SP 150 may identify the GMLC/SLP 170 (e.g., identify an address or a path name for the GMLC/SLP 170) from the content of the location reference received at 212B. The GMLC/SLP 170 may verify that the location reference received at 214B is valid by verifying that the location reference corresponds to a location reference previously assigned by the GMLC/SLP 170 (e.g., assigned as part of block 204B if block 204B occurs). For example, the GMLC/SLP 170 may verify that the UE reference in the location reference was previously assigned by GMLC/SLP 170 to identify UE 200. Alternatively, if the location reference received at 214B was assigned by MME 142 and not by GMLC/SLP 170 (e.g., such as occurs if block 204B is not present), GMLC/SLP 170 may verify that MME 142 assigned the location reference by (i) verifying any digital signature, if present in the location reference, (ii) deciphering the UE reference portion of the location reference and verifying that the deciphered UE reference portion correctly conforms to any formatting or encoding rules for a valid UE reference, and/or (iii) verifying that the location reference conforms to known formatting rules (e.g., contains a UE reference whose length and/or character content conform to known rules).

If the control plane location solution is being utilized (meaning GMLC/SLP 170 is or contains a GMLC or is an LRF connected to or associated with a GMLC), then the message flows at 216B to 226B are performed (as indicated by the dashed box). Specifically, at 216B, the GMLC 170 sends a location request for the UE 200 to the MME 142. The GMLC 170 may determine the address or identity of MME 142 in order to correctly send the request at 216B from the content of the UE reference in the location reference received at 214B (e.g., if MME 142 or GMLC 170 included the MME 142 address or identity in the location reference). Alternatively, GMLC 170 may query a Home Subscriber Server (HSS) for UE 200 for the address of MME 142 (not shown in FIG. 2B) using an identifier (e.g., IMSI) for UE 200 received at 214B in the UE reference portion of the location reference. The GMLC includes an identity for UE 200 in the location request sent at 216B that was either included in the UE reference portion of the location reference received at 214B or was previously received at 204B and stored by GMLC 170 in the case that GMLC 170 assigns the location reference.

At 218B, the MME 142 sends a location request for the UE 200 to the E-SMLC 172 and may include any identity for the UE 200 received at 216B or already known to MME 142. At 222B, the E-SMLC 172 may instigate a 3GPP LTE Positioning Protocol (LPP) location session with UE 200 and as part of this session may send a location request to the UE 200, which responds with location information. The location information provided by the UE 200 may comprise GPS location measurements, GNSS location measurements, OTDOA measurements, Enhanced Cell ID (ECID) measurements, WiFi location measurements, Bluetooth (BT) location measurements or any combination of these, or may contain a location estimate for UE 200 obtained by UE 200. When the location information comprises location measurements but not a location estimate, E-SMLC 172 may compute a location estimate for UE 200 from these measurements. Instead of, or in addition to, 222B, E-SMLC 172 may send a location request (not shown in FIG. 2B) to a serving eNB for UE 200 (e.g., eNB 124 in FIG. 2B) in order to obtain a location estimate or measurements from which E-SMLC 172 can determine a location estimate for UE 200. At 224B, the E-SMLC 172 may send a location response, including the location of the UE 200, to the MME 142. At 226B, the MME 142 sends a location response, including the location of the UE 200 received at 224B, to the GMLC 170.

Alternatively, if the SUPL user plane location solution is being utilized (meaning the GMLC/SLP 170 is or contains an SLP or is an LRF associated with or connected to an SLP), then the message flows at 216B to 226B may not be performed, and instead (or possibly in addition), a SUPL session is established between the SLP 170 and the UE 200 at 228B. The SLP 170 can obtain the location of the UE 200 via the SUPL session (e.g., from GPS, GNSS, OTDOA, ECID, WiFi and/or BT measurements obtained by UE 200). The message flows at 216B to 228B are illustrated with dashed lines because in some embodiments either the message flows at 216B to 226B are performed or the message flow at 228B is performed, but not both. At 232B, the GMLC/SLP 170 sends the location estimate of the UE 200 to the OTT SP 150.

The message flows at 214B to 232B (e.g., either (a) 214B to 226B and 232B or (b) 214B, 228B, and 232B) may occur at the times illustrated in FIG. 2B to enable the OTT SP 150 to obtain the location of UE 200 to assist in routing the emergency call (e.g., by determining a PSAP 180 with an emergency services coverage that includes the location of UE 200) and/or to provide the location of UE 200 to the ESInet 160 or the PSAP 180. The message flows at 214B to 232B may alternatively, or additionally, occur after the emergency call initiated at 208B is setup (i.e., after 236B) if the OTT SP 150 receives a location request for UE 200 from the PSAP 180 and needs to query the GMLC/SLP 170 to obtain and return the current location of UE 200 (not shown in FIG. 2B). In addition, message flows analogous to 214B to 232B may occur (instead of or in addition to the message flows at 214B to 232B) to enable the ESInet 160 or the PSAP 180 to directly request the location of the UE 200 from the GMLC/SLP 170. These analogous message flows may be identical or nearly identical to 214B to 232B except that ESInet 160 or PSAP 180 may replace OTT SP 150 in the message flows in terms of sending the location request at 214B and receiving the location response at 232B.

Returning to the emergency service call shown in FIG. 2B, at 234B, the OTT SP 150 routes the emergency call to the appropriate ESInet 160 or possibly to an SR 160 if the OTT SP 150 needs to convert the call into a CS emergency call. ESInet 160 (or an SR 160) then routes the emergency call to the appropriate PSAP 180. These emergency call requests sent at 234B may include the location reference of the UE 200 obtained at 212B. The OTT SP 150 may use the location of the UE 200 obtained at 232B, if performed, to route the emergency call initiated at 208B to the appropriate ESInet 160 (or SR 160). The ESInet 160 may use the location reference of the UE 200 received in the emergency call request to obtain a location for the UE 200 from the GMLC/SLP 170 by performing blocks analogous to 214B to 232B as described above. The ESInet 160 may then use this obtained location to route the emergency call to the appropriate PSAP 180.

At 236B, the various network entities (e.g., UE 200, OTT SP 150, ESInet 160, and PSAP 180) perform the remainder of the emergency call establishment. At 238B, the PSAP 180 sends a location request, including the location reference received at 234B, to the GMLC/SLP 170. The GMLC/SLP 170 uses the location reference to lookup the location of the UE 200 (e.g., lookup the location obtained previously at 226B and/or 228B) and responds with the location of the UE 200. Alternatively, the GMLC/SLP 170 may obtain the location of the UE 200 by performing blocks (not shown in FIG. 2B) that are the same as those illustrated at 216B to 226B and/or 228B.

Figure 3:
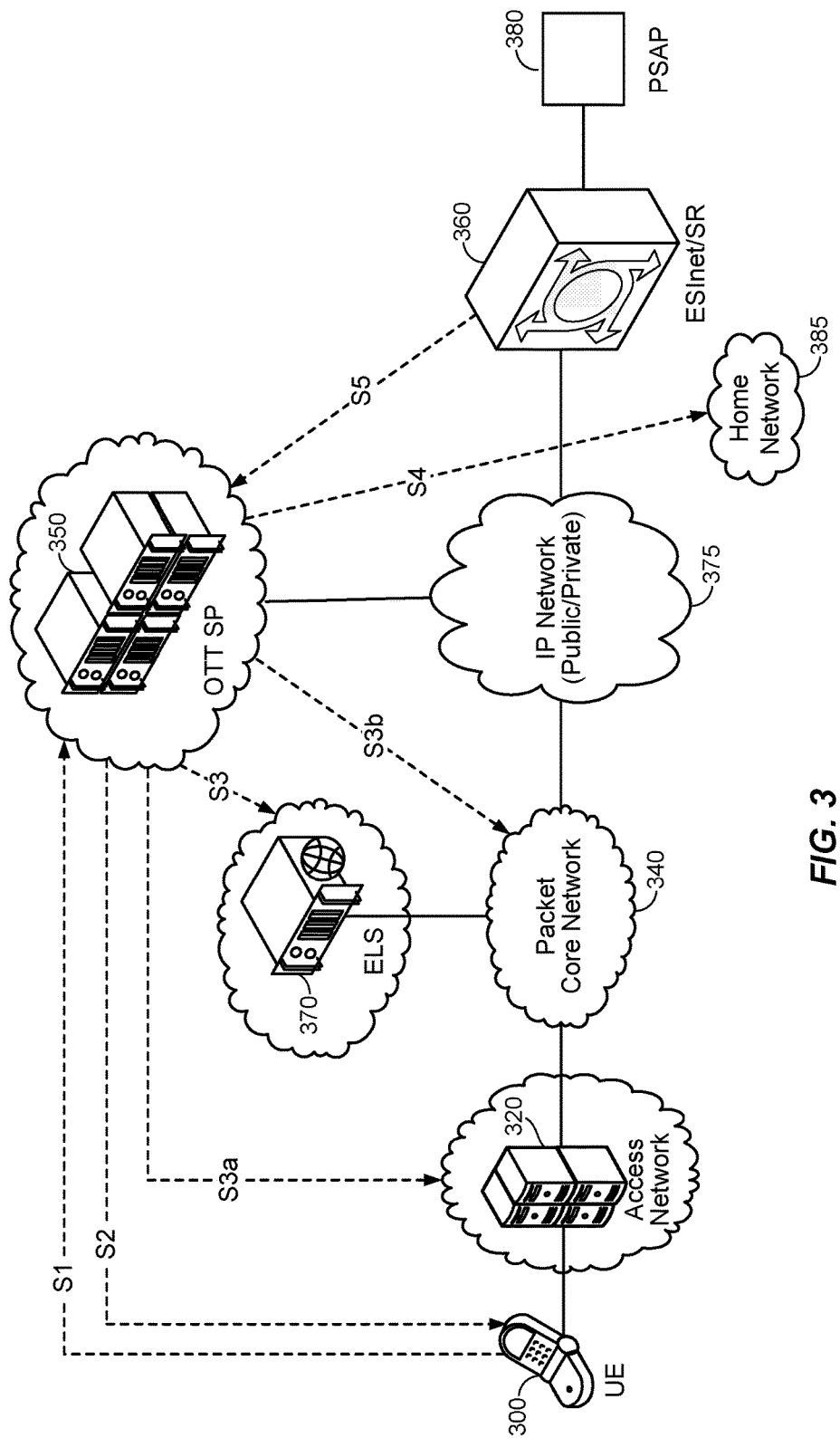
FIG. 3 illustrates an exemplary architecture for providing emergency services according to at least one aspect of the disclosure.

FIG. 3 illustrates an exemplary architecture for providing emergency services over an OTT service provider showing alternative location solutions according to at least one aspect of the disclosure. The architecture illustrated in FIG. 3 includes a UE 300 (which may correspond to UE 200), an access network 320 (which may correspond to RAN 120), a packet core network 340 (which may correspond to core network 140), an OTT SP 350 (which may correspond to OTT SP 150), an ESInet/SR 360 (which may correspond to ESInet/SR 160), an emergency location server (ELS) 370 (which may correspond to E-SMLC 172, GMLC/SLP 170 or location server 170), an IP Network 375 (which may correspond to the Internet 175), a home network 385 which may be a home network for UE 300 and a PSAP 380 (which may correspond to PSAP 180).

FIG. 3 shows various alternative solutions, labelled S1, S2, S3, S3*a*, S3*b*, S4 and S5, for transferring the location of a UE 300 that has invoked an emergency service (e.g., emergency voice call, emergency text message session) to or from an OTT SP 350. For each solution, the OTT SP may be responsible for invocation and routing of an emergency service call into the emergency services network (e.g., to an ESInet or directly to a PSAP).

For the solution S1, the UE 300 can push a location suitable for routing (and possibly dispatch) to the OTT SP 350. The location may be either a location by value (LbyV) or a location by reference (LbyR) and may be obtained from a location server (e.g., ELS 370) or may be determined solely by the UE 300 in the case of location by value. In the location by reference case, the UE 300 may send a request for a location reference to the location server, and then send the received location reference (in the form of a location URI) to the OTT SP 350. The OTT SP 350 may then perform dereferencing (e.g., using HELD) by requesting a location value from the location server (e.g., ELS 370) that assigned the location URI.

With solution S2, the OTT SP 350 can query the UE 300 for the UE 300's location, for example, after receiving an emergency service call invocation from the UE 300 in a SIP INVITE message. The query may use in-service signaling (e.g., a request via a SIP INFO message) or out-of-service signaling (e.g., a request via a separate data or signaling path). The UE 300 may return the location to the OTT SP 350 using means analogous to the request, for example, in-call signaling if the request used in-call signaling. The location information that is returned can be the same as for solution S1, for example, either an LByV or LbyR.

With solution S3, after receiving an emergency service call invocation from the UE 300 (e.g., in a SIP INVITE), the OTT SP 350 can query the ELS 370 which may be in or associated with the access network 320 or PCN 340, for example. The OTT SP 350 may in some cases determine the access network 320, the PCN 340 and/or the ELS 370 using the IP address of the UE or an identifier for the access network 320 or the PCN 340 provided by the UE 300 to the OTT SP 350. For example, in the case of the IP address, known ranges of IP addresses or particular sub-fields in an IP address may be configured by the OTT SP 350 (e.g., in a call server) and mapped to particular access networks and PCNs. In variants S3*a* and S3*b* of the solution S3, the OTT SP 350 may send a location request for the UE 300 to the access network 320 and PCN 340, respectively, for onward forwarding to a location server (e.g., the ELS 370).

With solution S4, after receiving an emergency service call invocation from UE 300 (e.g., in a SIP INVITE), the OTT SP 350 may query a location server or location service in the Home Network 385 for the UE 300. The UE 300 may be referenced using a global public identity (e.g., SIP URI, MSISDN, etc.). The OTT SP 350 may determine the Home Network 385 and location server or location service in the Home Network 385 using the global public identity. The Home Network 385 may know the general location of the UE 300 (e.g., from information received from the PCN 340 to support roaming) and/or can locate the UE 300 directly (e.g., using SUPL).

With solution S5, a PSAP 380 or the ESInet/SR 360 may query the OTT SP 350 for a location of UE 300 needed for routing or dispatch. The OTT SP 350 may use one of the other solution alternatives (S1, S2, S3, S3a, S3b, S4) to obtain a location by value (e.g., geographic location or civic location) for UE 300 or a location by reference for UE 300 and may then return this to the PSAP 380 or ESInet/SR 360. If a location by reference is returned, the PSAP 380 or ESInet/SR 360 would need to query the location server (e.g., ELS 370) that assigned the location by reference in the access network 320 or PCN 340 to obtain the location of the UE 300.

The location by reference solutions described previously in association with FIGS. 1A, 1B, 2A and 2B may be employed in combination with solutions S1, S2 and S5 described previously for FIG. 3. These location by reference solutions may reduce impacts to a UE such as UE 200 and UE 300 and to a location server such as location server 170 and ELS 370 to obtain a location reference as previously described. However, the solutions may not address other aspects of emergency call support by an OTT SP 150 or OTT SP 350 such as routing an emergency call to a PSAP (e.g., PSAP 180 or PSAP 380) and enabling a PSAP to request and obtain a location for a UE 200 or UE 300 that can be used for PSAP dispatch. To address these other aspects of emergency call support, further location solutions are described next that may differ in some respects from the location solutions described in association with FIGS. 1A-2B. These further location solutions may provide extensions to the solutions S1 and S2 described previously—e.g., which may enable location related information to be provided to the OTT SP 350 in addition to or instead of an LbyV or LByR. For solutions S1 and S2 of FIG. 3, it is assumed that the location server (ELS) 370 is used to provide a location by value or location by reference for the UE 300. The ELS 370 may correspond to one of several different location servers in different network architectures (e.g., ELS 370 could be an E-SMLC 172, a GMLC 170, an SLP 170 or an LRF). Associating ELS 370 with an LRF may be particularly useful since an LRF is defined to support an external interface for location dereferencing (e.g., in 3GPP TS 23.167 and in the ATIS standard ATIS-0700015) and could have access to location determination capability inside the PCN 340 and/or AN 320 using a control plane location solution and/or user plane location solution.

Solutions S1 and S2 of FIG. 3 can be considered as complimentary to one another and could both be supported. For example, solution S1 may be used when the UE 300 detects that a user is invoking an emergency call and has time to obtain some location information prior to sending an emergency call request to the OTT SP 350. Solution S2 may be used when the UE 300 does not detect that a user is invoking an emergency call or does not have enough time to obtain location information prior to sending an emergency service request to the OTT SP 350.

Enhancements for solutions S1 and S2 of FIG. 3 may need to solve several sets of problems when supporting location and routing by a serving MNO on behalf of an emergency call that was initially sent by a UE 300 to an OTT SP 350. These various sets of problems are described and exemplified next.

Problem Set 1: Legacy PSAPS

There may be problems associated with supporting location and routing for an emergency call that needs to be sent to a legacy PSAP 380, when the legacy PSAP 380 is not supported by an ESInet 360 (e.g., but may instead be supported by an SR 360). One problem may be that a legacy PSAP 380 may not be able retrieve a location for a UE 300 from an OTT SP 350 using the E2 interface defined in joint TIA and ATIS standard J-STD-036, which may occur if the OTT SP 350 is in a different country to the UE 300 and the PSAP 380 or if the PSAP 380 does not have a communications relationship with the OTT SP 350. Note that the E2 interface is commonly used for location retrieval by a legacy PSAP in the case of an emergency call instigated via a public wireless network in North America where the emergency call is routed to a legacy PSAP. A second problem may be that it may not be possible for an OTT SP 350 to send a LbyV to a legacy PSAP 380 as part of call signaling (e.g., if the emergency call for a UE 300 is routed through an SR 360 that uses an MF trunk to reach the PSAP 380). A third problem may be that a legacy PSAP 380 (or an ALI associated with a legacy PSAP 380) may not normally support dereferencing of a LbyR in the case that the OTT SP 350 provides a LbyR rather LbyV to the PSAP 380.

The above three problems may mean that any enhancement of solutions S1 and S2 based only on provision of an LbyV or LbyR to an OTT SP 350 may not support provision of a dispatchable location to a legacy PSAP 380, when the legacy PSAP 380 is not supported by an ESInet 360 (e.g., but is only supported by an SR 360).

Problem Set 2: Control Plane Location in a Serving MNO

With the 3GPP control plane location solution for LTE or HSPA access (e.g., as defined in 3GPP TSs 23.271, 25.305 and 36.305), the identity of the current serving MME or serving SGSN, for a UE 300 that is making an emergency call, needs to be known at an LRF or GMLC in order to route a request for a UE 300 location to the correct serving MME or serving SGSN. For emergency calls that are established by a serving MNO without involvement of an OTT SP (e.g., as described in ATIS-0700015), this information may be kept updated in the LRF and GMLC (that are being used to support location for the emergency calling UE 300) by the serving MME or serving SGSN when the UE 300 establishes an emergency PDN connection or emergency PDP context (e.g., as part of establishing the emergency call), and by the new or previous MME or SGSN when handover occurs. However, for an emergency call that is established through an OTT SP 350, the serving MNO may not be aware of the emergency call and thus the LRF (and GMLC) may not be kept updated with the identity of the serving MME or serving SGSN. Without this information, a GMLC may not be able to route a location request to the correct serving MME or serving SGSN. This means that when servicing a location dereferencing request for a UE 300 from an OTT SP 350, an ELS 370 (e.g., LRF) may not be able to use a control plane solution to obtain the UE 300's location—except possibly in the case of a home subscriber when the ELS 370 has sufficient information to query this information from an HSS.

Problem Set 3: User Plane Location in a Serving MNO

When a UE 300 accesses an OTT SP 350 via a VPN that is intermediate between the serving MNO (e.g., the PCN 340) and the OTT SP 350, the IP address of the UE 300 that is seen by the OTT SP 350 may have been assigned by the VPN and may thus differ from any IP address assigned to the UE by the serving MNO (e.g., PCN 340). If an SLP in the serving MNO (e.g., the ELS 370) only accepts incoming location requests on behalf of UEs with IP addresses known to or assigned by the serving MNO, this could prevent use of SUPL location by the serving MNO if the VPN assigned IP address is included in a location request sent to the serving MNO (e.g., sent to the ELS 370) by the OTT SP 350. A similar problem may occur for a roaming UE 300 whose IP address is assigned by the home network 385 (e.g., where the PDN Gateway for LTE access is in the home network 385). However, in this case, a serving MNO (e.g., an SLP in the serving MNO) could be configured with the IP addresses (e.g., address ranges) assigned by roaming partners, such as home network 385, in which case use of user plane (e.g., SUPL) location could still be possible.

Problem Set 4: Routing of an Emergency Call to a PSAP

While an OTT SP 350 may be able to route an emergency call from a UE 300 to a PSAP 380 (e.g., via an IP Network 375 or via the PSTN) if the correct address or identity for the PSAP 380 is known (e.g., a SIP URL or telephone DN), some OTT SPs 350 may lack the ability to map a geographic location for a UE 300 into the address or identity of a PSAP 380 whose service area includes the location of the UE 300 address. For example, this lack of ability may occur if the OTT SP 350 is in a different country to both the UE 300 and the PSAP 380 and does not have an ability to obtain routing information for PSAPs in other countries—e.g., using the LoST protocol defined by IETF. In some cases, even if the PSAP 380 address or identity is known by an OTT SP 350, it may not be possible for the OTT SP 350 to forward an emergency call for a UE 300 to the PSAP 380 due to restrictions on emergency call ingress at the PSAP 380 side.

The problem sets 1 to 4 described and exemplified above may be resolved by particular enhancements to the solutions S1 and S2 referred to previously as described next.

Figure 4:
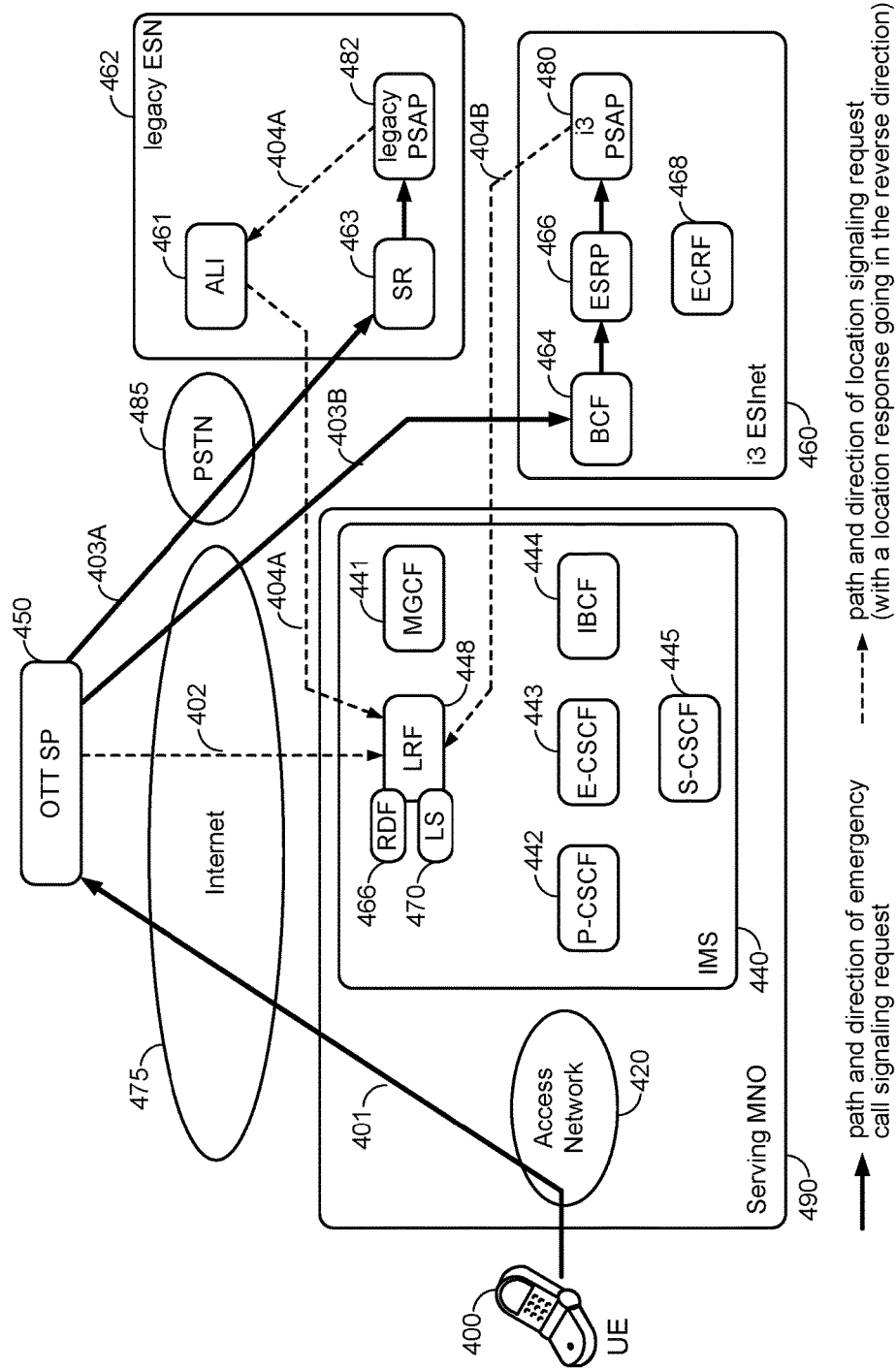
FIG. 4 illustrates an exemplary architecture for location by reference support according to at least one aspect of the disclosure.

FIG. 4 illustrates an exemplary architecture for location by reference support for emergency services over an OTT service provider according to at least one aspect of the disclosure. The architecture illustrated in FIG. 4 includes a UE 400 (which may correspond to UE 200 or UE 300), an access network 420 (which may correspond to RAN 120 or AN 320), an IMS 440 (which may correspond to part of core network 140 or part of PCN 340), an OTT SP 450 (which may correspond to OTT SP 150 or OTT SP 350), a NENA i3 capable ESInet 460 (which may correspond to ESInet 160 or ESInet 360), a Legacy ESN 462, the Internet 475, a PSTN 485, and a serving MNO 490 (which may correspond to CN 140 combined with AN 120 or to PCN 340 combined with AN 320). The IMS 440 includes an LRF 448 (which may correspond to location server 170 or ELS 370), an MGCF 441, a P-CSCF 442, an E-CSCF 443, an IBCF 444, and an S-CSCF 445. The LRF 448 may be connected to an RDF 446 and an LS 470 (which may correspond to location server 170 or GMLC/SLP 170). The i3 ESInet 460 includes a BCF 464, an ESRP 466, an ECRF 468, and a NENA i3 capable PSAP 480 (which may correspond to PSAP 180 or PSAP 380). The Legacy ESN 462 includes an ALI 461, a SR 463 (which may correspond to SR 160 or SR 360), and a Legacy PSAP 482 (which may correspond to PSAP 180 or PSAP 380). The various entities shown in FIG. 4 are well known in the art and are defined in 3GPP TSs (e.g., TSs 23.401, 23.167, 23.228), in the ATIS 0700015 standard, and in the NENA i3 standard.

With normal LbyR support, shown in FIG. 4 for solution S1, the UE 400 sends an emergency call request 401 to the OTT SP 450 containing a LbyR. The OTT SP 450 then dereferences the LbyR by sending a location query 402 to an ELS (e.g., the LRF 448 in the serving MNO 490) indicated by the LbyR received in the emergency call request 401. The ELS (shown as an LRF 448 in FIG. 4) obtains a location for the UE 400 and returns the location and/or routing information to the OTT SP 450. The OTT SP 450 then routes the emergency call to the PSAP (either the legacy PSAP 482 in the message 403A or the NENA i3 capable PSAP 480 in the message 403B) based on the routing information or the location received from LRF 448 and containing the originally received LByR. The PSAP 480/482 may then send a query 404A (for the PSAP 482) or 404B (for the PSAP 480) to the ELS (e.g., LRF 448) at a later time for a dispatchable location using the received LByR. As discussed for Problem Set 1 above, a location query 404A may not be possible for a legacy PSAP 482 unless the PSAP is supported by an ESInet.

The basic LbyR solution described above in association with FIG. 4 may be enhanced for solutions S1 and S2 of FIG. 3 to overcome the problems described above for problem sets 2 and 3. Specifically, a location URI that is assigned by the serving MNO 490 (e.g., by the LRF 448) as a LbyR for a UE 400 may be formatted to contain the following information:

a) a local IP address for the UE 400 if the serving MNO 490 will use user plane location to locate the UE 400 and if a local IP address was assigned to the UE 400 by the serving MNO 490;

b) a local identity of a serving MME (e.g., MME 142) or serving SGSN if the serving MNO 490 will use control plane location to locate the UE 400; and c) an identity for UE 400 (e.g., an MSISDN, IMSI, or a local ID assigned by the serving MME or SGSN) if the serving MNO 490 will use control plane location to locate the UE 400.

The information above in (a), (b) and (c) may be included as the part of the LbyR normally used as a local reference for the UE 400 and would allow LbyR assignment by the AN 420 or a PCN in the serving MNO 490 rather than by an ELS such as LRF 448 (e.g., as described previously in association with FIGS. 1A-2B), which may simplify implementation. The formatting of this information may be specific to the serving MNO 490 (e.g., may not be standardized). An ELS (e.g., the LRF 448) in the serving MNO 490 that receives such a location URI in a dereferencing request, such as the request 402, for a LbyR from an OTT SP 450 and knows the formatting rules for the LbyR may extract the information in (a)-(c) above and use it to invoke either control plane or user plane location of the UE 400. An added benefit is that the ELS does not need to maintain information for either the emergency call from UE 400 or UE 400 and can respond to each dereferencing request (e.g., the request 402) based solely on the information included in each such request.

The above enhancement, as described in association with FIG. 4, is referred to herein as "enhanced LbyR" and is illustrated later herein using additional figures, but may not solve all the problems in Problem Set 2 above. For example, even though the LbyR for UE 400 may contain the identity of the current serving MME or current serving SGSN for UE 400, the information may become out of date when the UE 400 is handed off to a new serving MME or SGSN, unless the UE 400 sends new information (e.g., a new LbyR) to the OTT SP 450 (e.g., in a SIP INFO), which then forwards this to the PSAP 480 or 482.

IMS support is another enhancement to the solutions S1 and S2 of FIG. 3 that may be used to solve all the problems described above for problems sets 1, 2, 3, and 4. With IMS support, the serving MNO can offer support as either an LRF, as described next in association with FIG. 5, or as an E-CSCF, as described later in association with FIG. 6.

Figure 5:
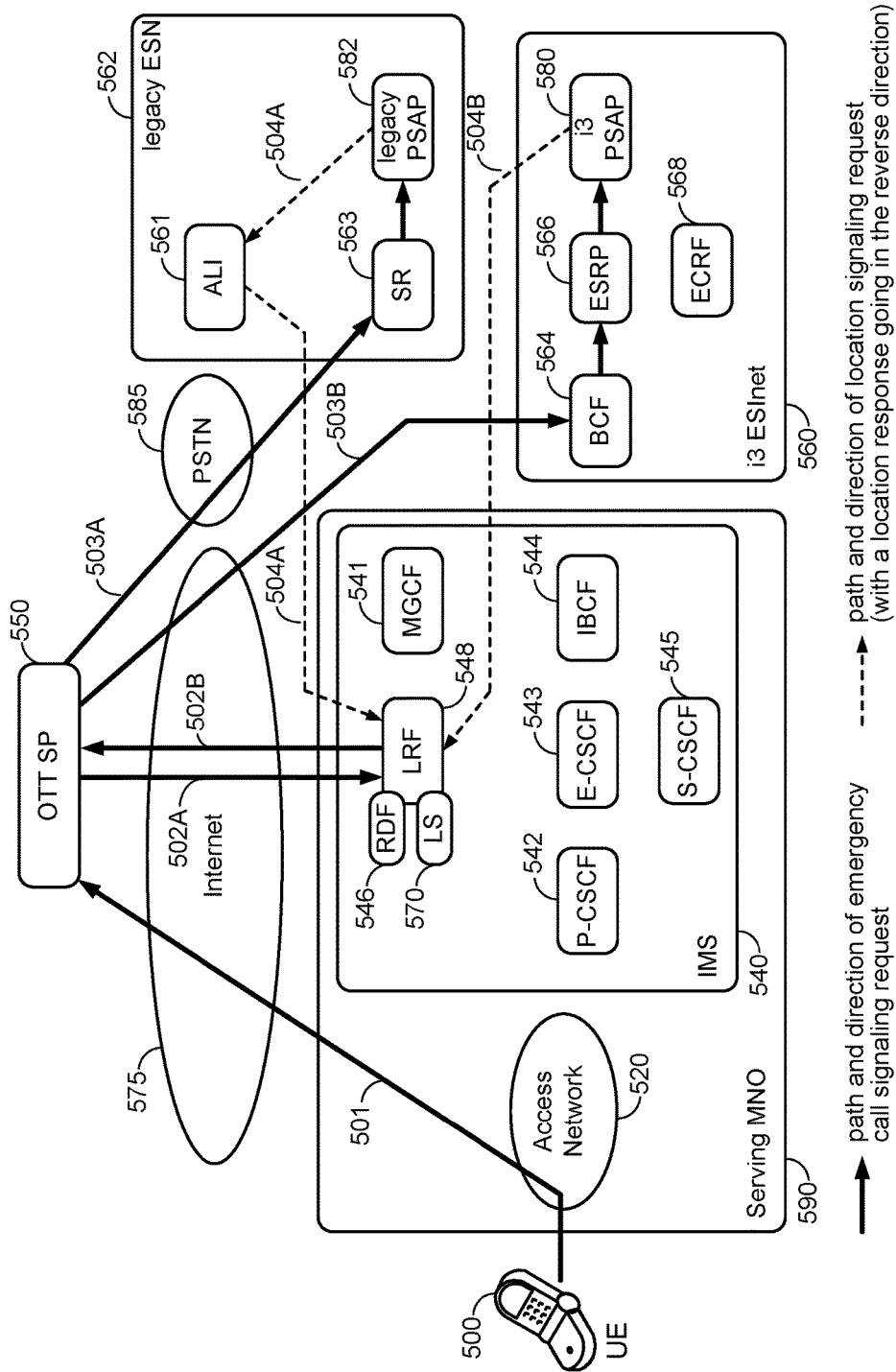
FIG. 5 illustrates an exemplary architecture for Internet Protocol (IP) Multimedia Subsystem (IMS) support for emergency services according to at least one aspect of the disclosure.

FIG. 5 illustrates an exemplary architecture for IMS LRF support for emergency services over an OTT service provider according to at least one aspect of the disclosure. Similar to the architecture illustrated in FIG. 4, the architecture illustrated in FIG. 5 includes a UE 500 (which may correspond to UE 200, UE 300 or UE 400), an access network 520 (which may correspond to RAN 120, AN 320 or AN 420), an IMS 540 (which may correspond to part of core network 140, part of PCN 340 or IMS 440), an OTT SP 550 (which may correspond to OTT SP 150, OTT SP 350 or OTT SP 450), a NENA i3 capable ESInet 560 (which may correspond to ESInet 160, ESInet 360 or ESInet 460), a Legacy ESN 562, the Internet 575, a PSTN 585, and a serving MNO 590 (which may correspond to CN 140 combined with AN 120, PCN 340 combined with AN 320, or MNO 490). The IMS 540 includes an LRF 548 (which may correspond to location server 170, ELS 370 or LRF 448), an MGCF 541, a P-CSCF 542, an E-CSCF 543, an IBCF 544, and an S-CSCF 545. The LRF 548 may be connected to an RDF 546 and an LS 570 (which may correspond to location server 170, GMLC/SLP 170 or LS 470). The i3 ESInet 560 includes a BCF 564, an ESRP 566, an ECRF 568, and a NENA i3 capable PSAP 580 (which may correspond to PSAP 180, PSAP 380 or PSAP 480). The Legacy ESN 562 includes an ALI 561, a SR 563 (which may correspond to SR 160, SR 360 or SR 463), and a Legacy PSAP 582 (which may correspond to PSAP 180, PSAP 380 or legacy PSAP 482). As for FIG. 4, the various entities shown in FIG. 5 are well known in the art.

With LRF support, shown in FIG. 5 for solution S1 of FIG. 3, an emergency call from UE 500 to PSAP 580 or PSAP 582 may be established similarly to the emergency call from UE 400 to PSAP 480 or PSAP 482 described in association with FIG. 4, and with messages 401, 402, 403A, 403B, 404A and 404B in FIG. 4 corresponding to messages 501, 502A, 503A, 503B, 504A and 504B, respectively, in FIG. 5. However, in the case of LRF support shown in FIG. 5, the interaction between the OTT SP 550 and the LRF 548 in the query 502A and response 502B does not use location dereferencing as in FIG. 4 but instead makes use of an LRF capability to support both location retrieval and routing of an emergency call. The OTT SP 550 initially receives an address of the LRF 548 in the serving MNO 590 from the UE 500 in the emergency call request 501 (which the UE 500 may obtain from the serving MNO AN 520 or a PCN in the serving MNO 590, for example, on network attachment). The OTT SP 550 then behaves similarly to an E-CSCF (e.g., for the ATIS-0700015 standard) and forwards the emergency call request in the form of a SIP INVITE 502A to the LRF 548, which obtains location and routing information similarly to that described for an LRF in ATIS-00700015 for the M1 interface. The LRF 548 then returns the location and routing information to the OTT SP 550 in the form of a SIP 300 Multiple Choices 502B (e.g., as occurs on the M1 interface in ATIS-0700015). The OTT SP 550 then routes the emergency call request to the PSAP (either the legacy PSAP 582 in the request 503A or the NENA i3 capable PSAP 580 in the request 503B) using the routing information and containing the location information received in the response 502B. The location information received in the response 502B may contain a LbyV, LbyR, ESRK, or ESRD plus MSISDN and can correspond to the reference identifier defined in ATIS-0700015. For the last three alternatives (i.e. LbyR, ESRK, or ESRD plus MSISDN), the PSAP 580/582 would typically send a query 504A (for PSAP 582) or query 504B (for PSAP 580) to the LRF 548 at a later time for a dispatchable location for the UE 500.

FIG. 5 shows the path and direction of the initial emergency call request message (e.g., a SIP INVITE) 501 from the UE 500 to the OTT SP 550, the path to the LRF 548 (for the forwarded SIP INVITE 502A) and back to the OTT SP 550 (for the SIP 300 Multiple Choices 502B) and the path and direction from the OTT SP 550 to the PSAP 580/582 for the forwarded emergency call request 503A and 503B. The Internet 575 may be used to convey the initial call request 501 from the serving MNO 590 to the OTT SP 550 and to convey the forwarded call request 503B from the OTT SP 550 to the ESInet 560, whereas the PSTN 585 may be used to convey a CS call request 503A from the OTT SP 550 to the SR 563 to reach the legacy PSAP 582. FIG. 5 also shows the path and direction for a location request 504A or 504B for the UE 500 sent by the legacy PSAP 582 or the NENA i3 PSAP 580, respectively, to the LRF 548.

Figure 6:
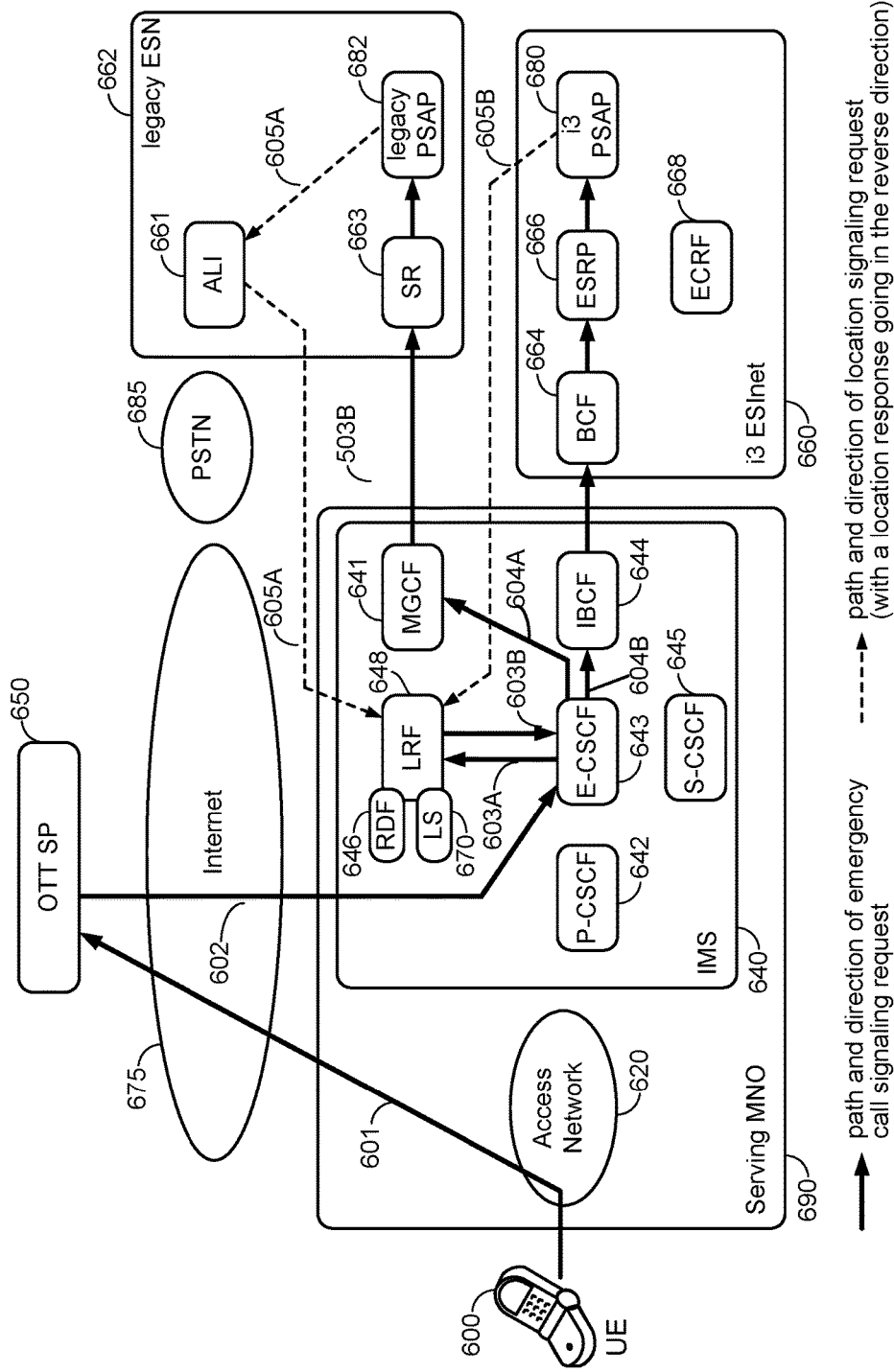
FIG. 6 illustrates another exemplary architecture for IMS support for emergency services according to at least one aspect of the disclosure.

FIG. 6 illustrates an exemplary architecture for IMS E-CSCF support for emergency services over an OTT service provider according to at least one aspect of the disclosure. Similar to the architecture illustrated in FIGS. 4 and 5, the architecture illustrated in FIG. 6 includes a UE 600 (which may correspond to UE 200, UE 300, UE 400 or UE 500), an access network 620 (which may correspond to RAN 120, AN 320, AN 420 or AN 520), an IMS 640 (which may correspond to part of core network 140, part of PCN 340, IMS 440 or IMS 540), an OTT SP 650 (which may correspond to OTT SP 150, OTT SP 350, OTT SP 450 or OTT 550), a NENA i3 capable ESInet 660 (which may correspond to ESInet 160, ESInet 360, ESInet 460 or ESInet 560), a Legacy ESN 662, the Internet 675, a PSTN 685, and a serving MNO 690 (which may correspond to CN 140 combined with AN 120, PCN 340 combined with AN 320, MNO 490 or MNO 590). The IMS 640 includes an LRF 648 (which may correspond to location server 170, ELS 370, LRF 448 or LRF 548), an MGCF 641, a P-CSCF 642, an E-CSCF 643, an IBCF 644, and an S-CSCF 645. The LRF 648 may be connected to an RDF 646 and an LS 670 (which may correspond to location server 170, GMLC/SLP 170, LS 470 or LS 570). The i3 ESInet 660 includes a BCF 664, an ESRP 666, an ECRF 668, and a NENA i3 capable PSAP 680 (which may correspond to PSAP 180, PSAP 380, PSAP 480 or PSAP 580). The Legacy ESN 662 includes an ALI 661, a SR 663 (which may correspond to SR 160, SR 360, SR 463 or SR 563), and a Legacy PSAP 682 (which may correspond to PSAP 180, PSAP 380, legacy PSAP 482 or legacy PSAP 582). As for FIGS. 4 and 5, the various entities shown in FIG. 6 are well known in the art.

With E-CSCF support, shown in FIG. 6 for solution S1 of FIG. 3, the OTT SP 650 receives an address of the E-CSCF 643 in the serving MNO 690 in the emergency call request 601 sent from the UE 600 (which the UE 600 may obtain from the serving MNO AN 620 or PCN in the serving MNO 690, for example, on network attachment). The OTT SP 650 then behaves similarly to an S-CSCF and forwards the emergency services request using a standard SIP INVITE 602 to the E-CSCF 643, which then forwards the call request 604A or 604B to a PSAP 680 or 682, respectively, after having sent a request 603A to the LRF 648 to obtain any routing and location information in a response 603B needed to perform the forwarding. The E-CSCF support exemplified in FIG. 6 may improve the likelihood of a successful call (or service) transfer to a PSAP 680/682 at the cost of greater involvement by the serving MNO 690.

Similar to FIG. 5, FIG. 6 shows the path and direction of the initial emergency call request message (e.g., a SIP INVITE) 601 from the UE 600 to the OTT SP 650, the path of the forwarded call request 602 to the E-CSCF 643, and the path and direction to the PSAP 680 or 682 of the forwarded call request 604A or 604B, respectively, with location and routing assistance requested by the E-CSCF 643 in the request 603A and returned by the LRF 648 in the response 603B. The request 603A to the LRF 648 and response 603B from the LRF 648 may be as defined for the solution in ATIS-0700015—e.g., with the request 603A comprising a SIP INVITE and the response 603B comprising a SIP 300 multiple choices message. FIG. 6 also shows the path and direction for a location request 605A or 605B for the UE 600 sent by the legacy PSAP 682 or the NENA i3 PSAP 680, respectively, to the LRF 648.

Both the LRF 648 and E-CSCF 643 solutions described in association with FIGS. 5 and 6, respectively, may require some changes to an LRF and RDF, and to an E-CSCF for the E-CSCF solution of FIG. 6, in comparison to the IMS emergency call solution defined by 3GPP (e.g., in 3GPP TS 23.167) and in ATIS-0700015, but could also reuse existing functionality from these standard solutions.

For each solution described above with reference to FIGS. 5 and 6, a UE (e.g., the UE 500 or 600) would provide the OTT SP (e.g., OTT SP 550 or 650) with certain information to (i) enable emergency call routing from the OTT SP to the correct entity in the serving MNO (either an LRF or E-CSCF) and (ii) enable the OTT SP to provide enough information to the serving MNO to enable or assist the serving MNO to obtain the UE location and to support call routing. Some of the information provided by the UE to the OTT SP may come from what is normally known to the UE whereas other information may have to be provided to the UE by the AN (e.g., AN 520 or 620) or by the PCN in the serving MNO (e.g., MNO 590 or 690), for example, at UE attachment, on handover to a new MME or SGSN, and/or whenever a tracking area or routing area update occurs to a new MME or SGSN. The information that may be provided by the UE to the OTT SP in an emergency call request for the UE is shown in Table 3 (column 1) along with the likely source of each item of information (column 2), applicability to user plane (UP) or control plane (CP) location for the UE (column 3), and possible SIP headers that could be used to transfer each item to the OTT SP (and thence to the serving MNO) when SIP is used between the UE and OTT SP (column 4).

TABLE 3

| Information Item | Source | CP or UP applicability | Possible SIP Header |
|---|---|---|---|
| Local UE IP address | UE or MNO | UP | Contact Header |
| Global UE Address | UE or MNO | CP and UP | From Header |
| LRF or E-CSCF address | MNO | CP and UP | Route Header |
| Serving MME/SGSN ID | MNO | CP | Contact Header |
| Local UE reference in serving MME or SGSN | MNO | CP | Contact Header |

The LRF 548 or E-CSCF 643 in the serving MNO 590 or 690 may need to maintain state information after receiving the initial SIP INVITE 502A or 602, respectively, from the OTT SP 550 or 650, in association with the solution in FIG. 5 or FIG. 6, respectively, to maintain the call in the case of an E-CSCF 643 or to respond to any subsequent location request from the PSAP 580/582 or an ESInet 560 in the case of an LRF 548. In the case of the LRF 548, this means knowing when the emergency call has ended. In addition, since a serving MME or serving SGSN for the UE 500 or 600 may change, the E-CSCF 643 or LRF 548 may need to know the new serving MME or SGSN address (or ID) when control plane location is used. For an LRF 548, these objectives may be achieved if the LRF 548 separately subscribes to event notification from the OTT SP 550 for call termination and, when control plane location is used, for change of serving MME or SGSN. For an E-CSCF 643, notification of a change in serving MME or SGSN address may be possible with a SIP INFO update from the OTT SP 650. The UE 500 or 600 can keep the OTT SP 550 or 650, respectively, updated with any new serving MME or SGSN identity using a SIP INFO (e.g., when the OTT SP uses SIP) or using some proprietary OTT SP message.

Both solutions illustrated in FIGS. 5 and 6 may transfer the same information shown in Table 3 from the UE 500 or UE 600 to the OTT SP 550 or OTT SP 650, respectively, except that the address in the serving MNO provided to the OTT SP 550 or 650 by the UE 500 or 600, respectively, could be an address for the LRF 548 for the LRF solution of FIG. 5 and an address for the E-CSCF 643 for the E-CSCF solution of FIG. 6. This almost identical information transfer from UE 500 or 600 to OTT SP 550 or 650, respectively, may allow both solutions (for FIGS. 5 and 6) to be supported as part of a common solution by the UEs 500 and 600 and by the OTT SPs 550 and 650 which may allow a serving MNO 590 or 690 to decide which of the two solutions to use and may support migration from one solution to the other without affecting support by UEs 500 and 600 and OTT SPs 550 and 650. The figures described next exemplify in more detail the LRF based solution of FIG. 5 and the E-CSCF based solution of FIG. 6.

Figure 7:
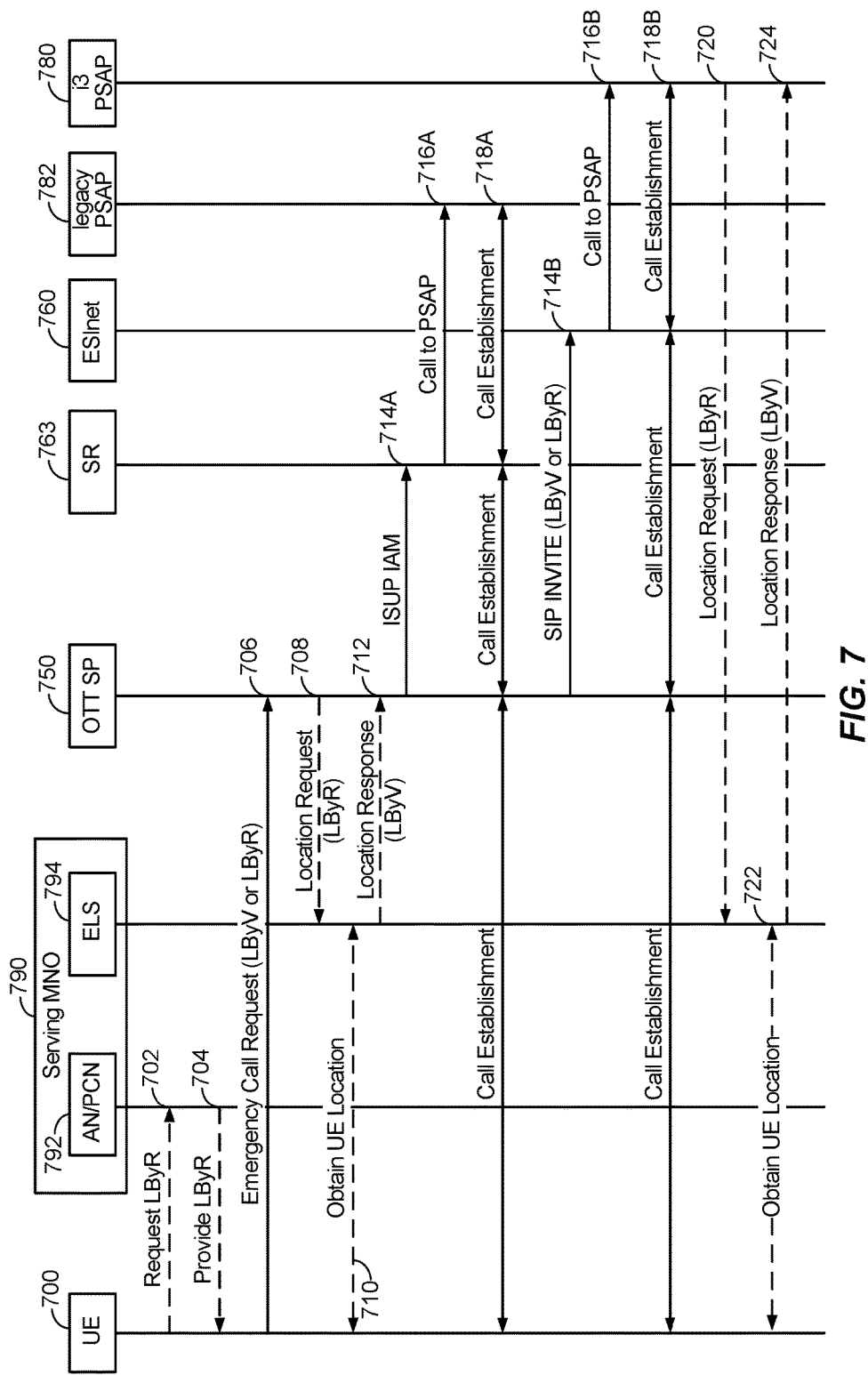
FIG. 7 illustrates an exemplary call flow for location by value and location by reference according to at least one aspect of the disclosure.

FIG. 7 illustrates an exemplary message flow for location by value and enhanced location by reference support according to at least one aspect of the disclosure. The message flow illustrated in FIG. 7 may be performed in the architectures illustrated in FIGS. 3 and 4 and may correspond to and extend the interactions for support of location by reference described in association with FIG. 4. The message flow in FIG. 7 may also or instead be performed in the architectures illustrated in FIGS. 1A and 1B and may compliment and extend the interactions described in association with FIGS. 2A and 2B for support of location by reference. As a consequence, the UE 700 in FIG. 7 may correspond to any of the UEs 1 to N in FIG. 1A, the UE 200, the UE 300 or the UE 400. Similarly, the OTT SP 750 may correspond to OTT SP 150, OTT SP 350 or OTT SP 450. Similarly, the AN/PCN 792 may correspond to AN 420 plus the PCN portion of MNO 490, the AN 320 plus PCN 340 or to the AN 120 plus CN 140 and may include the access network node 240. Similarly, the ELS 794 may correspond to the LRF 448, the ELS 370, the GMLC/SLP 170 or the location server 170. Similarly, the SR 763 may correspond to the SR 463, the SR 360 or the SR 160. Similarly, the ESInet 760 may correspond to the ESInet 460, the ESInet 360 or the ESInet 160. Similarly, the i3 PSAP 780 may correspond to the i3 PSAP 480, the PSAP 380 or the PSAP 180. Similarly, the legacy PSAP 782 may correspond to the legacy PSAP 482, the PSAP 380 or the PSAP 180. Similarly, the serving MNO 790 may correspond to the serving MNO 490.

The call flow shown in FIG. 7 may apply directly to the solution S1 in FIG. 3—e.g., may provide more details of the interactions needed to support the solution S1. A call flow corresponding to solution S2 in FIG. 3 may be almost the same as the call flow shown in FIG. 7 except that the emergency call request at 706 would not carry a LbyV or LbyR (as described below for FIG. 7) and the OTT SP 750 would query the UE 700 for a LbyV or LbyR following 706. In addition, with solution S2 in FIG. 3, the UE 700 may not detect that the user has instigated an emergency call at 706 (e.g., may not recognize that the user dialed an emergency number such as "911") and may send a normal call request to the OTT SP 750 at 706 and not an emergency call request. The OTT SP 750 may then recognize that the call request sent at 706 is for an emergency call (e.g., may recognize that the dialed digits are for an emergency number such as "911") and may request an LbyR or LbyV from the UE 700 before proceeding with 708. The other operations shown in FIG. 7, when solution S2 of FIG. 3 is used, may then occur as described below.

The interactions shown in FIG. 7 apply to a UE 700 that instigates an emergency call via an OTT SP 750 in circumstances where the UE 700 is accessing a serving MNO 790 (e.g., is accessing the OTT SP 750 via the serving MNO 790). At 702 in FIG. 7, if a LbyR will be used by the UE 700 to support an emergency call, the UE 700 may request a LbyR from the serving AN or PCN 792. For example, this may occur when the UE 700 detects that the user is instigating an emergency call or may occur when the UE 700 attaches to the serving MNO 790 or accesses the serving MNO for some other reason (e.g., to support UE 700 mobility).

At 704, in response to 702, or when certain conditions occur (e.g., UE 700 attaches to the AN/PCN 792, performs a tracking or routing area update to a new MME or SGSN in the AN/PCN 792, or handover occurs to a new MME or SGSN), the AN or PCN 792 sends a LbyR or an updated LbyR to the UE 700. The LbyR may be determined by the AN or PCN 792 or obtained from an ELS 794 (e.g., an LRF). In some embodiments, blocks 702 and 704 may correspond to block 202A in FIG. 2A or to blocks 202B and 206B, respectively in FIG. 2B. In these embodiments, the AN/PCN 792 may itself assign the LbyR that is returned to UE 700 at 704 or may obtain the LbyR from ELS 794 similarly to block 204B in FIG. 2B (not shown in FIG. 7).

At 706, in response to the UE 700 detecting that the user of the UE 700 has instigated an emergency call (e.g., if the UE 700 detects that the user has dialed the digits "911"), the UE 700 sends an emergency call request to the OTT SP 750 and includes the LbyV or the LByR obtained at 704. The emergency call request may be a SIP INVITE or may be a message for some other protocol specific to the OTT SP 750. Block 706 may correspond to block 214A in FIG. 2A, block 212B in FIG. 2B or sending of emergency call request 401 in FIG. 4.

At 708, if a LbyR is received at 706, the OTT SP 750 dereferences the LbyR by sending a location request (e.g., a location request formatted according to the HELD protocol if HELD is referenced in the LByR) to the ELS 794 and includes the LbyR in the request. The OTT SP 750 may determine the ELS 794 (e.g., determine an address, FQDN or URL for the ELS 794) from information in the LbyR received at 706. Block 708 may correspond to block 216A in FIG. 2A, block 214B in FIG. 2B or sending of a location query 402 in FIG. 4.

At 710, the ELS 794 uses the information included in the LbyR received at 708 (e.g., a local or global UE identity and a serving MME/SGSN ID for control plane location or a local UE IP address for user plane location) to obtain the current location of the UE 700—e.g., using a control plane or user plane location solution. Block 710 may correspond to blocks 218A and/or 222A in FIG. 2A or to either blocks 216B to 226B or block 228B in FIG. 2B.

At 712, the ELS 794 returns the current UE 700 location to the OTT SP 750 and/or returns routing information for the UE 700 determined from the UE 700 location. Block 712 may correspond to block 224A in FIG. 2A or to block 232B in FIG. 2B. Blocks 708-712 are shown as optional and may not be performed if OTT SP 750 receives a LbyV at 706.

Following 712, if a location only was returned for UE 700 at 712, the OTT SP 750 determines the destination PSAP using the UE location (e.g., using a LoST query—not shown in FIG. 7). Otherwise, the OTT SP 750 may use any routing information returned at 712 to determine the PSAP. When the OTT SP 750 determines a legacy PSAP 782, the OTT SP 750 may forward the call using CS by sending an ISUP IAM message to an SR 763 for the PSAP 782.

At 716A, the SR 763 forwards the call to the legacy PSAP 782.

At 718A, the remainder of call establishment is performed. Blocks 714B, 716B and 718B are then not performed.

When the OTT SP 750 determines an i3 PSAP 780 instead of a legacy PSAP 782 following 712, blocks 714A, 716A and 718A are not performed. Instead, the OTT SP 750 forwards the call to the ESInet 760 by sending a SIP INVITE containing the LbyV or LbyR received at 706 and possibly containing any location for UE 700 received at 712 if 712 occurs.

Following 714B and prior to 716B, if a LbyR is provided at 714B, the ESInet 760 may query the ELS 794 for the current location of the UE 700 to assist in routing (not shown in FIG. 7). The ESInet 760 then forwards the call to the i3 PSAP 780 at 716B.

At 718B, the remainder of call establishment is performed. Blocks 714A and 716A and blocks 714B and 716B may correspond to block 226A in FIG. 2A, block 234B in FIG. 2B or to sending of messages 403A and 403B, respectively, in FIG. 4. Block 718A and block 718B may each correspond to block 228A in FIG. 2A or block 236B in FIG. 2B.

At 720, if an LbyR for UE 700 was received at 716B, the i3 PSAP 780 dereferences the LbyR by sending a location request to the ELS 794 indicated in the LbyR and includes the LbyR in the request. Block 720 may correspond to sending of the query 404B in FIG. 4.

At 722, the ELS 794 uses the information included in the LbyR received at 720 (e.g., a local or global identity for UE 700 and a serving MME/SGSN ID for control plane location or a local UE IP address for user plane location) to obtain the current location of the UE 700—e.g., using a control plane or user plane location solution. Block 722 may be similar to or the same as blocks 218A and/or 222A in FIG. 2A or to either blocks 216B to 226B or block 228B in FIG. 2B in terms of determining a location for the UE 700.

At 724, the ELS 794 returns the current location for UE 700 to the i3 PSAP 780. Blocks 720 and 724 may correspond to block 232A in FIG. 2A or to block 238B in FIG. 2B.

Figure 8:
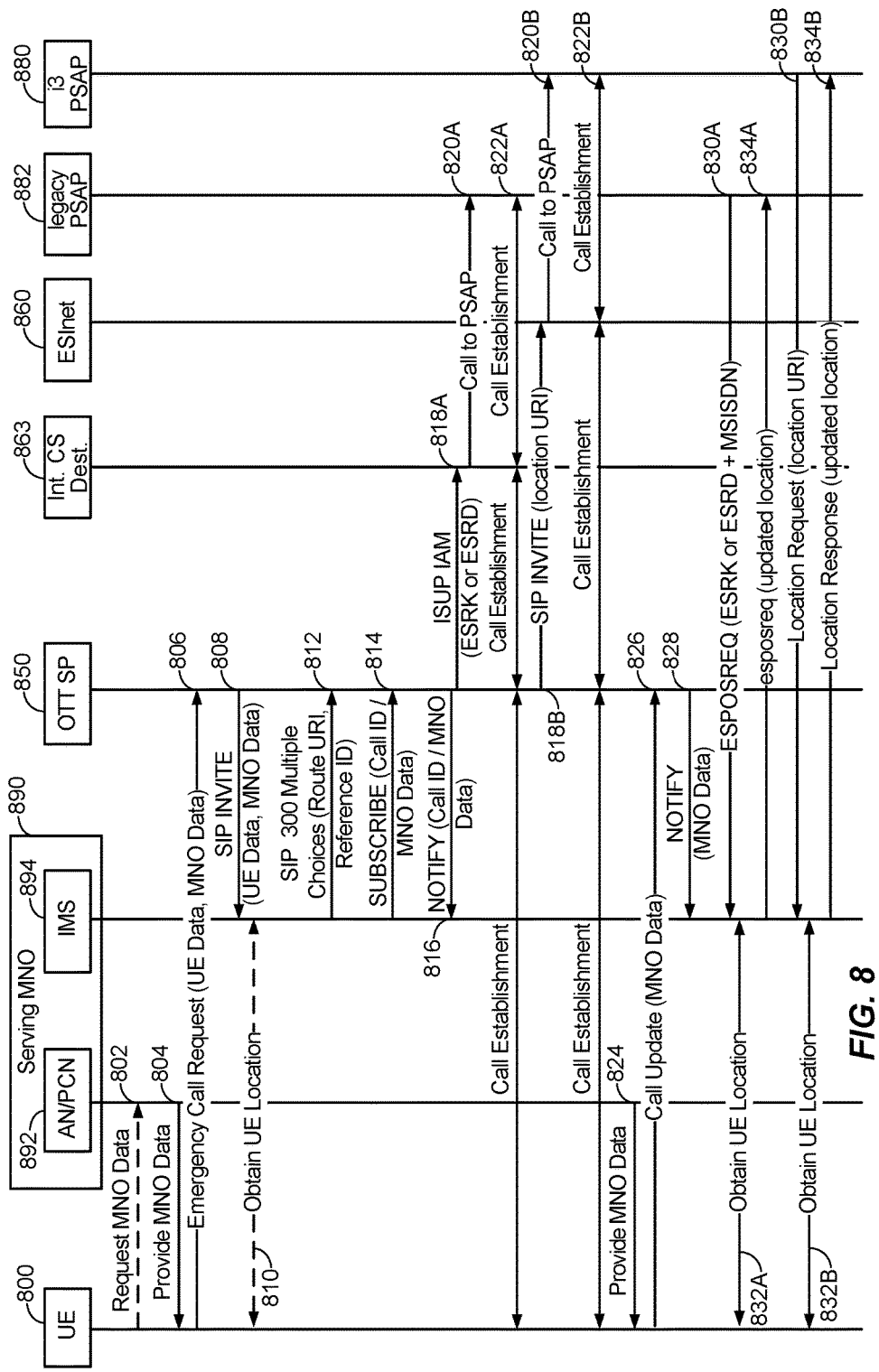
FIG. 8 illustrates a further exemplary call flow for IMS support of an emergency call according to at least one aspect of the disclosure.

FIG. 8 illustrates an exemplary call flow for IMS LRF support for an emergency call via an OTT SP as described above with reference to FIG. 5, according to at least one aspect of the disclosure, and may extend the interactions for IMS LRF support described previously in association with FIG. 5. The call flow illustrated in FIG. 8 may be performed using the architecture illustrated in FIG. 5, FIG. 3, FIG. 1B or FIG. 1A. As a consequence, the UE 800 in FIG. 8 may correspond to any of the UEs 1 to N in FIG. 1A, the UE 200, the UE 300, or the UE 500. Similarly, the OTT SP 850 may correspond to OTT SP 150, OTT SP 350 or OTT SP 550. Similarly, the AN/PCN 892 may correspond to AN 520 plus the PCN portion of MNO 590, the AN 320 plus PCN 340 or to the AN 120 plus CN 140 and may include the access network node 240. Similarly, the IMS 894 may correspond to the IMS 540, an IMS within the PCN 340 or an IMS within the CN 140. Similarly, the intermediate CS destination 863 may correspond to the SR 563, the SR 360 or the SR 160. Similarly, the ESInet 860 may correspond to the ESInet 560, the ESInet 360 or the ESInet 160. Similarly, the i3 PSAP 880 may correspond to the i3 PSAP 580, the PSAP 380 or the PSAP 180. Similarly, the legacy PSAP 882 may correspond to the legacy PSAP 582, the PSAP 380 or the PSAP 180. Similarly, the serving MNO 890 may correspond to the serving MNO 590.

Figure 9:
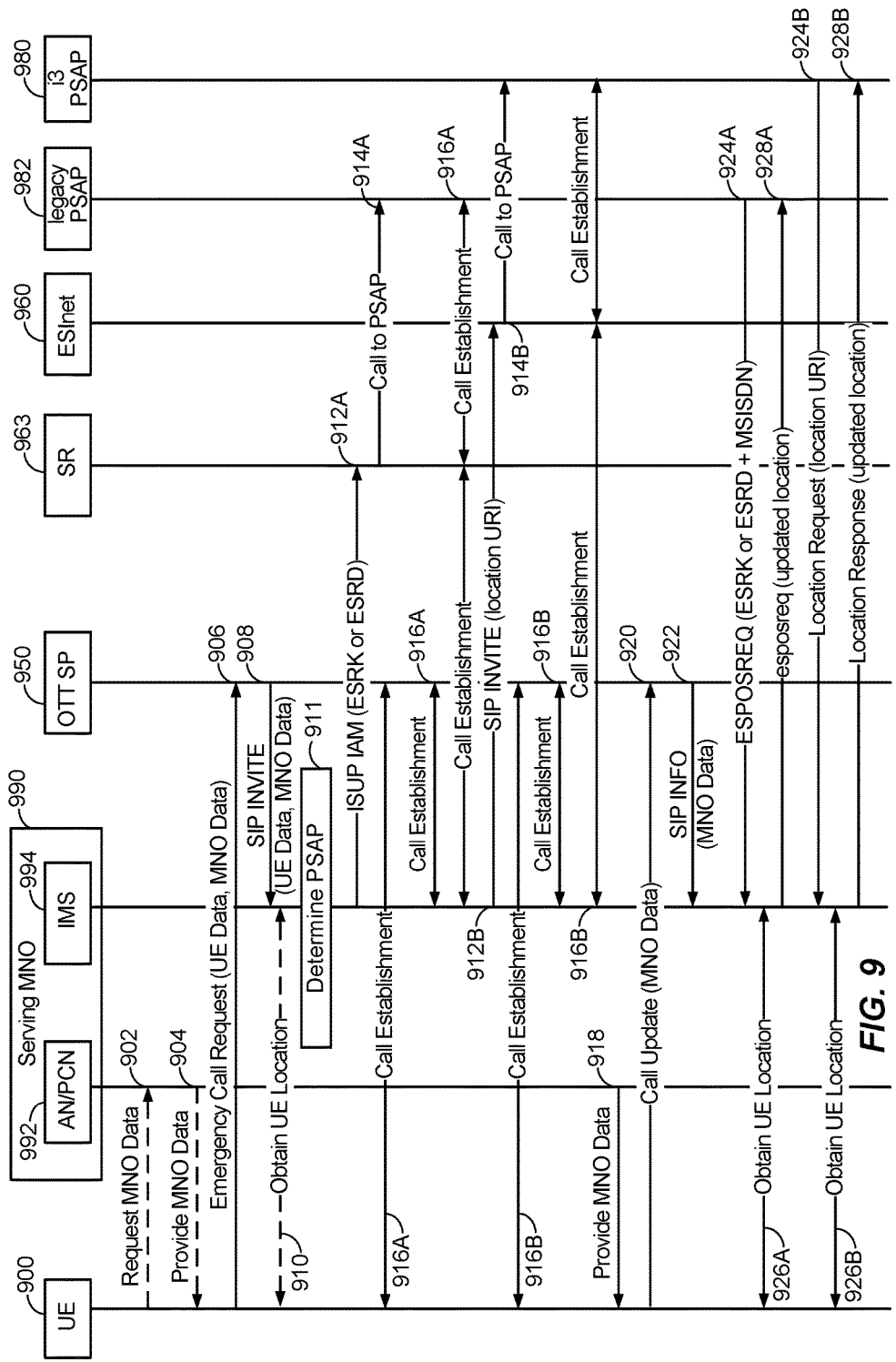
FIG. 9 illustrates another exemplary call flow for IMS Support of an emergency call according to at least one aspect of the disclosure.

FIG. 9 illustrates an exemplary call flow for IMS E-CSCF support for an emergency call via an OTT SP as described above with reference to FIG. 6, according to at least one aspect of the disclosure, and may extend the interactions for IMS E-CSCF support described previously in association with FIG. 6. The call flow illustrated in FIG. 9 may be performed using the architecture illustrated in FIG. 6, FIG. 3, FIG. 1B or FIG. 1A. As a consequence, the UE 900 in FIG. 9 may correspond to any of the UEs 1 to N in FIG. 1A, the UE 200, the UE 300, or the UE 600. Similarly, the OTT SP 950 may correspond to OTT SP 150, OTT SP 350 or OTT SP 650. Similarly, the AN/PCN 992 may correspond to AN 620 plus the PCN portion of MNO 690, the AN 320 plus PCN 340 or to the AN 120 plus CN 140 and may include the access network node 240. Similarly, the IMS 994 may correspond to the IMS 640, an IMS within the PCN 340 or an IMS within the CN 140. Similarly, the SR 963 may correspond to the SR 663, the SR 360 or the SR 160. Similarly, the ESInet 960 may correspond to the ESInet 660, the ESInet 360 or the ESInet 160. Similarly, the i3 PSAP 980 may correspond to the i3 PSAP 680, the PSAP 380 or the PSAP 180. Similarly, the legacy PSAP 982 may correspond to the legacy PSAP 682, the PSAP 380 or the PSAP 180. Similarly, the serving MNO 990 may correspond to the serving MNO 690.

The call flows illustrated in FIGS. 8 and 9 are similar, and from the perspective of entities outside of the IMS 894/994 (e.g., the UE 800/900 and OTT SP 850/950) may be seen as part of a single common solution. Although the IMS 894/994 behaves differently in the call flows in FIGS. 8 and 9, the interactions between the IMS 894/994 and the OTT SP 850/950 in both call flows may be compliant with the IETF definition of SIP (e.g., in IETF RFC 3261) and could therefore both be supported by an OTT SP 850/950 that acts as a SIP proxy. In that case, OTT SP 850/950 may not need to know in advance whether the serving MNO 890/990 (or the IMS 894/994 in the serving MNO 890/990) will employ IMS LRF support as in FIG. 8 or IMS E-CSCF support as in FIG. 9. Instead, the OTT SP 850/950 may simply react according to preconfigured SIP rules depending on whether IMS LRF support or IMS E-CSCF support is provided. This may enable serving MNO 890/990 to migrate from IMS LRF support to IMS E-CSCF support or vice versa without requiring changes to support from UE 800/900 or from OTT SP 850/950. It may also enable OTT SP 850/950 to receive IMS LRF support according to FIG. 8 from one or more MNOs (e.g., the MNO 890) and to receive IMS E-CSCF support according to FIG. 9 from one or more other MNOs (e.g., the MNO 990) for emergency calls that may be originated by different UEs (e.g., UE 800 and UE 900) that access OTT SP 850/950 from one of these MNOs.

The call flows in FIGS. 8 and 9 apply to solution S1 in FIG. 3. For solution S2 in FIG. 3, the call flows could be almost the same except that the emergency call request described below at 806/906 in each call flow would not include some or all of the UE data and/or MNO data. Instead, the OTT SP 850/950 would query the UE 800/900 for the UE data and/or MNO data following 806/906 (e.g., by sending a SIP INFO containing the request to the UE 800/900 and with the UE 800/900 returning the requested UE data and/or MNO data in a SIP OK or in a SIP INFO). For solution S2, the OTT SP 850/950 may also need to query the UE 800/900 for the updated MNO data that the UE 800/900 sends at 826 in FIGS. 8 and 920 in FIG. 9. However, this request could be implicitly or explicitly combined with the request (mentioned above) for the UE data and MNO data sent initially to the UE 800/900 following 806/906.

In addition, with solution S2 of FIG. 3, the UE 800/900 may not detect that the user has instigated an emergency call prior to 806/906 in FIGS. 8 and 9 (e.g., may not recognize that the user dialed an emergency number such as "911") and may send a normal call request to the OTT SP 850/950 at 806/906 in FIGS. 8 and 9 and not an emergency call request. The OTT SP 850/950 may then recognize that the call request sent at 806/906 is for an emergency call (e.g., may detect that the dialed digits are for an emergency number such as "911") and may request MNO data and/or UE data from the UE 800/900 before proceeding with 808/908 shown in FIGS. 8 and 9. The other operations in FIGS. 8 and 9 that are not modified as just described for solution S2 of FIG. 3 may occur as described below.

The interactions shown in FIG. 8 may apply to a UE 800 that instigates an emergency call via an OTT SP 850 in circumstances where the UE 800 is accessing a serving MNO 890 (e.g., is accessing the OTT SP 850 via the serving MNO 890). At 802 in FIG. 8, the UE 800 may request data from the AN or PCN 892 in the serving MNO 890 to support an emergency call using an OTT SP 850. For example, this may occur when the UE 800 detects that the user is instigating an emergency call. Block 802 is optional and may not always occur.

At 804, in response to 802, or when certain conditions occur (e.g., UE 800 attaches to the AN/PCN 892, performs a tracking area or routing area update to a new MME or SGSN or handover occurs to a new MME or SGSN), the AN or PCN 892 sends MNO data to the UE 800. The MNO data may include (i) an IMS address for the serving MNO 890 (e.g., the address of an LRF in IMS 894), (ii) if control plane location may be used, an identity for a current serving MME or current serving SGSN for UE 800, (iii) if user plane location may be used, an MNO assigned IP address for the UE 800, and/or (iv) either a global identity (e.g., IMSI or MSISDN) for the UE 800 or a local identity for the UE 800 assigned by the serving MME or serving SGSN for the UE 800.

At 806, in response to the UE 800 detecting that the user of the UE 800 has instigated an emergency call (e.g., if the UE 800 detects that the user has dialed the digits "911"), the UE 800 sends an emergency call request to the OTT SP 850 and includes the MNO Data obtained at 804 and possibly additional UE data known to the UE 800. The UE data may include a global identity for the UE 800 (e.g., an IMSI or MSISDN) and possibly an MNO assigned IP address for the UE 800 if not received at 804. The emergency call request at 806 may be an SIP INVITE or may be a message for some other protocol specific to the OTT SP 850. Block 806 may correspond to the sending of the emergency call request 501 in FIG. 5.

At 808, based on receipt at 806 of an IMS address in the serving MNO 890 (e.g., where the IMS address may be part of the MNO data received at 806 and may be an LRF address included in the Route header of a SIP INVITE sent at 806), the OTT SP 850 sends a SIP INVITE to the IMS 894 (e.g., to an LRF in the IMS 894) indicated by the IMS address in the serving MNO 890. The SIP INVITE includes the MNO data and any UE data received at 806, indicates an emergency call and includes the identity and possibly the location (e.g., country) of the OTT SP 850. The SIP INVITE could be a partial or complete copy of any SIP INVITE received at 806. Block 808 may correspond to sending of the SIP INVITE 502A in FIG. 5.

In some cases, the SIP INVITE sent at 808 may first be received at a border control function (e.g., an IBCF) in the serving MNO IMS 894 for security before being forwarded to an LRF in the IMS 894 (not shown in FIG. 8). The IMS 894 (e.g., an LRF or IBCF in the IMS 894) may first verify that the SIP INVITE sent at 808 comes from a valid OTT SP, for example, using preconfigured data based on some business relationship between the serving MNO 890 and the OTT SP 850, and possibly using a secure IP connection between the OTT SP 850 and the serving MNO IMS 894 to transfer the SIP INVITE at 808. In some cases, at 810, the IMS 894 (e.g., an LRF in the IMS 894) uses the MNO data and any UE data sent at 808 to obtain a location for the UE 800, for example, using a control plane or user plane location solution. In some other cases, block 810 does not occur and IMS 894 may determine a location (e.g., an approximate location) for UE 800 from other data received in the SIP INVITE at 808 such as a LbyV included by UE 800 in the emergency call request sent at 806 and transferred by OTT SP 850 to the IMS 894 at 808.

The IMS 894 (e.g., an RDF in the IMS 894) then determines a destination PSAP 880/882, or a route towards a destination PSAP 880/882, corresponding to the location for the UE 800 and derives a routing URI (which may also be referred to a route URI) to enable call routing from the OTT SP 850 to or towards the destination PSAP 880/882. The routing URI may include the address or identity of the PSAP 880/882 or of an intermediate destination 863 (e.g., an SR in the case of a legacy PSAP 882 or an ingress point to an ESInet 860 for an i3 capable PSAP 880) and may depend on the OTT SP 850 identity and/or the OTT SP 850 location (e.g., whether the location is in the same country as the serving MNO 890 or is in a different country). The IMS 894 (e.g., an LRF in the IMS 894) also determines a reference identifier (ID) to enable a subsequent location request for the UE 800 from an ESInet 860 or from the PSAP 880/882 at a later time. The reference ID may be either (i) an ESRK or (ii) an ESRD plus MSISDN in the case of a legacy PSAP 882, or may be (iii) a location URI in the case of an i3 capable PSAP 880.

At 812, the IMS 894 (e.g., an LRF in the IMS 894) returns the routing URI and reference ID to the OTT SP 850 in a SIP 300 Multiple Choices message. Note that the IMS 894 may not return a location (e.g., LbyV) to the OTT SP 850 if the identity of the OTT SP 850 was not fully validated, or if the business relationship with the OTT SP 850 only allows for routing support by the serving MNO 890. Block 812 may correspond to sending of the SIP 300 Multiple Choices 502B in FIG. 5.

At 814, if the IMS 894 (e.g., an LRF in the IMS 894) may need to use control plane location, the IMS 894 sends a SIP SUBSCRIBE message to the OTT SP 850 to subscribe to notification of changes in the MNO data (e.g., change of serving MME or serving SGSN address). The IMS 894 may also send a separate SIP SUBSCRIBE message to OTT SP 850 to subscribe to notification of call termination (not shown in FIG. 8).

At 816, if 814 occurs, the OTT SP 850 returns a 200 OK message (not shown in FIG. 8) to IMS 894 and then a NOTIFY message for each SUBSCRIBE message received carrying the current MNO data in the case of subscription to MNO data at 814 and/or current call state in case of subscription to call termination.

Following 812 (and possibly following 816 if 816 occurs), the OTT SP 850 determines whether the destination PSAP is a legacy PSAP 882 or an i3 capable PSAP 880 from the content of the routing URI or reference ID returned at 812. In the case of a legacy PSAP 882, the OTT SP 850 may forward the call using CS to or towards the PSAP 882. In one embodiment, the OTT SP 850 sends an ISUP IAM message at 818A to an intermediate CS destination 863 (e.g., an SR) indicated in the route URI received at 812. The OTT SP 850 also includes any ESRK or ESRD plus MSISDN in the reference ID received at 812 in the ISUP IAM. Block 818A may correspond to sending of the request 503A in FIG. 5.

At 820A, the intermediate CS destination 863 forwards the call to the legacy PSAP 882 and includes the ESRK or ESRD plus MSISDN received at 818A.

At 822A, the remainder of call establishment is performed. Blocks 818B, 820B and 822B are then not performed.

When the OTT SP 850 determines an i3 PSAP 880 instead of a legacy PSAP 882 following 812, blocks 818A, 820A and 822A are not performed. Instead, the OTT SP 850 forwards the call to or towards the PSAP 880. In one embodiment, the OTT SP 850 forwards the call at 818B to an ESInet 860 indicated by the routing URI received at 812 by sending a SIP INVITE containing the location URI received in the reference ID at 812. Block 818B may correspond to sending of the request 503B in FIG. 5.

At 820B, the ESInet 860 forwards the call to the i3 PSAP 880 and includes the location URI received at 818B.

At 822B, the remainder of call establishment is performed.

At 824, if there is a change in MNO data (e.g., the UE 800 is handed over to a new SGSN or MME) and if the serving MNO 890 may use control plane location for the UE 800, the AN or PCN 892 sends new MNO data to the UE 800 (e.g., the identity for a new serving MME or SGSN for the UE 800 and a new local identity for the UE 800 in the new serving MME or SGSN). Sending of the new MNO data at 824 may be automatic whenever the MNO data changes (e.g., with no knowledge by the AN or PCN 892 in the serving MNO 890 that an emergency call for UE 800 via an OTT SP 850 is in progress) or may be triggered by the UE 800 having previously sent a request for MNO data at 802.

At 826, the UE 800 forwards the new MNO data to the OTT SP 850, for example, using a SIP INFO message when SIP is used between the UE 800 and OTT SP 850.

At 828, if the IMS 894 subscribed to notification of changes in MNO data at 814, the OTT SP 850 sends the new MNO data to the IMS 894 (e.g., an LRF in the IMS 894) in a SIP NOTIFY message. The new MNO data is stored for future use by the IMS 894. For example, the new MNO data may be used later at block 832A or block 832B to help obtain a location for UE 800.

At 830A, in the case of a legacy PSAP 882, the PSAP 882 or an entity associated with PSAP 882 such as an ALI (e.g., ALI 561) may send an E2 interface ESPOSREQ message (e.g., as defined in TIA/ATIS joint standard J-STD-036) to the IMS 894 (e.g., an LRF) indicated by the ESRK or ESRD received at 820A to request the location of the UE 800 and includes either the ESRK or the ESRD plus MSISDN received at 820A. Block 830A may correspond to sending of the query 504A in FIG. 5.

At 832A, the IMS 894 (e.g., an LRF) uses the ESRK or MSISDN received at 830A to identify the UE 800 and uses any UE data received at 808 and/or the MNO data received at 808 or 828, if 828 occurs, to obtain a location for the UE 800 using a control plane or user plane location solution.

At 834A, the IMS 894 (e.g., an LRF) returns the location to the PSAP 882 (or to an entity associated with PSAP 882 such as an ALI).

At 830B, in the case of an i3 capable PSAP 880, the i3 PSAP 880 dereferences the location URI received at 820B by sending a location request to the IMS 894 (e.g., an LRF in the IMS 894) indicated in the location URI and carrying the location URI. Block 830B may correspond to sending of the query 504B in FIG. 5.

At 832B, the IMS 894 (e.g., an LRF) uses the location URI received at 830B to identify the UE 800 and uses any UE data received at 808 and/or the MNO data received at 808 or 828, if 828 occurs, to obtain a location for the UE 800 using a control plane or user plane location solution.

At 834B, the IMS 894 (e.g., an LRF) returns the location to the PSAP 880.

Blocks similar to or the same as 830B, 832B and 834B may occur following 818B to enable ESInet 860 to obtain a location for UE 800 from IMS 894 (e.g., from an LRF in IMS 894) and, based on the location, route the emergency call at 820B to the correct PSAP 880. In that case, ESInet 860 (e.g., an ESRP in ESInet 860 such as ESRP 566) may send a location request for UE 800 to IMS 894 in a block similar to or the same as 830B and may receive a location for UE 800 from IMS 894 in a block similar to or the same as 834B.

The interactions shown in FIG. 9 may apply to a UE 900 that instigates an emergency call via an OTT SP 950 in circumstances where the UE 900 is accessing a serving MNO 990 (e.g., is accessing the OTT SP 950 via the serving MNO 990). At 902 in FIG. 9, the UE 900 may request data from the AN or PCN 992 in the serving MNO 990 to support an emergency call using an OTT SP 950. For example, this may occur when the UE 900 detects that the user is instigating an emergency call. Operation 902 is optional and may not always occur.

At 904, in response to 902, or when certain conditions occur (e.g., UE 900 attaches to the AN/PCN 992, performs a tracking area or routing area update to a new MME or SGSN in the AN/PCN 992, or a handover occurs to a new MME or SGSN), the AN or PCN 992 sends MNO data to the UE 900. The MNO data may include (i) an IMS address for the serving MNO 990 (e.g., the address of an E-CSCF in the IMS 994), (ii) if control plane location may be used, an identity for a current serving MME or current serving SGSN for UE 900, (iii) if user plane location may be used, an MNO assigned IP address for the UE 900, and/or (iv) either a global identity (e.g., IMSI or MSISDN) for UE 900 or a local identity for the UE 900 assigned by the serving MME or SGSN for UE 900.

At 906, in response to the UE 900 detecting that the user of the UE 900 has instigated an emergency call (e.g., if the UE 900 detects that the user has dialed the digits "911"), the UE 900 sends an emergency call request to the OTT SP 950 and includes the MNO data obtained at 904 and possibly additional UE data known to the UE 900. The UE data may include a global identity for the UE 900 (e.g., an IMSI or MSISDN) and possibly an MNO assigned IP address for the UE 900 if not received at 904. The emergency call request at 906 may be a SIP INVITE or may be a message for some other protocol specific to the OTT SP 950. Block 906 may correspond to the sending of the emergency call request 601 in FIG. 6.

At 908, based on receipt of an IMS address as part of the MNO data received at 906 (e.g., where the IMS address is an E-CSCF address in a Route header of a SIP INVITE received at 906), the OTT SP 950 sends a SIP INVITE to the IMS 994 (e.g., to an E-CSCF in the IMS 994) indicated by the IMS address in the serving MNO 990. The SIP INVITE sent at 980 includes the MNO data and any UE data received at 906, indicates an emergency call, and includes the identity and possibly the location (e.g., the country) of the OTT SP 950. The SIP INVITE sent at 908 could be a partial or complete copy of any SIP INVITE received at 906. Block 908 may correspond to sending of the SIP INVITE 602 in FIG. 6.

In some cases, the SIP INVITE sent at 908 may first be received at a border control function (e.g., an IBCF) in the serving MNO IMS 994 for security before being forwarded to an E-CSCF in IMS 994 (not shown in FIG. 9). The IMS 994 (e.g., an E-CSCF or IBCF in the IMS 994) may verify that the SIP INVITE sent at 908 comes from a valid OTT SP 950, for example, using preconfigured data based on some business relationship between the serving MNO 990 and the OTT SP 950, and possibly using a secure IP connection between the OTT SP 950 and the serving MNO IMS 994 to transfer the SIP INVITE at 908. In some cases at 910, the IMS 994 (e.g., an LRF in IMS 994) may use the MNO data and any UE data received at 908 to obtain a location for the UE 900, for example, using a control plane or user plane location solution. In some other cases, block 910 does not occur and IMS 994 may determine a location (e.g., an approximate location) for UE 900 from other data received in the SIP INVITE at 908 such as a LbyV included by UE 900 in the emergency call request sent at 906 and transferred by OTT SP 950 to the IMS 994 at 908.

At 911, which may follow 908 or 910 if 910 occurs, the IMS 994 (e.g., an RDF in the IMS 994) determines a destination PSAP 980/982, or a route towards a destination PSAP 980/982, corresponding to the UE 900 location (e.g., as obtained at 910) and determines a routing URI (also referred to as a route URI) to enable call routing from the IMS 994 to or towards the destination PSAP 980/982. The routing URI may indicate (i) the address or identity of the PSAP 980/982 or (ii) the address or identity of an intermediate destination such as an SR 963 in the case of a legacy PSAP 982 or an ingress point to an ESInet 960 in the case of an i3 capable PSAP 980. As part of determining a destination PSAP 980/982 at 911, or a route towards a destination PSAP 980/982, the IMS 994 (e.g., an LRF in the IMS 994) determines a reference identifier (ID) to enable a subsequent location request for the UE 900 from an ESInet 960 or the PSAP 980/982 at a later time. The reference ID may be either (i) an ESRK or (ii) an ESRD plus MSISDN in the case of a legacy PSAP 982, or (iii) a location URI in the case of an i3 capable PSAP 980. The IMS 994 (e.g., an E-CSCF in the IMS 994) also determines at 911 whether the destination PSAP is a legacy PSAP 982 or an i3 capable PSAP 980 (e.g., from the content of the routing URI or reference ID that were determined at 911).

In some implementations, location of the UE 900 at 910 when 910 occurs and determination of a destination PSAP, or a route towards a destination PSAP, at 911, including determining the routing URI and reference ID at 911, may be performed by an LRF (e.g., LRF 648), possibly assisted by an RDF (e.g., RDF 646), in IMS 994 (e.g., if IMS 994 corresponds to IMS 640 in FIG. 6). In these implementations, the SIP INVITE sent at 908 may be received by an E-CSCF (e.g., E-CSCF 643) in IMS 994 and then forwarded to the LRF (e.g., LRF 648) in IMS 994 by the E-CSCF. The LRF (e.g., LRF 648) in IMS 994 may then obtain a location for UE 900 at 910 if 910 occurs, determine a destination PSAP at 911 including determining the routing URI and reference ID and return the determined routing URI and reference ID back to the E-CSCF (e.g., E-CSCF 643) in IMS 994 in a SIP 300 Multiple Choices message. Though not shown in FIG. 9, this interaction between an E-CSCF (e.g., E-CSCF 643) and an LRF (e.g., LRF 648) in IMS 994 may correspond to sending the request 603A and response 603B between E-CSCF 643 and LRF 648 that were described in association with FIG. 6.

In the case of determining a legacy PSAP 982 at 911, the IMS 994 (e.g., an MGCF in the IMS 994) may forward the call using CS at 912A to or towards the PSAP 982. In one embodiment, the IMS 994 sends an ISUP IAM message at 912A to an SR 963 indicated in the routing URI determined following 908 or 910 (if 910 occurs). The IMS 994 also includes in the ISUP IAM any ESRK or ESRD plus MSISDN indicated in the reference ID determined at 911.

At 914A, the SR 963 forwards the call to the legacy PSAP 982 and includes the ESRK or ESRD plus MSISDN received at 912A.

At 916A, the remainder of call establishment is performed between the UE 900, OTT SP 950, IMS 994, SR 963 and legacy PSAP 982. Blocks 912B, 914B and 916B are then not performed.

When the IMS 994 determines an i3 PSAP 980 instead of a legacy PSAP 982 at 911, blocks 912A, 914A and 916A are not performed. Instead, at 912B, the IMS 994 (e.g., an E-CSCF in the IMS 994) forwards the emergency call to or towards the PSAP 980. In one embodiment, the IMS 994 forwards the emergency call to an ESInet 960 indicated by the routing URI determined at 911 by sending a SIP INVITE containing the location URI from the reference ID determined at 911.

At 914B, the ESInet 960 forwards the emergency call to the i3 PSAP 980 and includes the location URI received at 912B.

At 916B, the remainder of call establishment is performed between the UE 900, OTT SP 950, IMS 994, ESInet 960 and i3 PSAP 980.

At 918, if there is a change in MNO data (e.g., the UE 900 is handed over to a new SGSN or MME in serving MNO 990) and if the serving MNO 990 may use control plane location for UE 900, the AN or PCN 992 provides new MNO data to the UE 900 (e.g., the identity for a new serving MME or new serving SGSN for UE 900 and a local identity for the UE 900 in the new serving MME or SGSN). Sending of this new MNO data may be automatic whenever the MNO data changes (e.g., with no knowledge by the AN or PCN 992 in the serving MNO 990 that an emergency call for UE 900 via an OTT SP 950 is in progress), or may be triggered by the UE 900 having previously sent a request at 902.

At 920, the UE 900 forwards the new MNO data to the OTT SP 950, for example, using a SIP INFO message when SIP is used between the UE 900 and the OTT SP 950.

At 922, the OTT SP 950 forwards the new MNO data to the IMS 994 (e.g., to an E-CSCF in the IMS 994), for example, using a SIP INFO message. The MNO data is stored for future use by the IMS 994 (e.g., by an LRF in the IMS 994).

At 924A, in the case of a legacy PSAP 982, the PSAP 982 or an entity associated with PSAP 982 (e.g., an ALI such as ALI 661) may send an E2 interface ESPOSREQ message (e.g., as defined in TIA/ATIS standard J-STD-036) to the IMS 994 (e.g., an LRF in the IMS 994) as indicated by the ESRK or ESRD received at 914A to request the location of the UE 900 and includes either the ESRK or the ESRD plus MSISDN received at 914A. Block 924A may correspond to sending of the location request 605A in FIG. 6.

At 926A, the IMS 994 (e.g., an LRF in the IMS 994) uses the ESRK or MSISDN received at 924A to identify the UE 900 and uses any UE data received at 908 and/or the MNO data received at 908 or 922, if 922 occurs, to obtain a location for the UE 900 using a control plane or user plane location solution.

At 928A, the IMS 994 (e.g., an LRF in the IMS 994) returns the location for the UE 900 to the legacy PSAP 982 (or to an entity associated with PSAP 982 such as an ALI).

At 924B, in the case of an i3 capable PSAP 980, the i3 PSAP 980 dereferences the location URI received at 914B by sending a location request to the IMS 994 (e.g., an LRF in the IMS 994) indicated in the location URI and carrying the location URI. Block 924B may correspond to sending of the location request 605B in FIG. 6.

At 926B, the IMS 994 (e.g., an LRF in the IMS 994) uses the location URI received at 924B to identify the UE 900 and uses any UE data received at 908 and/or the MNO data received at 908 or 922, if 922 occurs, to obtain a location for the UE 900 using a control plane or user plane location solution.

At 928B, the IMS 994 (e.g., an LRF in the IMS 994) returns the location for the UE 900 to the i3 capable PSAP 980.

Blocks similar to or the same as 924B, 926B and 928B may occur following 912B to enable ESInet 960 to obtain a location for UE 900 from IMS 994 (e.g., from an LRF in IMS 994) and, based on the location, route the emergency call at 914B to the correct PSAP 980. In that case, ESInet 960 (e.g., an ESRP in ESInet 860 such as ESRP 666) may send a location request for UE 900 to IMS 994 in a block similar to or the same as 924B and may receive a location for UE 900 from IMS 994 in a block similar to or the same as 928B.

It should be noted that the procedures and techniques described in association with FIGS. 4-9 may rely on the UE that instigated the emergency call sending any updates to an LbyR (e.g., for FIGS. 4 and 7) or any updates to MNO data (e.g., as at 826 in FIGS. 8 and 920 in FIG. 9) to the OTT SP for the UE to enable the OTT SP to forward the update to a PSAP or to an IMS entity, such as an LRF (e.g., as at 828 in FIG. 8) or an E-CSCF (e.g., as at 922 in FIG. 9). However, in alternative embodiments, an updated LbyR or updated MNO data (e.g., that may result after the UE that instigated the emergency call is handed over to a new SGSN or new MME) may be sent to a PSAP or to an IMS entity in the serving MNO (such as an LRF or E-CSCF) by the AN or PCN in the serving MNO (e.g., by an MME or SGSN in the AN or PCN) rather than by the UE. This may occur, for example, if an IMS entity in the serving MNO for the UE that instigated the emergency call or an entity associated with this (e.g., a GMLC) sends a request for any updated LbyR or updated MNO Data to an entity in the serving MNO AN or PCN (e.g., to an MME or SGSN) after detecting that the UE is instigating an emergency call (e.g., following 708, 808 and 908 in each of FIGS. 7, 8 and 9, respectively). With these alternative embodiments, the updated LbyR or updated MNO data may not need to be sent by the UE that instigated the emergency call to the OTT SP and by the OTT SP to a PSAP or to an IMS entity such as an LRF or E-CSCF.

Figure 10:
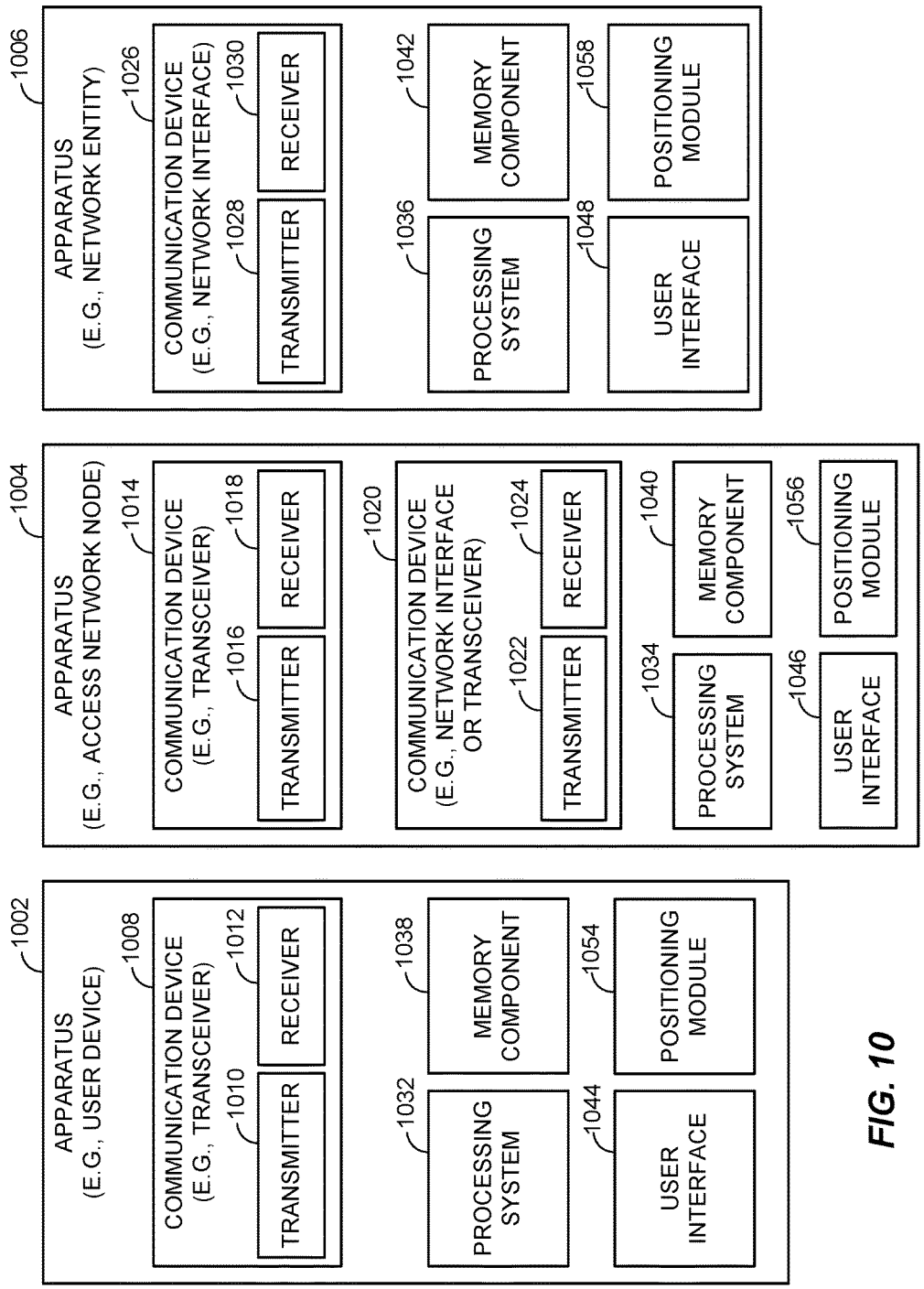
FIG. 10 is a simplified block diagram of several sample aspects of components configured to support communication as taught herein.

FIG. 10 illustrates several sample components (represented by corresponding blocks) that may be incorporated into an apparatus 1002, an apparatus 1004, and an apparatus 1006 (corresponding to, for example, a user device, such as UE 200, 300, 400, 500, 600, 700, 800 or 900, an access network node, such as access network node 240, and a network entity, such as OTT SP 150, location server 170, etc., respectively) to support the operations as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 1002 and the apparatus 1004 each include at least one wireless communication device (represented by the communication devices 1008 and 1014 (and the communication device 1020 if the apparatus 1004 is a relay)) for communicating with other nodes via at least one designated RAT. Each communication device 1008 includes at least one transmitter (represented by the transmitter 1010) for transmitting and encoding signals (e.g., messages, indications, information, and so on) and at least one receiver (represented by the receiver 1012) for receiving and decoding signals (e.g., messages, indications, information, pilots, and so on). Similarly, each communication device 1014 includes at least one transmitter (represented by the transmitter 1016) for transmitting signals (e.g., messages, indications, information, pilots, and so on) and at least one receiver (represented by the receiver 1018) for receiving signals (e.g., messages, indications, information, and so on). If the apparatus 1004 is a relay station, each communication device 1020 may include at least one transmitter (represented by the transmitter 1022) for transmitting signals (e.g., messages, indications, information, pilots, and so on) and at least one receiver (represented by the receiver 1024) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 1004 may also comprise a Network Listen Module (NLM) or the like for performing various measurements.

The apparatus 1006 (and the apparatus 1004 if it is not a relay station) includes at least one communication device (represented by the communication device 1026 and, optionally, 1020) for communicating with other nodes. For example, the communication device 1026 may comprise a network interface that is configured to communicate with one or more network entities via a wire-based or wireless backhaul. In some aspects, the communication device 1026 may be implemented as a transceiver configured to support wire-based or wireless signal communication. This communication may involve, for example, sending and receiving: messages, parameters, or other types of information. Accordingly, in the example of FIG. 10, the communication device 1026 is shown as comprising a transmitter 1028 and a receiver 1030. Similarly, if the apparatus 1004 is not a relay station, the communication device 1020 may comprise a network interface that is configured to communicate with one or more network entities via a wire-based or wireless backhaul. As with the communication device 1026, the communication device 1020 is shown as comprising a transmitter 1022 and a receiver 1024.

The apparatuses 1002, 1004, and 1006 also include other components that may be used in conjunction with the OTT SP and UE location related operations as taught herein. The apparatus 1002 includes a processing system 1032 and a positioning module 1054 for providing functionality relating to, for example, user device operations to support OTT SP and UE location related operations as taught herein, and for providing other processing functionality. The apparatus 1004 includes a processing system 1034 and a positioning module 1056 for providing functionality relating to, for example, access network node operations to support OTT SP and UE location related operations as taught herein, and for providing other processing functionality. The apparatus 1006 includes a processing system 1036 and a positioning module 1058 for providing functionality relating to, for example, network operations to support OTT SP and UE location related operations as taught herein, and for providing other processing functionality.

The apparatuses 1002, 1004, and 1006 further include memory components 1038, 1040, and 1042 (e.g., each including a memory device), respectively, for maintaining information (e.g., information indicative of reserved resources, thresholds, parameters, and so on). In addition, the apparatuses 1002, 1004, and 1006 include user interface devices 1044, 1046, and 1048, respectively, for providing indications (e.g., audible and/or visual indications) to a user and/or for receiving user input (e.g., upon user actuation of a sensing device such a keypad, a touch screen, a microphone, and so on).

For convenience, the apparatuses 1002, 1004, and/or 1006 are shown in FIG. 10 as including various components that may be configured according to the various examples described herein. It will be appreciated, however, that the illustrated blocks may have different functionality in different designs.

The components of FIG. 10 may be implemented in various ways. In some implementations, the components of FIG. 10 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1008, 1032, 1038, 1044, and 1054 may be implemented by processor and memory component(s) of the apparatus 1002 (e.g., by execution of appropriate code and/or by appropriate configuration of processor components). Similarly, some or all of the functionality represented by blocks 1014, 1020, 1034, 1040, 1046, and 1056 may be implemented by processor and memory component(s) of the apparatus 1004 (e.g., by execution of appropriate code and/or by appropriate configuration of processor components). Also, some or all of the functionality represented by blocks 1026, 1036, 1042, 1048, and 1058 may be implemented by processor and memory component(s) of the apparatus 1006 (e.g., by execution of appropriate code and/or by appropriate configuration of processor components). For example, the positioning modules 1054, 1056, and 1058 may be executable modules stored in memory, or may be hardware/firmware components coupled to the processing systems 1032, 1034, and 1036.

Figure 11:
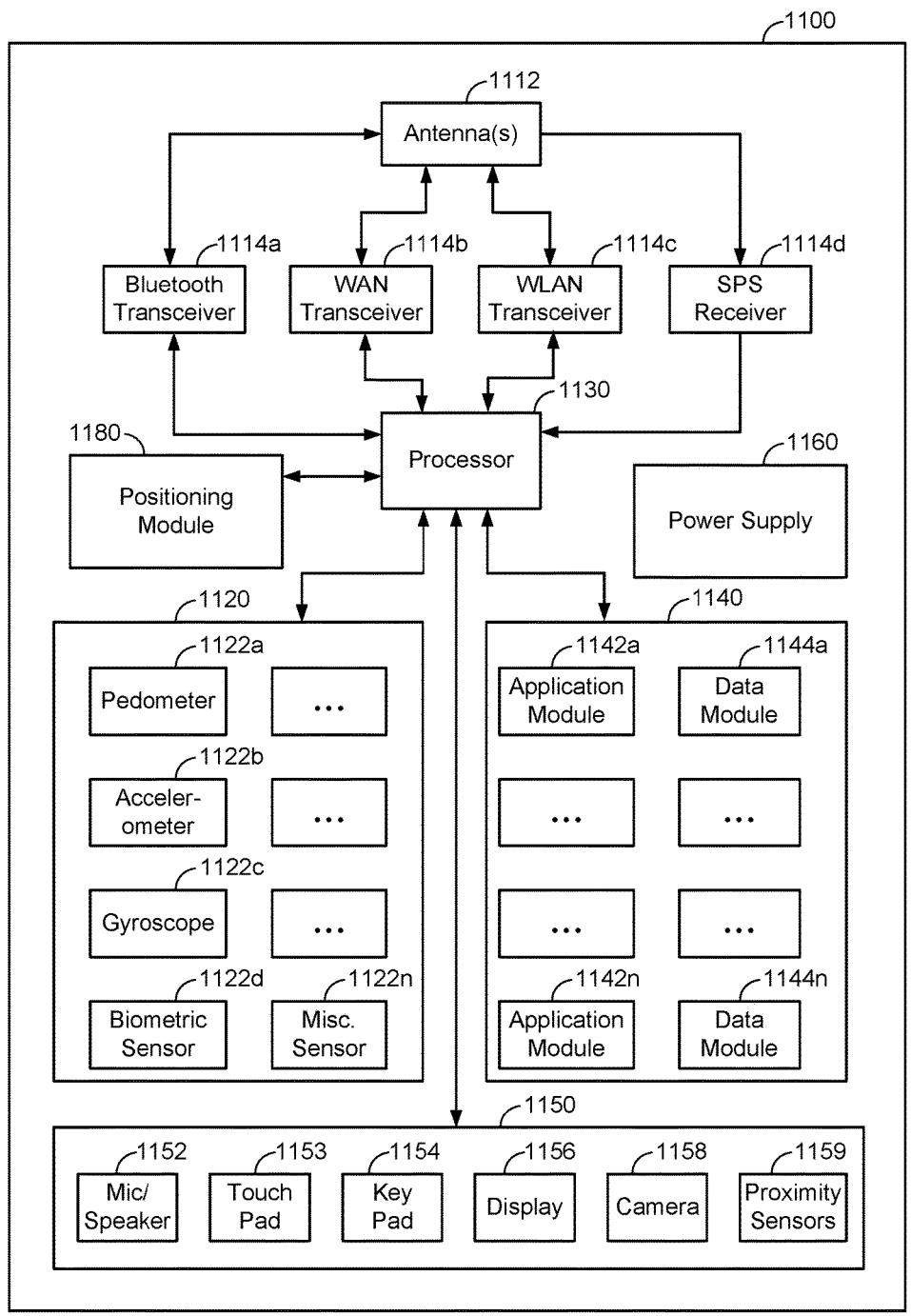
FIG. 11 illustrates an example of a user equipment (UE) in accordance with at least one aspect of the disclosure.

FIG. 11 is a block diagram illustrating exemplary components of a UE 1100 according to at least one aspect of the disclosure. The UE 1100 may correspond to or represent any of UEs 1 to N in FIG. 1A, UE 200, UE 300, UE 400, UE 500, UE 600, UE 700, UE 800 or UE 900. The various features and functions illustrated in the box diagram of FIG. 11 may be connected together using a common bus (not shown in FIG. 11) or may be connected (as shown in FIG. 11) via processor(s) 1130. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 11 may be further subdivided or two or more of the features or functions illustrated in FIG. 11 may be combined.

The UE 1100 may include one or more Bluetooth transceivers 1114a that may be connected to one or more antennas 1112. The Bluetooth transceiver 1114a comprises suitable devices, hardware, and/or software for communicating with and/or detecting signals to/from a Bluetooth access point (e.g., AP 125 in FIG. 1A). Additionally or alternatively, the UE 1100 may include one or more wide area network (WAN) wireless transceiver(s) 1114b that may be connected to one or more antennas 1112. The WAN transceiver(s) 1114b comprise(s) suitable devices, hardware, and/or software for communicating with and/or detecting signals to/from WAN-WAPs (wireless access points), and/or directly with other wireless devices within a network (e.g., devices in RAN 120 in FIG. 1A). In one aspect, the WAN transceiver(s) 1114b may be suitable for communicating with an LTE system, WCDMA system, CDMA2000 system, TDMA, GSM or any other type of wide area wireless networking technologies. Additionally or alternatively, the UE 1100 may include one or more WLAN transceivers 1114c that may be connected to one or more antennas 1112. The WLAN transceiver(s) 1114c comprise(s) suitable devices, hardware, and/or software for communicating with and/or detecting signals to/from WLAN-WAPs, and/or directly with other wireless devices within a network (e.g., a WiFi AP 125 in FIG. 1A). In one aspect, the WLAN transceiver(s) 1114c may comprise a Wi-Fi (802.11x) communication system suitable for communicating with one or more wireless access points; however in other aspects, the WLAN transceiver 1114c may comprise another type of local area network or personal area network. Additionally or alternatively, the UE 1100 may include an SPS receiver 1114d. The SPS receiver 1114d may be connected to the one or more antennas 1112 for receiving satellite signals (e.g., for GPS or some other GNSS). The SPS receiver 1114d may comprise any suitable hardware and/or software for receiving and processing SPS signals. The SPS receiver 1114d requests information and operations as appropriate from the other systems, and performs the calculations necessary to determine the position for mobile device 1100 using measurements obtained by any suitable SPS algorithm. Additionally or alternatively, any other type of wireless networking technologies may be used, for example, Ultra Wide Band, ZigBee, wireless USB, etc.

The UE 1100 may include one or more sensors 1120. The one or more sensors 1120 may collect data on the user, including data on the user's position, motion, orientation, environment, activities, or biometrics. The sensors may include, for example, virtual sensors such as a pedometer 1122a, and physical sensors such as an accelerometer 1122b, a gyroscope 1122c, a biometric sensor 1120d, and/or any number of miscellaneous sensors 1122n (e.g., thermometer, barometer, hygrometer).

The UE 1100 includes one or more processors 1130. The processor(s) 1130 may be connected to the Bluetooth transceiver(s) 1114a, WAN transceiver(s) 1114b, WLAN transceiver(s) 1114c, the SPS receiver 1114d and the one or more sensors 1120. The processor 1130 may be a multi-core processor and although illustrated as a single unit may include one or more microprocessors, microcontrollers, and/or digital signal processors that provide processing functions, as well as other calculation and control functionality.

The processor(s) 1130 may be coupled to memory 1140, which stores data and software instructions for executing programmed functionality within the UE 1100. The memory 1140 may be on-board the processor(s) 1130 (e.g., within the same integrated circuit package), and/or the memory 1140 may be external memory to the processor(s) 1130 and functionally coupled over a data bus. The memory 1140 may include any number of native application modules 1142a . . . 1142n and a number of externally supplied modules by over the air update or any other means and any number of data modules 1144a . . . 1144n. One should appreciate that the organization of the memory contents as shown in FIG. 11 is merely exemplary, and as such the functionality of the modules and/or data structures may be combined, separated, and/or be structured in different ways depending upon the implementation of the UE 1100. The memory 1140 may store program code (e.g., in one or more of the application modules 1142a to 1142n) that may run on processor(s) 1130 to enable UE 1100 to perform some or all of the various procedures and techniques described herein.

The UE 1100 may also include a positioning module 1180 configured to perform user device operations to support OTT SP and UE related location, as described herein. The positioning module 1180 may be an executable module stored in memory 1140 and running on processor(s) 1130, or may be a hardware or firmware component coupled to processor(s) 1130.

While the modules shown in FIG. 11 are illustrated in the example as being contained in the memory 1140, it is recognized that in certain implementations such procedures may be provided for or otherwise operatively arranged using other or additional mechanisms. For example, any of the application modules 1142a . . . 1142n may be provided in firmware. The processor(s) 1130 may include any form of logic suitable for performing at least the techniques provided herein. For example, the processor(s) 1130 may be operatively configurable based on instructions in the memory 1140 to selectively initiate one or more routines that exploit motion data for use in other portions of the UE 1100.

The UE 1100 may include a user interface 1150 which provides any suitable interface systems, such as a microphone/speaker 1152, touch pad 1153, keypad 1154, display 1156, camera 1158 and proximity sensors 1159 that allows user interaction with the UE 1100. The microphone/speaker 1152 provides for voice recognition and/or voice communication services using the WAN transceiver(s) 1114b and/or the WLAN transceiver(s) 1114c. The keypad 1154 comprises any suitable buttons for user input. The display 1156 comprises any suitable display, such as, for example, a backlit LCD display, and may further include a touch screen display for additional user input modes. Moreover, any input functionality such as the functionality demonstrated by microphone/speaker 1152, camera 1158 or keypad 1154 may also be considered a sensor input analogous to the inputs of the one or more sensors 1120.

The UE 1100 further includes a power supply 1160, for example, a battery, for supplying power to the various components of the UE 1100. However, it will be appreciated that UE 1100 may not include all the elements illustrated and most likely will include only a subset of elements based on the requirements of the device and design considerations.

As noted above, the one or more sensors 1120 may collect data on the user, including data on the user's position, orientation, motion, environment, activities, or biometrics. The sensors may include, for example, a pedometer 1122*a* (which may be a discreet device or a functional module based on data from other sensors), an accelerometer 1122*b*, a gyroscope 1122*c*, a biometric sensor 1120*d*, and/or any number of miscellaneous sensors 1122*n*. Moreover, the Bluetooth transceiver(s) 1114*a*, WAN transceiver(s) 1114*b*, WLAN transceiver(s) 1114*c* and/or the SPS receiver 1114*d* may be utilized as sensors to the extent that they can be used to generate data on the user's position, motion, environment, and/or activities. Accordingly, when the present disclosure refers to the one or more sensors 1120 generally, or to sensors readings or sensor data, it should be understood that the Bluetooth transceiver(s) 1114*a*, WAN transceiver(s) 1114*b*, WLAN transceiver(s) 1114*c* and/or the SPS receiver 1114*d* may be considered sensors, and the data obtained therefrom may be considered sensors readings or sensor data.

In an embodiment, biometric sensor 1122*d* includes a sensor for identifying a user. For example, the biometric sensor 1122*d* may be a sensor for voice recognition, fingerprint recognition, palm print recognition, face recognition, or iris recognition. The biometric sensor 1122*d* may be a dedicated sensor specifically designed for voice recognition, fingerprint recognition, palm print recognition, face recognition, and/or iris recognition. In another possible scenario, the microphone/speaker 1152 is used as a sensor for voice recognition. In another possible scenario, the keypad 1154 is used as a sensor for fingerprint recognition and/or palm print recognition. In yet another possible scenario, the camera 1158 is used as a sensor for face recognition and/or iris recognition.

As noted above, processor(s) 1130 may be coupled to memory 1140, which stores data and software instructions for executing programmed functionality within the UE 1100. The memory 1140 may include any number of application modules 1142*a* . . . 1142*n* and any number of data modules 1144*a* . . . 1144*n*. In an embodiment, one or more of application modules 1142*a* . . . 1142*n*, for example, application module 1142*a*, utilizes sensed data gathered from one or more of pedometer 1122*a*, accelerometer 1122*b*, gyroscope 1122*c*, biometric sensors 1120*d*, and/or miscellaneous sensors 1122*n*. The sensed data may be stored in one or more of data modules 1144*a* . . . data module 1144*n*, for example, data module 1144*a*.

Accordingly, an embodiment of the disclosure can include a UE (e.g., UE 1100) including the ability to perform the functions described herein. As will be appreciated by those skilled in the art, the various logic elements can be embodied in discrete elements, software modules executed on a processor or any combination of software and hardware to achieve the functionality disclosed herein. For example, processor 1130, memory 1140, user interface 1150, and positioning module 1180 may all be used cooperatively to load, store and execute the various functions disclosed herein and thus the logic to perform these functions may be distributed over various elements. Alternatively, the functionality could be incorporated into one discrete component. Therefore, the features of the UE 1100 in FIG. 11 are to be considered merely illustrative and the disclosure is not limited to the illustrated features or arrangement.

The wireless communication between the UE 1100 and the RAN 120/MME 142 can be based on different technologies, such as LTE, CDMA, WCDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs 1100 from the RAN 120 using a variety of networks and configurations. Accordingly, the illustrations provided herein are not intended to limit the embodiments of the disclosure and are merely to aid in the description of aspects of embodiments of the disclosure.

Figure 12:
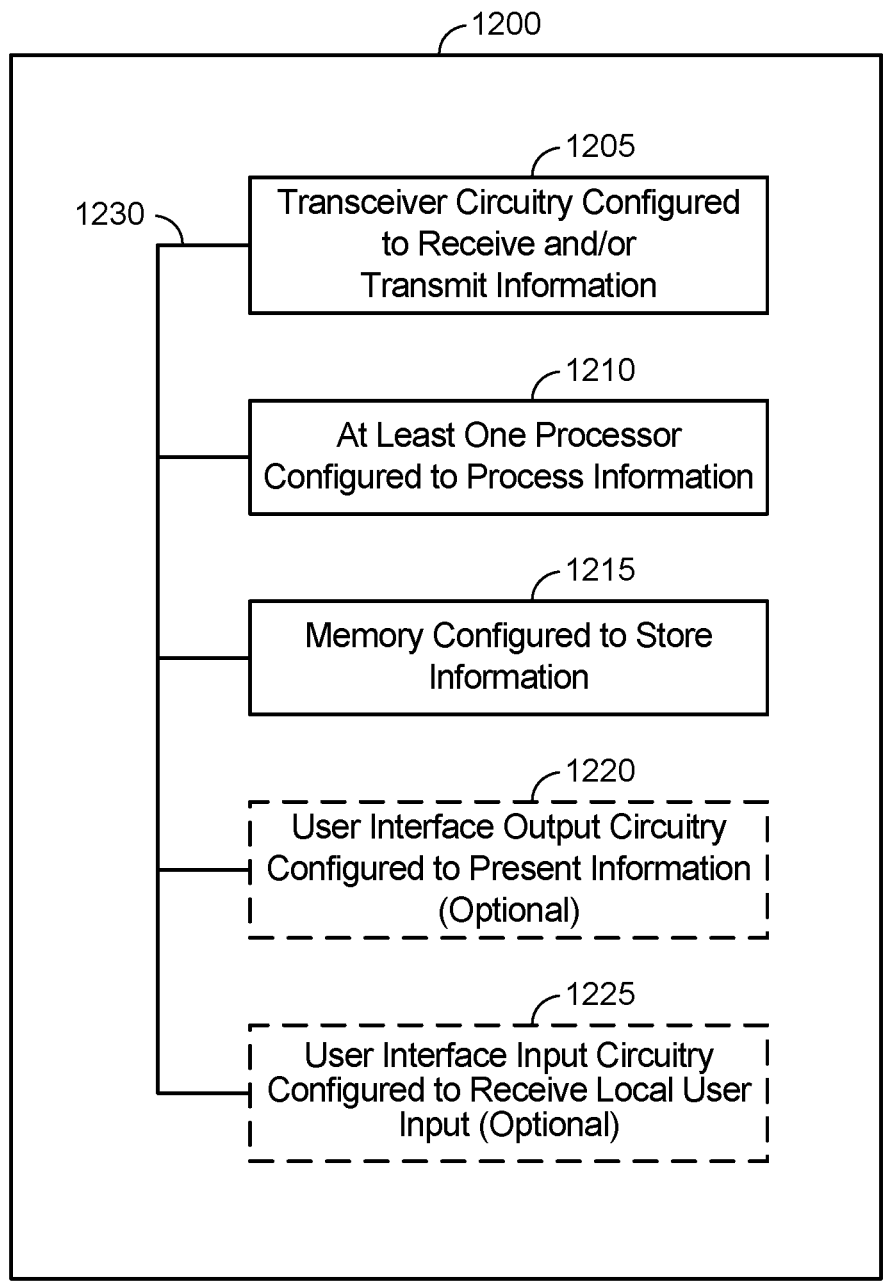
FIG. 12 illustrates a communication device that includes structural components to perform the functionality described herein.

FIG. 12 illustrates a communication device 1200 that includes structural components to perform functionality. The communication device 1200 can correspond to any of the above-noted communication devices, including but not limited to UE 1100, any component of the RAN 120 (e.g., eNodeBs 122-126), any component of the core network 140 (e.g., MME 142 or 144, E-SMLC 172, S-GW 146, PDG 148, ELS 370/794, E-CSCF 443/543/643, LRF 448/548/648), any components coupled with the core network 140 and/or the Internet 175 (e.g., the location server 170, the GMLC/SLP 170, ESInet 160, PSAP 180), and so on. Thus, communication device 1200 can correspond to any electronic device that is configured to communicate with (or facilitate communication with) one or more other entities over the wireless communications system 100A of FIG. 1A or using the particular configuration 100B of FIG. 1B.

Referring to FIG. 12, the communication device 1200 includes transceiver circuitry configured to receive and/or transmit information 1205. In an example, if the communication device 1200 corresponds to a wireless communications device (e.g., UE 1100, one of eNBs 122-126, etc.), the transceiver circuitry configured to receive and/or transmit information 1205 can include a wireless communications interface (e.g., Bluetooth, WiFi, 2G, CDMA, WCDMA, 3G, 4G, LTE, etc.) such as a wireless transceiver and associated hardware (e.g., an RF antenna, a MODEM, a modulator and/or demodulator, etc.). In another example, the transceiver circuitry configured to receive and/or transmit information 1205 can correspond to a wired communications interface (e.g., a serial connection, a USB or Firewire connection, an Ethernet connection through which the Internet 175 can be accessed, etc.). Thus, if the communication device 1200 corresponds to some type of network-based server (e.g., S-GW 146, PDG 148, MME 142/144, E-SMLC 172, the location server 170, ELS 370/794, E-CSCF 443/543/643, LRF 448/548/648, etc.), the transceiver circuitry configured to receive and/or transmit information 1205 can correspond to an Ethernet card, in an example, that connects the network-based server to other communication entities via an Ethernet protocol. In a further example, the transceiver circuitry configured to receive and/or transmit information 1205 can include sensory or measurement hardware by which the communication device 1200 can monitor its local environment (e.g., an accelerometer, a temperature sensor, a light sensor, an antenna for monitoring local RF signals, etc.). The transceiver circuitry configured to receive and/or transmit information 1205 can also include software that, when executed, permits the associated hardware of the transceiver circuitry configured to receive and/or transmit information 1205 to perform its reception and/or transmission function(s). However, the transceiver circuitry configured to receive and/or transmit information 1205 does not correspond to software alone, and the transceiver circuitry configured to receive and/or transmit information 1205 relies at least in part upon structural hardware to achieve its functionality.

Referring to FIG. 12, the communication device 1200 further includes at least one processor configured to process information 1210. Example implementations of the type of processing that can be performed by the at least one processor configured to process information 1210 includes but is not limited to performing determinations, establishing connections, making selections between different information options, performing evaluations related to data, interacting with sensors coupled to the communication device 1200 to perform measurement operations, converting information from one format to another (e.g., between different protocols such as .wmv to .avi, etc.), and so on. For example, the at least one processor configured to process information 1210 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 310 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 1210 can also include software that, when executed, permits the associated hardware of the at least one processor configured to process information 1210 to perform its processing function(s). However, the at least one processor configured to process information 1210 does not correspond to software alone, and the at least one processor configured to process information 1210 relies at least in part upon structural hardware to achieve its functionality.

Referring to FIG. 12, the communication device 1200 further includes memory configured to store information 1215. In an example, the memory configured to store information 1215 can include at least a non-transitory memory and associated hardware (e.g., a memory controller, etc.). For example, the non-transitory memory included in the memory configured to store information 1215 can correspond to RAM, flash memory, read-only memory (ROM), erasable programmable ROM (EPROM), electrically erasable programmable ROM (EEPROM), registers, hard disk, a removable disk, a CD-ROM, or any other form of storage medium known in the art. The memory configured to store information 1215 can also include software that, when executed, permits the associated hardware of the memory configured to store information 1215 to perform its storage function(s). However, the memory configured to store information 1215 does not correspond to software alone, and the memory configured to store information 1215 relies at least in part upon structural hardware to achieve its functionality.

Referring to FIG. 12, the communication device 1200 further optionally includes user interface output circuitry configured to present information 1220. In an example, the user interface output circuitry configured to present information 1220 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1200. For example, if the communication device 1200 corresponds to the UE 1100 as shown in FIG. 11, the user interface output circuitry configured to present information 1220 can include the display 1056 and/or the speaker 1052. In a further example, the user interface output circuitry configured to present information 1220 can be omitted for certain communication devices, such as network communication devices that do not have a local user (e.g., network switches or routers, remote servers, etc.). The user interface output circuitry configured to present information 1220 can also include software that, when executed, permits the associated hardware of the user interface output circuitry configured to present information 1220 to perform its presentation function(s). However, the user interface output circuitry configured to present information 1220 does not correspond to software alone, and the user interface output circuitry configured to present information 1220 relies at least in part upon structural hardware to achieve its functionality.

Referring to FIG. 12, the communication device 1200 further optionally includes user interface input circuitry configured to receive local user input 1225. In an example, the user interface input circuitry configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 1200. For example, if the communication device 1200 corresponds to the UE 1100 as shown in FIG. 11, the user interface input circuitry configured to receive local user input 1225 can include the touch pad 1153, the keypad 1154, the microphone 1152, etc. In a further example, the user interface input circuitry configured to receive local user input 1225 can be omitted for certain communication devices, such as network communication devices that do not have a local user (e.g., network switches or routers, remote servers, etc.). The user interface input circuitry configured to receive local user input 1225 can also include software that, when executed, permits the associated hardware of the user interface input circuitry configured to receive local user input 1225 to perform its input reception function(s). However, the user interface input circuitry configured to receive local user input 1225 does not correspond to software alone, and the user interface input circuitry configured to receive local user input 1225 relies at least in part upon structural hardware to achieve its functionality.

Referring to FIG. 12, while the configured structural components of 1205 through 1225 are shown as separate or distinct blocks in FIG. 12, that are coupled to each other via an associated communication bus 1230, it will be appreciated that the hardware and/or software by which the respective configured structural components of 1205 through 1225 performs their respective functionality can overlap in part. For example, any software used to facilitate the functionality of the configured structural components of 1205 through 1225 can be stored in the non-transitory memory associated with the memory configured to store information 1215, such that the configured structural components of 1205 through 1225 each performs their respective functionality (i.e., in this case, software execution) based in part upon the operation of software stored by the memory configured to store information 1215. Likewise, hardware that is directly associated with one of the configured structural components of 1205 through 1225 can be borrowed or used by other configured structural components of 1205 through 1225 from time to time. For example, the at least one processor configured to process information 1210 can format data into an appropriate format before being transmitted by the transceiver circuitry configured to receive and/or transmit information 1205, such that the transceiver circuitry configured to receive and/or transmit information 1205 performs its functionality (i.e., in this case, transmission of data) based in part upon the operation of structural hardware associated with the at least one processor configured to process information 1210.

Accordingly, the various structural components of 1205 through 1225 are intended to invoke an aspect that is at least partially implemented with structural hardware, and are not intended to map to software-only implementations that are independent of hardware and/or to non-structural functional interpretations. Other interactions or cooperation between the structural components of 1205 through 1225 will become clear to one of ordinary skill in the art from a review of the aspects described below in more detail.

Figure 13:
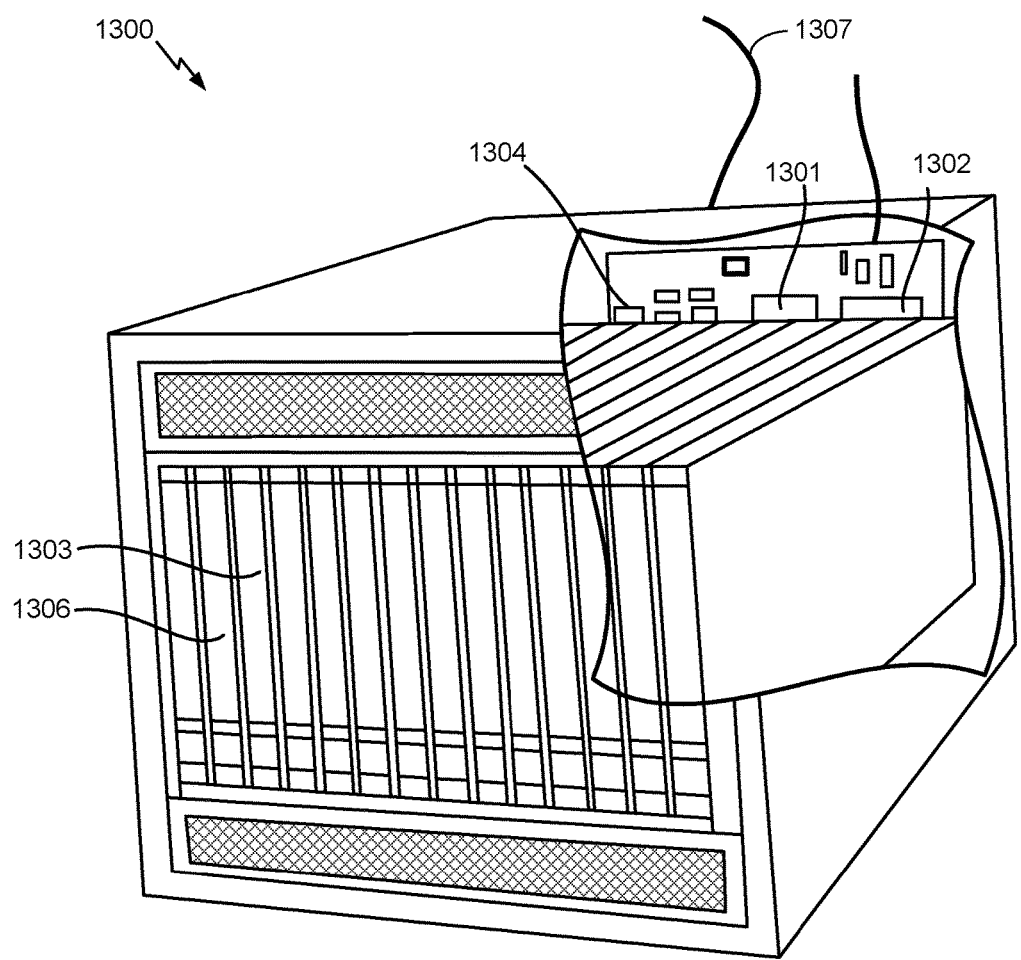
FIG. 13 illustrates a server in accordance with an embodiment of the disclosure.

The various embodiments may be implemented on any of a variety of commercially available server devices, such as server 1300 illustrated in FIG. 13. In an example, the server 1300 may correspond to one example configuration of the MME 142, the OTT SP 150/350/450/550/650/750/850/950, ESInet 160, E-SMLC 172, location server/GMLC/SLP 170, the ELS 370/794, the E-CSCF 443/543/643, the LRF 448/548/648 and the PSAP 180 described above. In FIG. 13, the server 1300 includes a processor 1301 coupled to volatile memory 1302 and a large capacity nonvolatile memory, such as a disk drive 1303. The server 1300 may also include a floppy disc drive, compact disc (CD) or DVD disc drive 1306 coupled to the processor 1301. The server 1300 may also include network access ports 1304 coupled to the processor 1301 for establishing data connections with a network 1307, such as a local area network coupled to other broadcast system computers and servers or to the Internet. In context with FIG. 12, it will be appreciated that the server 1300 of FIG. 13 illustrates one example implementation of the communication device 1200, whereby the logic configured to transmit and/or receive information 1205 corresponds to the network access ports 1304 used by the server 1300 to communicate with the network 1307, the logic configured to process information 1210 corresponds to the processor 1301, and the logic configuration to store information 1215 corresponds to any combination of the volatile memory 1302, the disk drive 1303 and/or the disc drive 1306. The optional logic configured to present information 1220 and the optional logic configured to receive local user input 1225 are not shown explicitly in FIG. 13 and may or may not be included therein. Thus, FIG. 13 helps to demonstrate that the communication device 1200 may be implemented as a server, in addition to a UE implementation as in FIG. 11. Accordingly, an embodiment of the disclosure can include a server (e.g., server 1300) including the ability to perform the functions described herein, such as the functions described with reference to the MME 142, OTT-SP 150, ESInet 160, E-SMLC 172, location server/GMLC/SLP 170, the ELS 370/794, the E-CSCF 443/543/643, the LRF 448/548/648 and the PSAP 180, for example.

Figure 14:
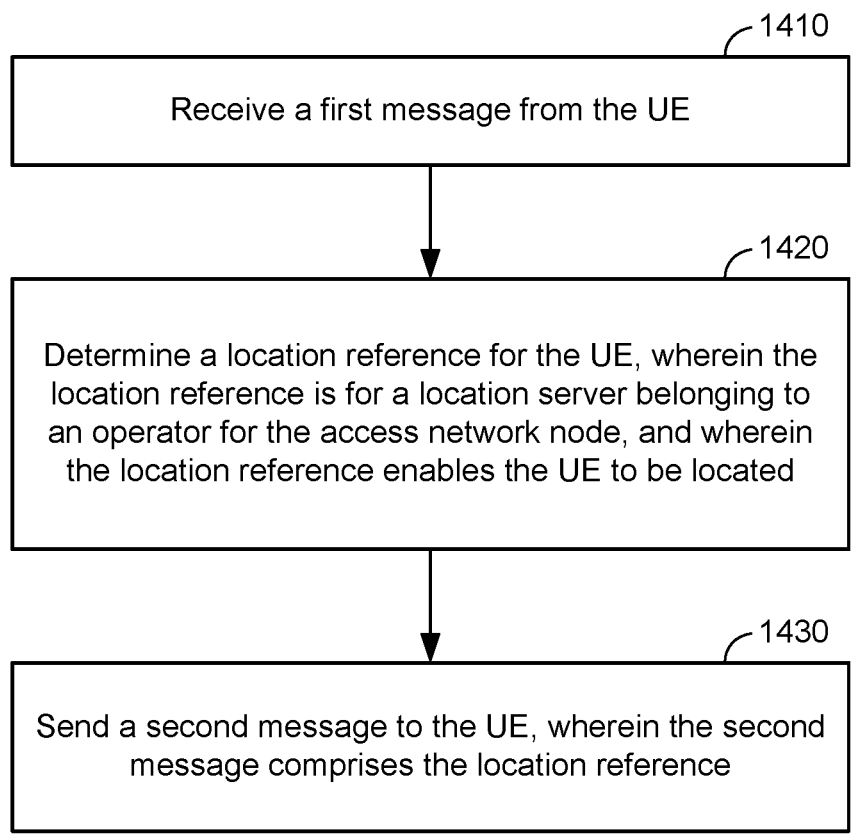
FIGS. 14-20 illustrate exemplary flows for locating a UE according to various aspects of the disclosure.

FIG. 14 illustrates an exemplary flow for locating a UE performed by an access network node serving the UE, such as any component of the RAN 120 or CN 140 in FIGS. 1A and 1B. For example, the access network node may correspond to MME 142.

At 1410, the access network node receives a first message from the UE, such as at 206A of FIG. 2A or 202B of FIG. 2B. For example, where the access network node corresponds to an MME supporting LTE, the first messages may be a NAS Attach Request or a NAS Tracking Area Update Request. Where the access network node corresponds to an SGSN supporting UMTS, the first message may be a GPRS Attach Request or a GPRS Routing Area Update Request.

At 1420, the access network node determines a location reference for the UE. The location reference may be for a location server, such as location server 170 in FIG. 1A or GMLC/SLP 170 in FIG. 1B, belonging to an operator for the access network node, and enables the UE to be located. The location reference for the UE may include the address of the location server and a UE reference of the UE. The UE reference may be assigned by the location server and may include an IP address, an IMSI, a TMSI, an address of the access network node, or any combination thereof. The UE reference may also be ciphered.

As discussed above with reference to 208A of FIG. 2A or 204B of FIG. 2B, the determining at 1420 may include sending a request for the location reference for the UE to the location server and receiving the location reference for the UE from the location server. Alternatively, as discussed above, the access network node may generate the location reference for the UE itself. In that case, the access network node may digitally sign the location reference for the UE to indicate that the location reference for the UE was generated by the access network node for the operator.

At 1430, the access network node sends a second message to the UE, such as at 212A of FIG. 2A or 206B of FIG. 2B. The second message may include the location reference. Where the access network node corresponds to an MME supporting LTE, the second messages may be a NAS Attach Accept or a NAS Tracking Area Update Accept. Where the access network node corresponds to an SGSN supporting UMTS, the second messages may be a GPRS Attach Accept or a GPRS Routing Area Update Accept.

The UE may include the location reference for the UE in an emergency services call request sent to an OTT SP, such as OTT SP 150. The UE may send the emergency services call request to the OTT SP via an access network different than the access network of the access network node. The OTT SP may obtain the location of the UE from the location server based on the location reference.

Although not shown, the flow illustrated in FIG. 14 may further include authenticating the UE prior to sending the second message. Additionally, the flow illustrated in FIG. 14 may further include periodically determining a new location reference for the UE while the UE is attached to the access network node and sending the new location reference to the UE.

Figure 15:
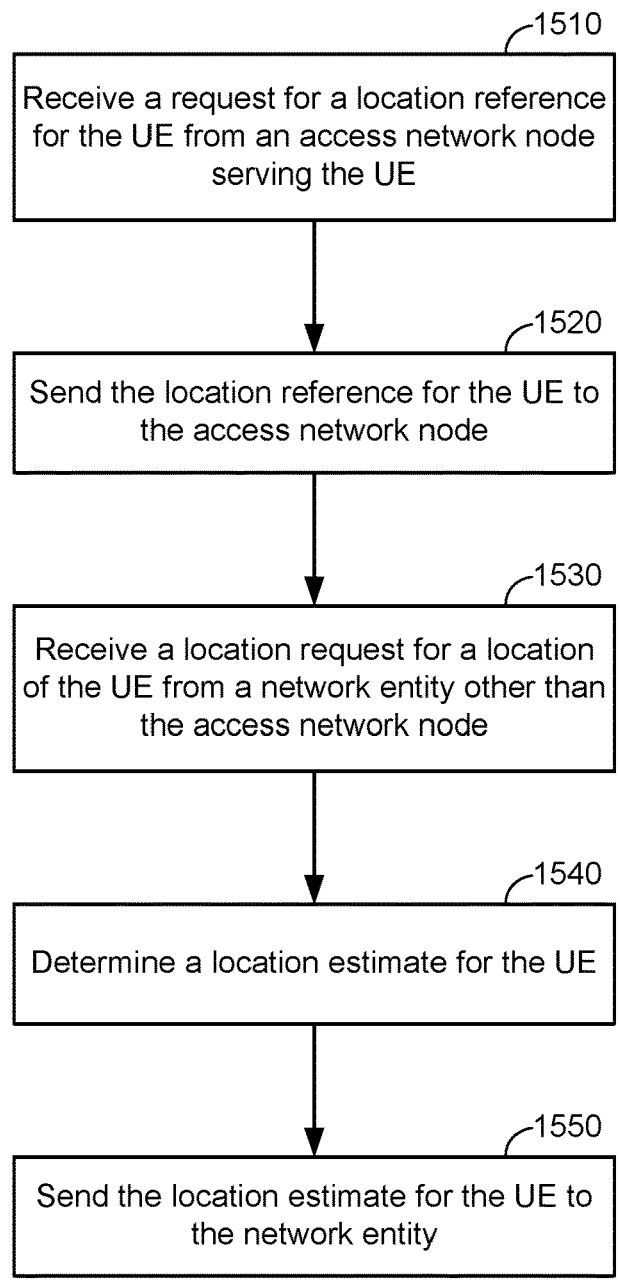

FIG. 15 illustrates an exemplary flow for locating a UE performed at a location server, such as location server 170 in FIG. 1A or GMLC/SLP 170 in FIG. 1B.

At 1510, the location server receives a request for a location reference for the UE from an access network node serving the UE, such as at 208A of FIG. 2A or 204B of FIG. 2B.

At 1520, the location server sends the location reference for the UE to the access network node, such as at 208A of FIG. 2A or 204B of FIG. 2B. The location reference may include an address of the location server and a local reference for the UE.

At 1530, the location server receives a location request for a location of the UE from a network entity other than the access network node, such as at 216A of FIG. 2A or 214B of FIG. 2B. The location request may include the location reference for the UE. The other network entity may be a network entity belonging to an OTT SP, an ESInet provider, or a PSAP, for example.

At 1540, the location server may determine a location estimate for the UE, such as at 218A of FIG. 2A or 216B-226B or 228B of FIG. 2B. Where the location server corresponds to an SLP, determining the location estimate for the UE may include establishing a SUPL session with the UE. Where the location server corresponds to a GMLC, determining the location estimate for the UE may include determining the location estimate using a control plane location solution. In that case, determining the location estimate using the control plane location solution may include sending a location request to the access network node and receiving a location response from the access network node containing the location estimate, as at 218A of FIG. 2A or 216B-226B of FIG. 2B.

At 1550, the location server sends the location estimate for the UE to the network entity, such as at 224A of FIG. 2A or 232B of FIG. 2B.

The UE includes the location reference in an emergency services call request sent to an OTT SP. In an embodiment, the UE may send the emergency services call request to the OTT SP via an access network for an operator different to the operator for the location server.

Figure 16:
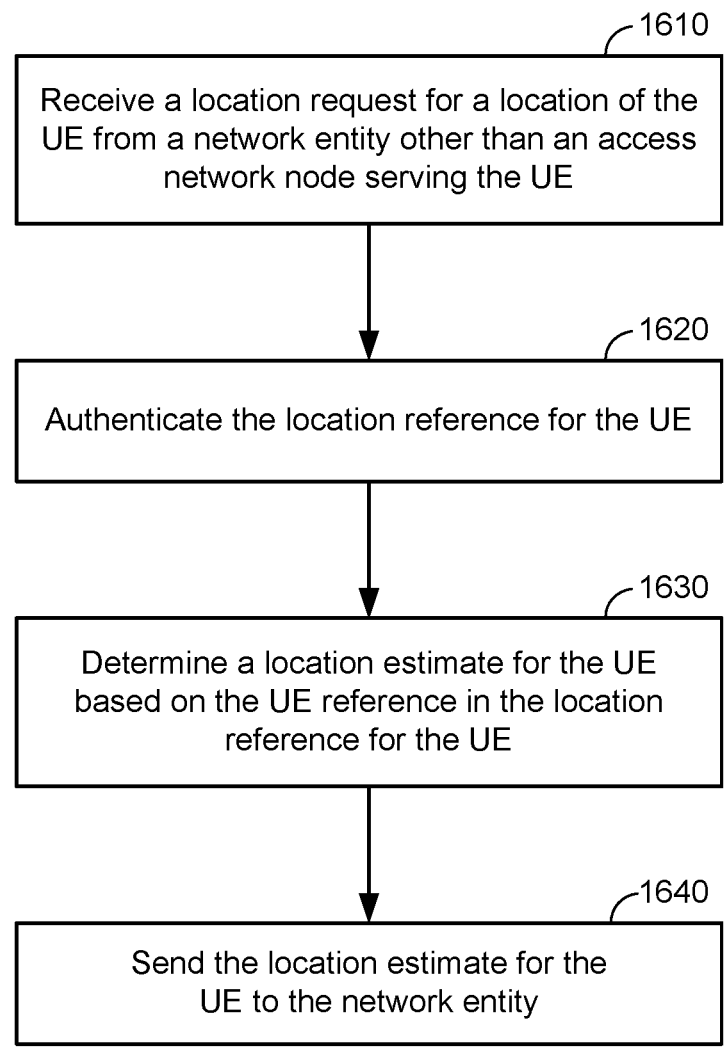

FIG. 16 illustrates an exemplary flow for locating a UE performed at a location server, such as location server 170 in FIG. 1A or GMLC/SLP 170 in FIG. 1B.

At 1610, the location server receives a location request for a location of the UE from a network entity other than an access network node serving the UE, such as at 216A of FIG. 2A or 214B of FIG. 2B. The location request may include a location reference for the UE. The location reference may include a UE reference for the UE. The UE reference may be an IP address, an IMSI, a TMSI, an address of the access network node, or any combination thereof. The other network entity may be a network entity belonging to an OTT SP, an ESInet provider, or a PSAP, for example.

At 1620, the location server authenticates the location reference for the UE. The location reference may include a digital signature, in which case, authenticating the location reference may include authenticating the digital signature.

At 1630, the location server determines a location estimate for the UE based on the UE reference in the location reference for the UE, such as at 218A of FIG. 2A or 216B-226B or 228B of FIG. 2B. In an embodiment, the UE reference may be ciphered, in which case, determining a location estimate for the UE may include deciphering the ciphered UE reference. Where the location server corresponds to an SLP, determining the location estimate for the UE may include establishing a SUPL session with the UE. Where the location server corresponds to a GMLC, determining the location estimate for the UE may include determining the location estimate using a control plane location solution. In that case, determining the location estimate using the control plane location solution may include sending a location request to the access network node and receiving a location response from the access network node containing the location estimate, as at 218A of FIG. 2A or 216B-226B of FIG. 2B.

At 1640, the location server sends the location estimate for the UE to the other network entity, such as at 224A of FIG. 2A or 232B of FIG. 2B.

The UE may include the location reference for the UE in an emergency services call request sent to an OTT SP, such as OTT SP.

Figure 17:
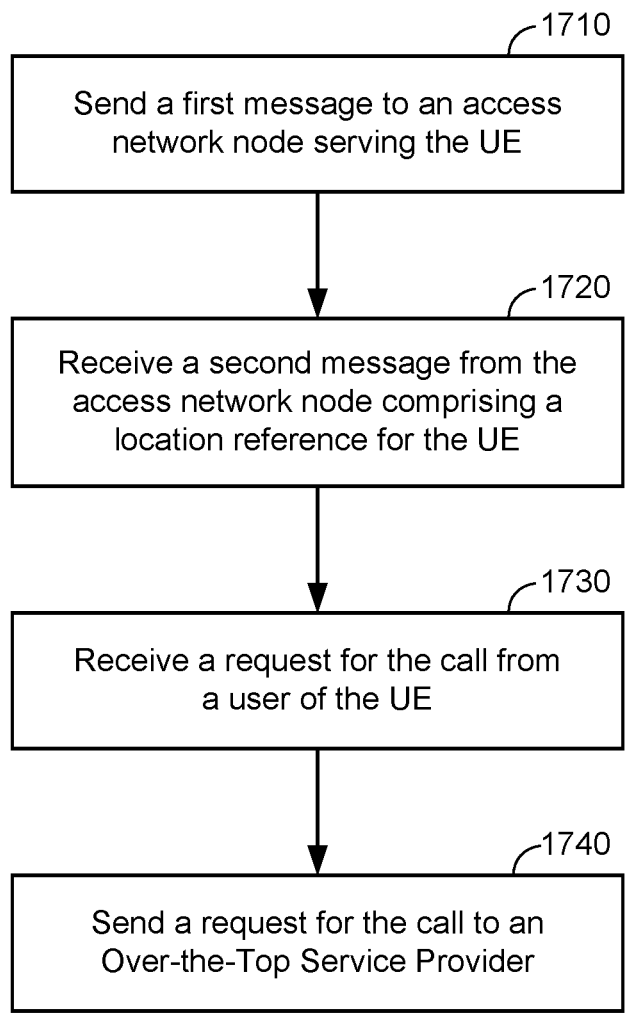

FIG. 17 illustrates an exemplary flow for locating a UE making a call performed by the UE, such as UE 1100. The call may be an emergency call.

At 1710, the UE sends a first message to an access network node serving the UE. Where the access network node corresponds to an MME supporting LTE, the first messages may be a NAS Attach Request or a NAS Tracking Area Update Request. Where the access network node corresponds to an SGSN supporting UMTS, the first message may be a GPRS Attach Request or a GPRS Routing Area Update Request.

At 1720, the UE receives a second message from the access network node including a location reference for the UE. The location reference may be for a location server, such as location server 170 in FIG. 1A or GMLC/SLP 170 in FIG. 1B, belonging to an operator for the access network node and may enable the UE to be located for the call. The location reference for the UE may include the address of the location server and a UE reference of the UE. Where the access network node corresponds to an MME supporting LTE, the first messages may be a NAS Attach Request or a NAS Tracking Area Update Request. Where the access network node corresponds to an SGSN supporting UMTS, the first message may be a GPRS Attach Request or a GPRS Routing Area Update Request. Although not illustrated in FIG. 17, the flow may further include authenticating the UE to the access network node prior to receiving the second message.

At 1730, the UE receives a request for the call from a user of the UE.

At 1740, the UE sends a request for the call to an OTT SP, such as OTT SP 150. The request for the call may include the location reference for the UE. In an embodiment, the call request is sent by the UE to the OTT SP via an access network different than the access network for the access network node.

Although not illustrated in FIG. 17, the flow may further include periodically receiving a new location reference for the UE from the access network node while the UE is attached to the access network node.

Figure 18:
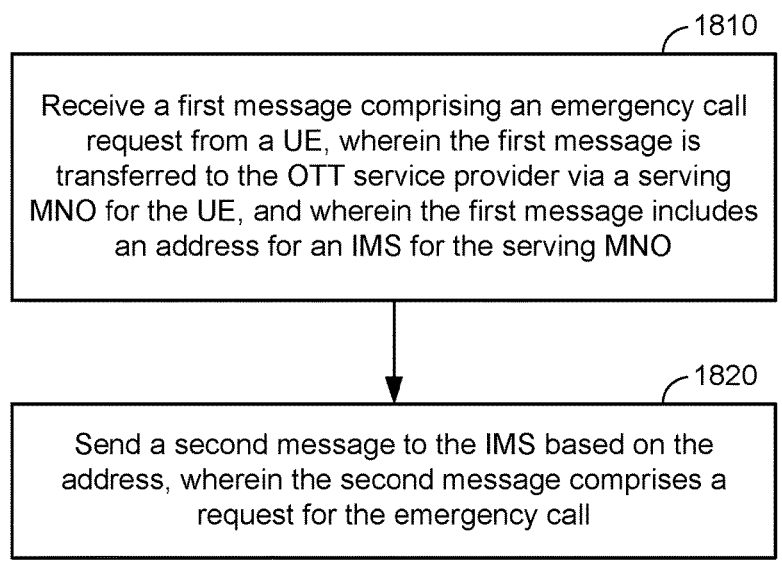

FIG. 18 illustrates an exemplary flow for supporting emergency calls at an OTT service provider, such as OTT SP 150. In an embodiment, the flow illustrated in FIG. 18 may be performed by, or caused to be performed by, the positioning module 1058.

At 1810, the OTT SP 150 receives a first message comprising an emergency call request from a UE, such as any of UEs 200, 300, 400, 500, 600, 700, 800, 900, 1002, and 1100, as at 806 and 906. The first message is transferred to the OTT SP 150 via a serving MNO for the UE, such as serving MNO 790, 890, or 990. The first message includes an address for an IMS, such as IMS 894 or 994, for the serving MNO.

At 820, the OTT SP 150 sends a second message to the IMS based on the address, as at 808 and 908. The second message may be a request for the emergency call. The first message, the second message, or both messages may be a SIP INVITE.

Although not illustrated in FIG. 18, the flow may further include receiving a third message from the IMS comprising routing information for a destination PSAP, as at 812, and sending a fourth message to or towards the PSAP based on the routing information. The third message may be a SIP 300 Multiple Choices message, and the fourth message may be a request for the emergency call. The address for the IMS may be for a LRF. The routing information may include a reference ID, in which case, the flow may further include including the reference ID in the fourth message, where the reference ID enables the PSAP to obtain a location for the UE from the LRF.

The IMS may send a fifth message to or towards a destination PSAP, where the fifth message may be an emergency call request for the UE. The address for the IMS may be for an E-CSCF. The IMS includes a reference identifier in the fifth message, where the reference identifier enables the PSAP to obtain a location for the UE from the IMS.

Figure 19:
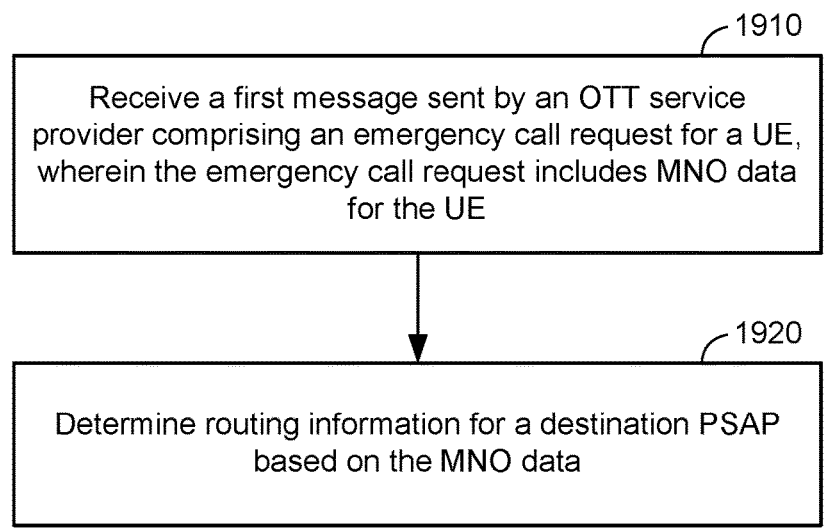

FIG. 19 illustrates an exemplary flow for supporting emergency calls at an IMS entity, such as IMS 894 or 994, for a serving MNO, such as serving MNO 890 or 990. In an aspect, the IMS entity may be a LRF. In an embodiment, the flow illustrated in FIG. 19 may be performed by, or caused to be performed by, the positioning module 1058.

At 1910, the IMS entity receives a first message sent by an OTT service provider, such as OTT SP 150, as at 808 and 908, the first message comprising an emergency call request for a UE. The emergency call request includes MNO data for the UE. The first message may be a SIP INVITE message.

At 1920, the IMS entity determines routing information for a destination PSAP based on the MNO data, as at 911 of FIG. 9.

Although not illustrated in FIG. 19, in an embodiment, the flow may further include sending a second message to the OTT service provider comprising the routing information, where the routing information enables the OTT service provider to route the emergency call to or towards the destination PSAP. In that case, the routing information may be a reference ID and the address or identity of either the PSAP or an intermediate destination. The second message may be a SIP 300 Multiple Choices message.

In an embodiment, the flow may further include receiving a third message comprising the reference ID from another entity, identifying the UE based on the reference ID, obtaining a location for the UE, and sending a fourth message to the other entity comprising the location. The reference ID may be an ESRK, an ESRD plus a MSISDN, or a location URI. The location of the UE may be obtained using a control plane location solution or a user plane location solution. In an aspect, the other entity may be the PSAP, an ALI, or an ESInet.

In an embodiment, the flow may further include sending a second message to or towards the PSAP based on the routing information, where the second message comprises a request for the emergency call. In this case, the IMS entity may be an Emergency CSCF.

Figure 20:
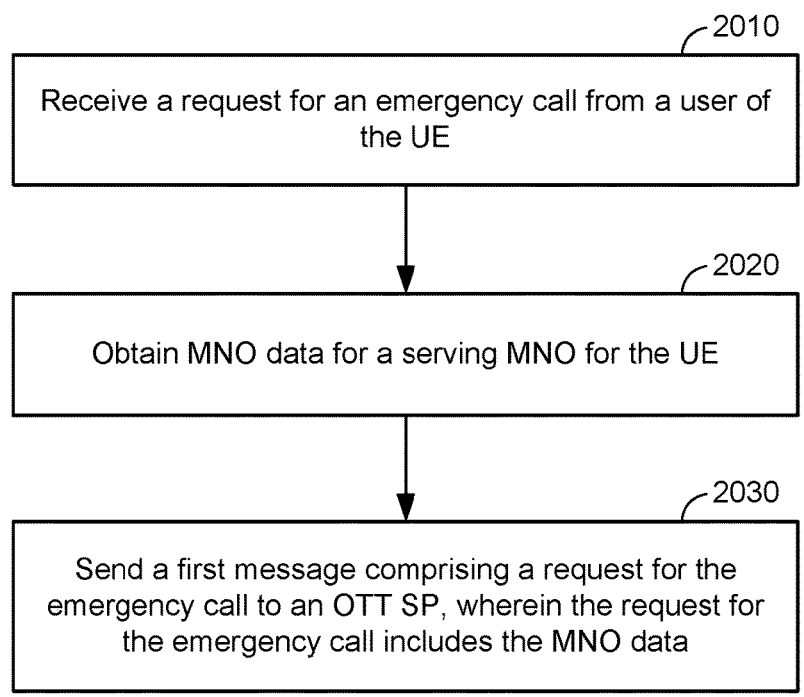

FIG. 20 illustrates an exemplary flow for supporting emergency calls at a UE, such as any of UEs 200, 300, 400, 500, 600, 700, 800, 900, 1002, and 1100. In an embodiment, the flow illustrated in FIG. 20 may be performed by, or caused to be performed by, the positioning module 1054.

At 2010, the UE receives a request for an emergency call from a user of the UE.

At 2020, the UE obtains MNO data for a serving MNO for the UE, as at 802/804 and 902/904.

At 2030, the UE sends a first message comprising a request for the emergency call to an OTT service provider, such as OTT SP 150, as at 806 and 906. The request for the emergency call includes the MNO data. The MNO data may include an address for an IMS for the serving MNO, an identity for a current serving mobility management entity or SGSN for the UE, a serving MNO assigned IP address for the UE, a global identity or local identity for the UE, or some combination thereof.

The OTT service provider sends a second message to the IMS based on the address for the IMS, where the second message comprises a request for the emergency call and includes the MNO data. The IMS determines routing information for the emergency call based on the MNO data. In this embodiment, the flow further includes receiving a request for a location estimate or for location measurements according to a user plane location solution or a control plane location solution, where the location estimate or location measurements enable the IMS to obtain a location for the UE, wherein the location for the UE enables the IMS to determine the routing information or to provide the PSAP with the location.

The IMS may send a third message to the OTT service provider comprising the routing information. The OTT service provider sends a fourth message to or towards a destination PSAP, where the PSAP is determined based on the routing information. In this case, the address for the IMS is an address for a LRF.

The IMS may send a fifth message to or towards a destination PSAP, where the fifth message comprises a request for the emergency call and wherein the PSAP is determined based on the routing information. The address for the IMS may be an address for an E-CSCF.

Figure 21:
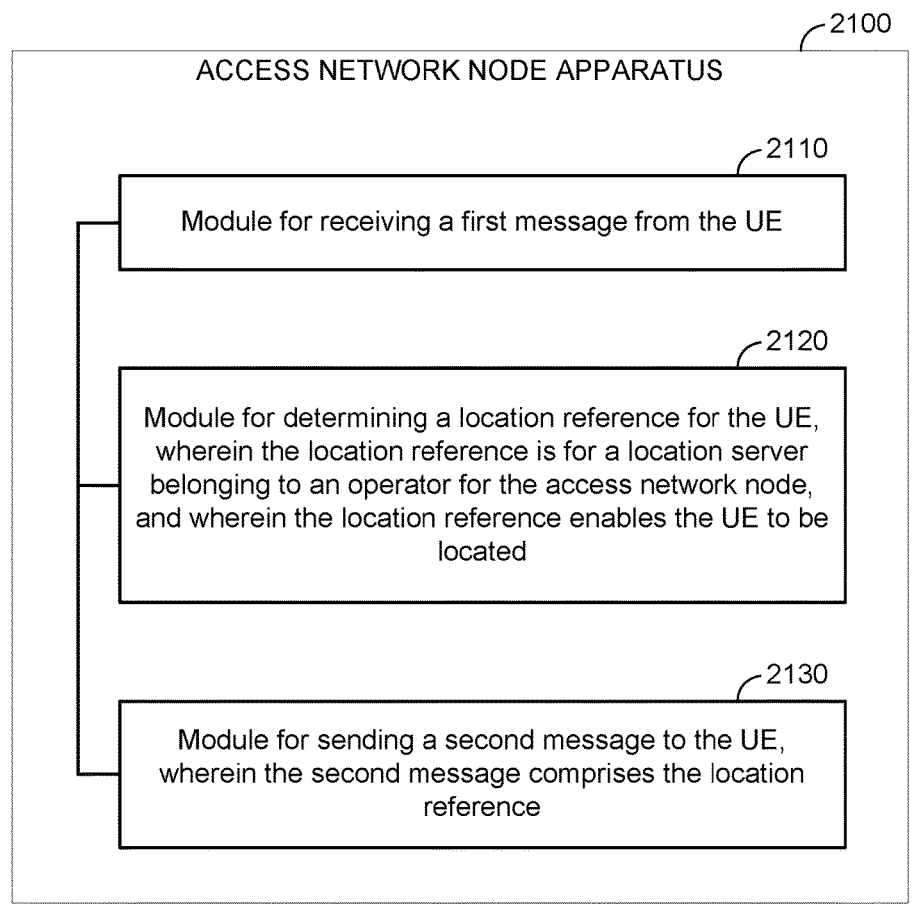
FIGS. 21-27 are other simplified block diagrams of several sample aspects of apparatuses configured to support communication as taught herein.

FIG. 21 illustrates an example access network node apparatus 2100 represented as a series of interrelated functional modules. A module for receiving 2110 may correspond at least in some aspects to, for example, a communication device, such as communication device 1014 in FIG. 10, or a processing system, such as processing system 1034, optionally in conjunction with positioning module 1056, as discussed herein. A module for determining 2120 may correspond at least in some aspects to, for example, a processing system, such as processing system 1034, optionally in conjunction with positioning module 1056, as discussed herein. A module for sending 2130 may correspond at least in some aspects to, for example, a communication device, such as communication device 1014 in FIG. 10, or a processing system, such as processing system 1034, optionally in conjunction with positioning module 1056, as discussed herein.

Figure 22:
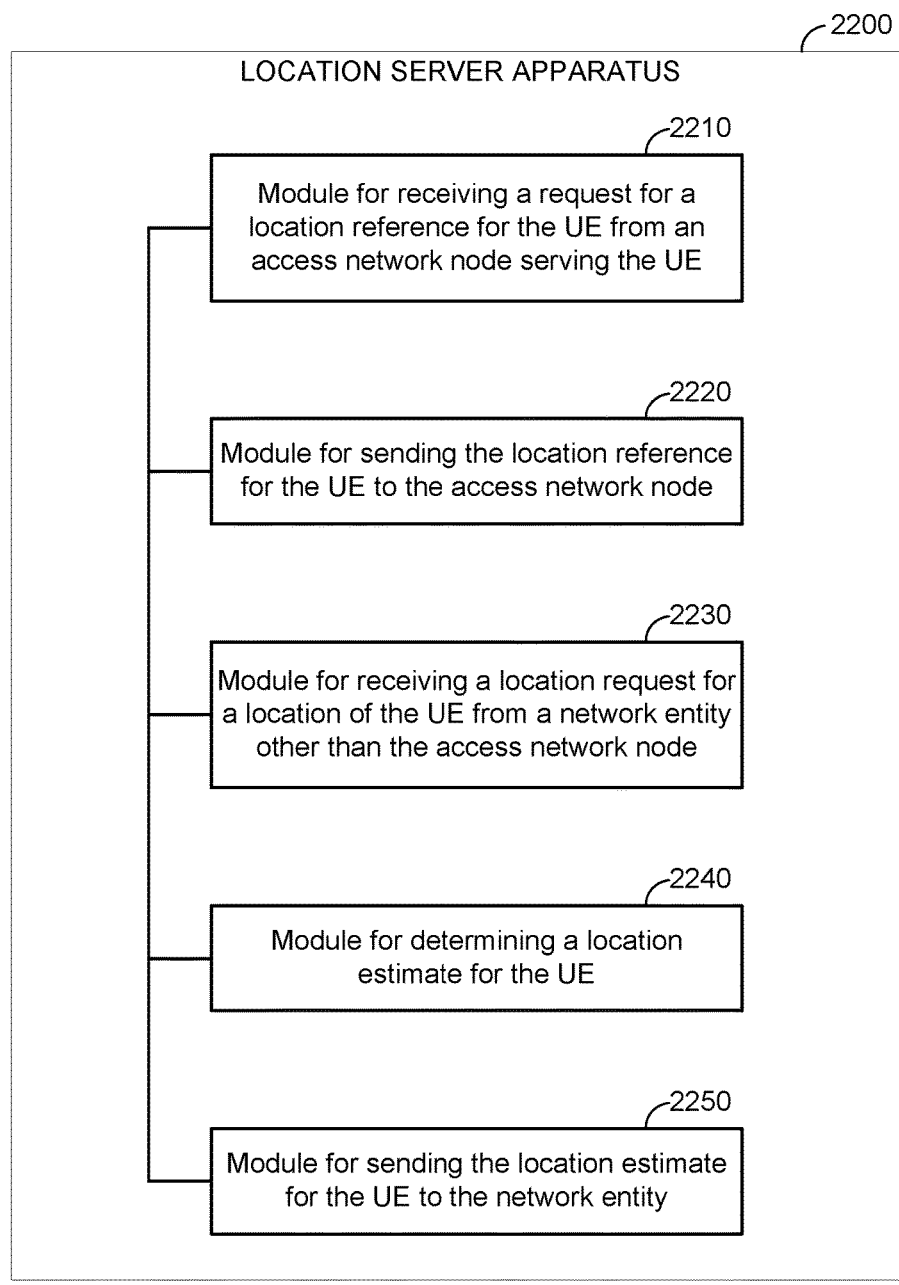

FIG. 22 illustrates an example location server apparatus 2200 represented as a series of interrelated functional modules. A module for receiving 2210 may correspond at least in some aspects to, for example, a communication device, such as communication device 1026 in FIG. 10, or a processing system, such as processing system 1036, optionally in conjunction with positioning module 1058, as discussed herein. A module for sending 2220 may correspond at least in some aspects to, for example, a communication device, such as communication device 1026 in FIG. 10, or a processing system, such as processing system 1036, optionally in conjunction with positioning module 1058, as discussed herein. A module for receiving 2230 may correspond at least in some aspects to, for example, a communication device, such as communication device 1026 in FIG. 10, or a processing system, such as processing system 1036, optionally in conjunction with positioning module 1058, as discussed herein. A module for determining 2240 may correspond at least in some aspects to, for example, a processing system, such as processing system 1036, optionally in conjunction with positioning module 1058, as discussed herein. A module for sending 2250 may correspond at least in some aspects to, for example, a communication device, such as communication device 1026 in FIG. 10, or a processing system, such as processing system 1036, optionally in conjunction with positioning module 1058, as discussed herein.

Figure 23:
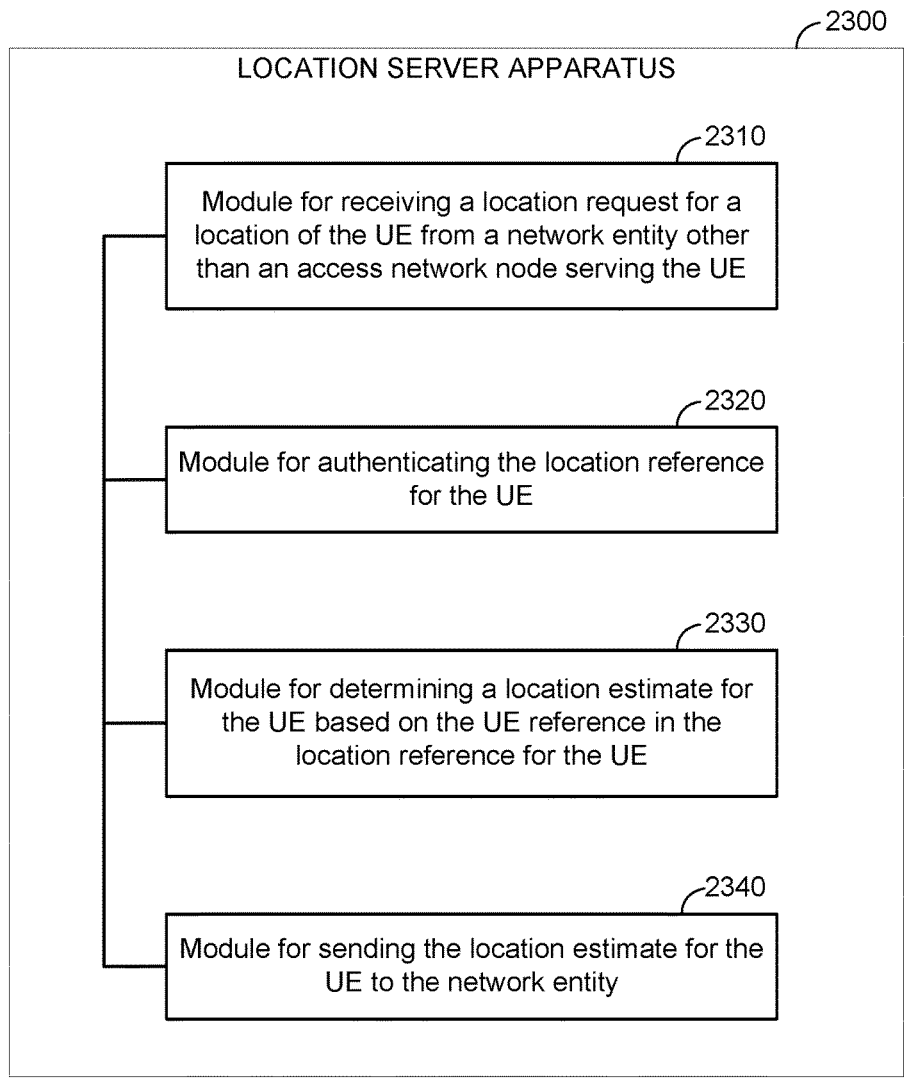

FIG. 23 illustrates an example location server apparatus 2300 represented as a series of interrelated functional modules. A module for receiving 2310 may correspond at least in some aspects to, for example, a communication device, such as communication device 1026 in FIG. 10, or a processing system, such as processing system 1036, optionally in conjunction with positioning module 1058, as discussed herein. A module for authenticating 2320 may correspond at least in some aspects to, for example, a processing system, such as processing system 1036, optionally in conjunction with positioning module 1058, as discussed herein. A module for determining 2330 may correspond at least in some aspects to, for example, a processing system, such as processing system 1036, optionally in conjunction with positioning module 1058, as discussed herein. A module for sending 2340 may correspond at least in some aspects to, for example, a communication device, such as communication device 1026 in FIG. 10, or a processing system, such as processing system 1036, optionally in conjunction with positioning module 1058, as discussed herein.

Figure 24:
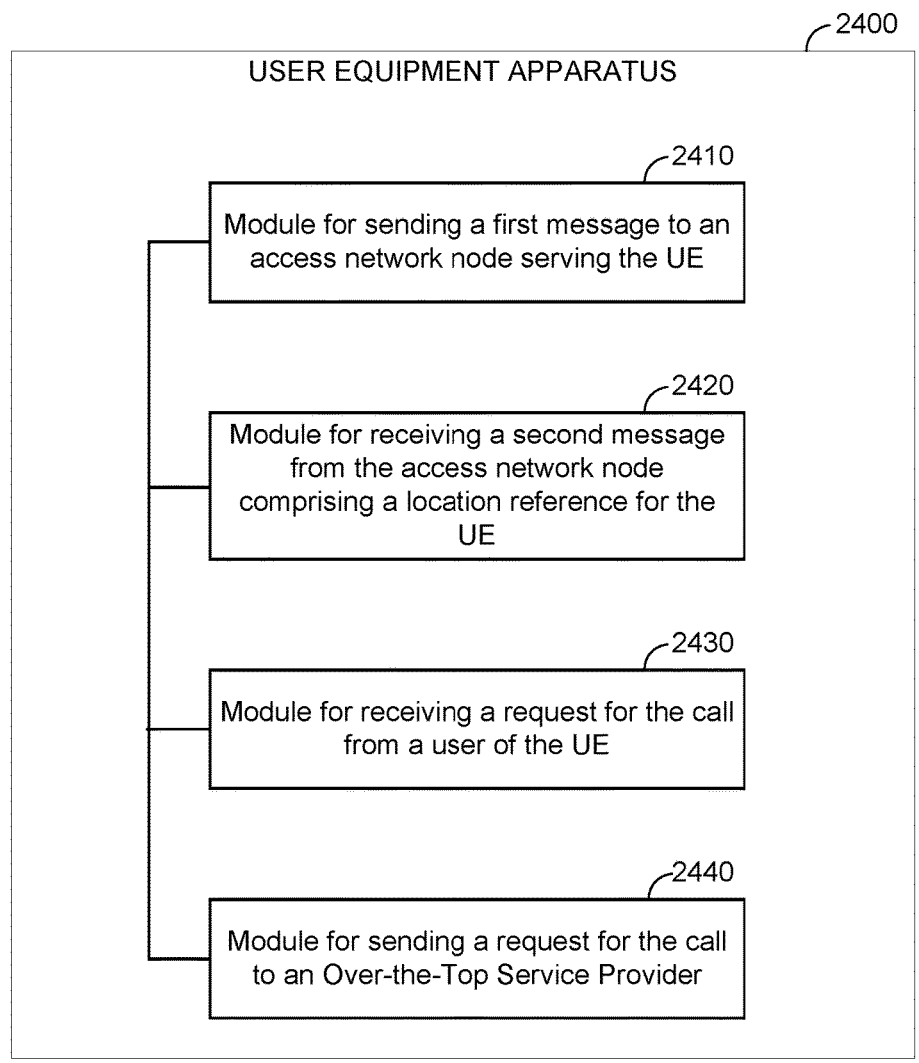

FIG. 24 illustrates an example user equipment apparatus 2400 represented as a series of interrelated functional modules. A module for sending 2410 may correspond at least in some aspects to, for example, a communication device, such as communication device 1008 in FIG. 10, or a processing system, such as processing system 1032, optionally in conjunction with positioning module 1054, as discussed herein. A module for receiving 2420 may correspond at least in some aspects to, for example, a communication device, such as communication device 1008 in FIG. 10, or a processing system, such as processing system 1032, optionally in conjunction with positioning module 1054, as discussed herein. A module for receiving 2430 may correspond at least in some aspects to, for example, a communication device, such as communication device 1008 in FIG. 10, or a processing system, such as processing system 1032, optionally in conjunction with positioning module 1054, as discussed herein. A module for sending 2440 may correspond at least in some aspects to, for example, a communication device, such as communication device 1008 in FIG. 10, or a processing system, such as processing system 1032, optionally in conjunction with positioning module 1054, as discussed herein.

Figure 25:
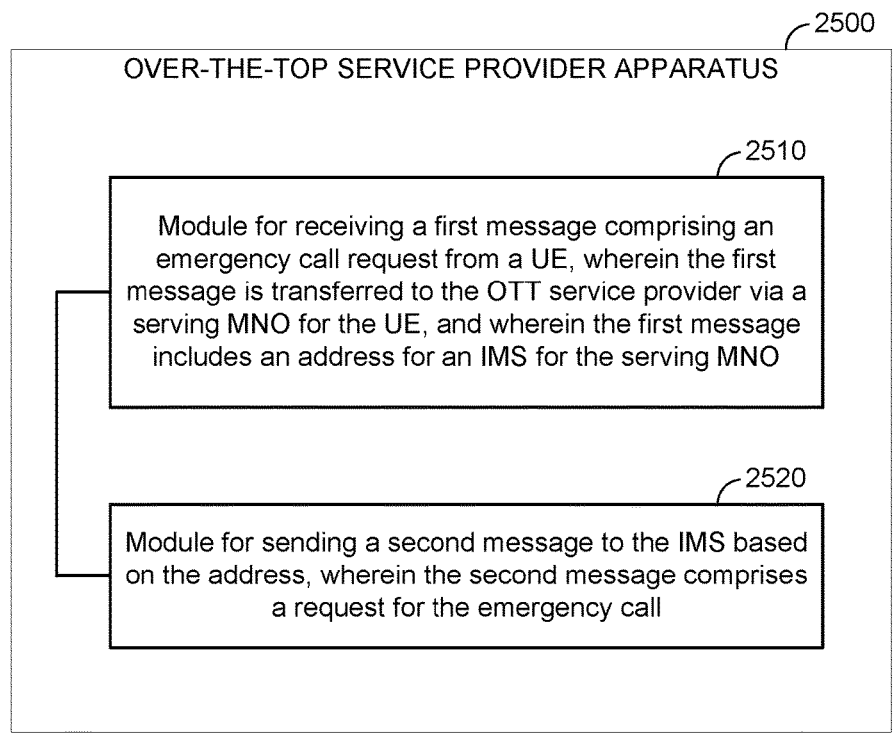

FIG. 25 illustrates an example OTT service provider apparatus 2500 represented as a series of interrelated functional modules. A module for receiving 2510 may correspond at least in some aspects to, for example, a communication device, such as communication device 1026 in FIG. 10, or a processing system, such as processing system 1036, optionally in conjunction with positioning module 1058, as discussed herein. A module for sending 2520 may correspond at least in some aspects to, for example, a communication device, such as communication device 1026 in FIG. 10, or a processing system, such as processing system 1036, optionally in conjunction with positioning module 1058, as discussed herein.

Figure 26:
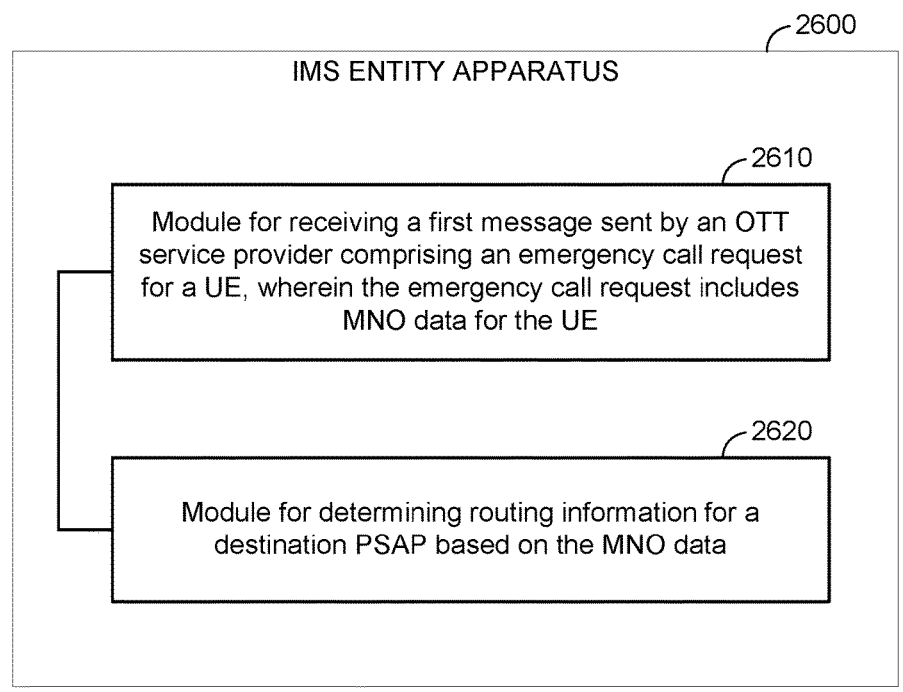

FIG. 26 illustrates an example IMS entity apparatus 2600 represented as a series of interrelated functional modules. A module for receiving 2610 may correspond at least in some aspects to, for example, a communication device, such as communication device 1026 in FIG. 10, or a processing system, such as processing system 1036, optionally in conjunction with positioning module 1058, as discussed herein. A module for determining 2620 may correspond at least in some aspects to, for example, a processing system, such as processing system 1036, optionally in conjunction with positioning module 1058, as discussed herein.

Figure 27:
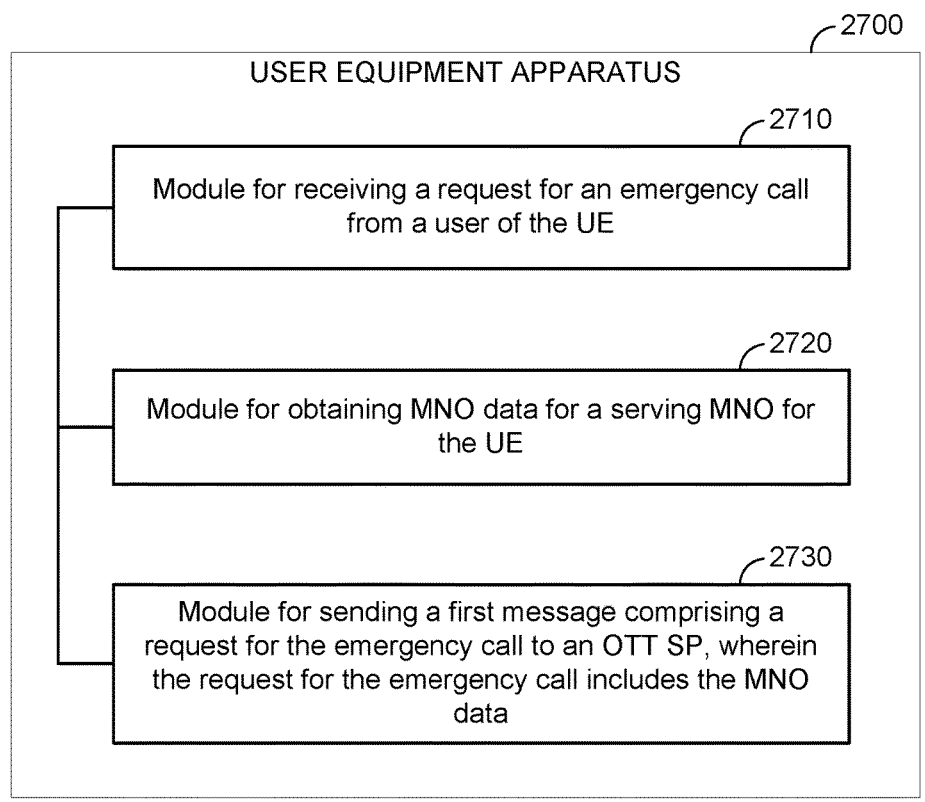

FIG. 27 illustrates an example user equipment apparatus 2700 represented as a series of interrelated functional modules. A module for receiving 2710 may correspond at least in some aspects to, for example, a communication device, such as communication device 1008 in FIG. 10, or a processing system, such as processing system 1032, optionally in conjunction with positioning module 1054, as discussed herein. A module for obtaining 2720 may correspond at least in some aspects to, for example, a communication device, such as communication device 1008 in FIG. 10, or a processing system, such as processing system 1032, optionally in conjunction with positioning module 1054, as discussed herein. A module for sending 2730 may correspond at least in some aspects to, for example, a communication device, such as communication device 1008 in FIG. 10, or a processing system, such as processing system 1032, optionally in conjunction with positioning module 1054, as discussed herein.

The functionality of the modules of FIGS. 21-27 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 21-27, as well as other components and functions described herein, may be implemented using any suitable means. Such means also may be implemented, at least in part, using corresponding structure as taught herein. For example, the components described above in conjunction with the "module for" components of FIGS. 21-27 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. An apparatus for supporting emergency calls, comprising:
at least one processor of a user equipment (UE) configured to:
receive a request for an emergency call from a user of the UE;
obtain mobile network operator (MNO) data for a serving MNO for the UE; and
cause a transmitter of the UE to send a first message comprising a request for the emergency call to an over the top (OTT) service provider, wherein the request for the emergency call includes the MNO data.

2. The apparatus of claim 1, wherein the MNO data comprises an address for an Internet Protocol (IP) Multimedia Subsystem (IMS) for the serving MNO, an identity for a current serving mobility management entity or serving general packet radio service support node (SGSN) for the UE, a serving MNO assigned IP address for the UE, a global identity or local identity for the UE, or any combination thereof.

3. The apparatus of claim 2, wherein the OTT service provider sends a second message to the IMS based on the address for the IMS, wherein the second message comprises a request for the emergency call and includes the MNO data.

4. The apparatus of claim 3, wherein the IMS determines routing information for the emergency call based on the MNO data.

5. The apparatus of claim 4, wherein the at least one processor is further configured to:
receive a request for a location estimate or for location measurements according to a user plane location solution or a control plane location solution, wherein the location estimate or location measurements enable the IMS to obtain a location for the UE, wherein the location for the UE enables the IMS to determine the routing information or to provide a public safety answering point (PSAP) with the location for the UE.

6. The apparatus of claim 4, wherein the IMS sends a third message to the OTT service provider comprising the routing information, wherein the OTT service provider sends a fourth message to or towards a destination PSAP, wherein the PSAP is determined based on the routing, information.

7. The apparatus of claim 6, wherein the address for the IMS is an address for a Location Retrieval Function (LRF).

8. The apparatus of claim 4, wherein the IMS sends a fifth message to or towards a destination PSAP, wherein the fifth message comprises a request for the emergency call, and wherein the PSAP is determined based on the routing information.

9. An apparatus for supporting emergency calls, comprising:
means for processing of a user equipment (UE) configured to:
receive a request for an emergency call from a user of the UE;
obtain mobile network operator (MNO) data for a serving MNO for the UE; and
cause a means for communicating of the UE to send a first message comprising a request for the emergency call to an over the top (OTT) service provider, wherein the request for the emergency call includes the MNO data.

10. The apparatus of claim 9, wherein the MNO data comprises an address for an Internet Protocol (IP) Multimedia Subsystem (IMS) for the serving MNO, an identity for a current serving mobility management entity or serving general packet radio service support node (SGSN) for the UE, a serving MNO assigned IP address for the UE, a global identity or local identity for the UE, or any combination thereof.

11. The apparatus of claim 10, wherein the OTT service provider sends a second message to the IMS based on the address for the IMS, wherein the second message comprises a request for the emergency call and includes the MNO data.

12. The apparatus of claim 11, wherein the IMS determines routing information for the emergency call based on the MNO data.

13. The apparatus of claim 12, wherein the means for processing is further configured to:
receive a request for a location estimate or for location measurements according to a user plane location solution or a control plane location solution, wherein the location estimate or location measurements enable the IMS to obtain a location for the UE, wherein the location for the UE enables the IMS to determine the routing information or to provide a public safety answering point (PSAP) with the location for the UE.

14. The apparatus of claim 12, wherein the IMS sends a third message to the OTT service provider comprising the routing information, wherein the OTT service provider sends a fourth message to or towards a destination PSAP, wherein the PSAP is determined based on the routing information.

15. The apparatus of claim 14, wherein the address for the IMS is an address for a Location Retrieval Function (LRF).

16. The apparatus of claim 12, wherein the IMS sends a fifth message to or towards a destination PSAP, wherein the fifth message comprises a request for the emergency call, and wherein the PSAP is determined based on the routing information.

17. A non-transitory computer-readable medium storing computer-executable instructions for supporting emergency calls at a user equipment (UE), the computer-executable instructions comprising:
at least one instructions instructing the UE to receive a request for an emergency call from a user of the UE;
at least one instructions instructing the UE to obtain mobile network operator (MNO) data for a serving MNO for the UE; and
at least one instructions instructing the UE to send a first message comprising a request for the emergency call to an over the top (OTT) service provider, wherein the request for the emergency call includes the MNO data.

18. The non-transitory computer-readable medium of claim 17, wherein the MNO data comprises an address for an Internet Protocol (IP) Multimedia Subsystem (IMS) for the serving MNO, an identity for a current serving mobility management entity or serving general packet radio service support node (SGSN) for the UE, a serving MNO assigned IP address for the UE, a global identity or local identity for the UE, or any combination thereof.

19. The non-transitory computer-readable medium of claim 18, wherein the OTT service provider sends a second message to the IMS based on the address for the IMS, wherein the second message comprises a request for the emergency call and includes the MNO data.

20. The non-transitory computer-readable medium of claim 19, wherein the IMS determines routing information for the emergency call based on the MNO data.

21. The non-transitory computer-readable medium of claim 20, further comprising:
at least one instructions instructing the UE to receive a request for a location estimate or for location measurements according to a user plane location solution or a control plane location solution, wherein the location estimate or location measurements enable the IMS to obtain a location for the UE, wherein the location for the UE enables the IMS to determine the routing information or to provide a public safety answering point (PSAP) with the location for the UE.

22. The non-transitory computer-readable medium of claim 20, wherein the IMS sends a third message to the OTT service provider comprising the routing information, wherein the OTT service provider sends a fourth message to or towards a destination PSAP, wherein the PSAP is determined based on the routing information.

23. The non-transitory computer-readable medium of claim 22, wherein the address for the IMS is an address for a Location Retrieval Function (LRF).

24. The non-transitory computer-readable medium of claim 20, wherein the IMS sends a fifth message to or towards a destination PSAP, wherein the fifth message comprises a request for the emergency call, and wherein the PSAP is determined based on the routing information.

25. A non-transitory computer-readable medium storing computer-executable instructions for supporting emergency calls at an over-the-top (OTT) service provider, the computer-executable instructions comprising:
at least one instructions instructing the OTT service provider to receive a first message comprising a request for an emergency call from a user equipment (UE), wherein the first message is transferred to the OTT service provider via a serving mobile network operator (MNO) for the UE, and wherein the first message includes an address for an Internet Protocol (IP) Multimedia Subsystem (IMS) for the serving MNO; and
at least one instructions instructing the OTT service provider to send a second message to the IMS based on the address, wherein the second message comprises a request for the emergency call.

26. The non-transitory computer-readable medium of claim 25, wherein the first message, the second message, or both messages comprise a Session Initiation Protocol (SIP) INVITE message.

27. The non-transitory computer-readable medium of claim 25, further comprising:

at least one instructions instructing the OTT service provider to receive a third message from the IMS comprising routing information for a destination Public Safety Answering Point (PSAP); and at least one instructions instructing the OTT service provider to send a fourth message to or towards the PSAP based on the routing information, wherein the fourth message comprises a request for an emergency call.

28. The non-transitory computer-readable medium of claim 27, wherein the third message comprises a Session Initiation Protocol (SIP) 300 Multiple Choices message.

29. The non-transitory computer-readable medium of claim 27, wherein the address for the IMS is for a Location Retrieval Function (LRF).

30. The non-transitory computer-readable medium of claim 29, wherein the routing information includes a reference identifier (ID), and wherein the non-transitory computer-readable medium further comprises:

at least one instructions instructing the OTT service provider to include the reference ID in the fourth message, wherein the reference ID enables the PSAP to obtain a location for the UE from the LRF.

* * * * *